(12) United States Patent
Garb et al.

(10) Patent No.: US 8,587,148 B2
(45) Date of Patent: Nov. 19, 2013

(54) ELECTRIC POWER SUPPLY AND RELATED METHODS

(75) Inventors: Jeffrey W. Garb, West Hills, CA (US);
Matthew S. Reynolds, Durham, NC (US); Timothy Brewer, San Diego, CA (US); Joshua Seal, Los Angeles, CA (US)

(73) Assignee: Belkin International, Inc., Playa Vista, CA (US)

(*) Notice: Subject to any disclaimer, the term of this patent is extended or adjusted under 35 U.S.C. 154(b) by 0 days.

(21) Appl. No.: 13/528,791

(22) Filed: Jun. 20, 2012

(65) Prior Publication Data
US 2012/0293153 A1 Nov. 22, 2012

Related U.S. Application Data

(63) Continuation-in-part of application No. PCT/US2011/020286, filed on Jan. 5, 2011, and a continuation-in-part of application No. 12/985,339, filed on Jan. 5, 2011, and a continuation-in-part of application No. PCT/US2009/041476, filed on Apr. 22, 2009, and a continuation-in-part of application No. 12/428,468, filed on Apr. 22, 2009, now Pat. No. 8,232,683.

(60) Provisional application No. 61/498,807, filed on Jun. 20, 2011, provisional application No. 61/292,490, filed on Jan. 5, 2010, provisional application No. 61/155,468, filed on Feb. 25, 2009, provisional application No. 61/047,070, filed on Apr. 22, 2008.

(51) Int. Cl.
*H02J 3/12* (2006.01)

(52) U.S. Cl.
USPC .............................................. 307/39; 307/41

(58) Field of Classification Search
USPC ...................................................... 307/39, 41
See application file for complete search history.

(56) References Cited

U.S. PATENT DOCUMENTS

| | | |
|---|---|---|
| 4,097,843 A | 6/1978 | Basile |
| 4,120,031 A | 10/1978 | Kincheloe et al. |
| 4,331,122 A | 5/1982 | Sohner et al. |
| 4,460,951 A | 7/1984 | Fenter et al. |
| 4,816,746 A | 3/1989 | Peak |
| 4,829,289 A | 5/1989 | Kallman et al. |
| 4,901,007 A | 2/1990 | Sworm |
| 4,912,589 A | 3/1990 | Stolarczyk |
| 4,928,218 A | 5/1990 | Kluttz |
| 4,931,725 A | 6/1990 | Hutt et al. |

(Continued)

FOREIGN PATENT DOCUMENTS

| | | |
|---|---|---|
| CN | 1541439 A | 10/2004 |
| DE | 44 26 509 | 2/1996 |

(Continued)

OTHER PUBLICATIONS

Hong Kong Electronics, vol. 5, Hong Kong Development Council 1996, 2 pages 1996.

(Continued)

*Primary Examiner* — Adi Amrany
(74) *Attorney, Agent, or Firm* — Bryan Cave LLP

(57) ABSTRACT

Some embodiments include an improved electric power supply. Other embodiments of related systems and methods are disclosed.

30 Claims, 24 Drawing Sheets

(56) References Cited

U.S. PATENT DOCUMENTS

| | | | |
|---|---|---|---|
| 4,999,728 A | | 3/1991 | Curl |
| 5,225,816 A | | 7/1993 | Lebby et al. |
| 5,424,903 A | | 6/1995 | Schreiber |
| 5,589,764 A | | 12/1996 | Lee |
| 5,701,109 A | * | 12/1997 | Poulsen .......... 335/78 |
| 5,774,321 A | | 6/1998 | Kim et al. |
| 5,793,352 A | | 8/1998 | Greenberg et al. |
| 5,869,960 A | | 2/1999 | Brand |
| 5,973,898 A | | 10/1999 | Merchant et al. |
| 6,095,850 A | | 8/2000 | Liu |
| 6,226,162 B1 | | 5/2001 | Kladar et al. |
| 6,367,024 B1 | | 4/2002 | Ezell |
| 6,555,990 B1 | | 4/2003 | Yang |
| 6,741,442 B1 | | 5/2004 | McNally et al. |
| 7,332,834 B2 | | 2/2008 | Lee |
| 7,540,767 B1 | | 6/2009 | Czarnecki |
| 7,598,631 B2 | * | 10/2009 | Szabados et al. .......... 307/140 |
| 7,677,921 B2 | | 3/2010 | Czarnecki |
| 7,847,429 B2 | * | 12/2010 | Miyama et al. .......... 307/9.1 |
| 2003/0086224 A1 | | 5/2003 | Elms et al. |
| 2003/0103366 A1 | | 6/2003 | MacDonald et al. |
| 2003/0169606 A1 | | 9/2003 | Miermans |
| 2005/0076252 A1 | | 4/2005 | Birmingham |
| 2005/0146219 A1 | | 7/2005 | Pincu et al. |
| 2005/0215285 A1 | | 9/2005 | Lin |
| 2007/0127177 A1 | | 6/2007 | Benton et al. |
| 2009/0009936 A1 | | 1/2009 | Neu et al. |
| 2009/0256534 A1 | | 10/2009 | Videtich et al. |
| 2009/0289501 A1 | | 11/2009 | Garb |
| 2009/0294150 A1 | | 12/2009 | McGinley et al. |
| 2009/0295226 A1 | | 12/2009 | Hodges et al. |
| 2009/0295232 A1 | | 12/2009 | McGinley et al. |
| 2009/0295233 A1 | | 12/2009 | McGinley et al. |
| 2009/0295327 A1 | | 12/2009 | McGinley et al. |
| 2009/0322160 A1 | | 12/2009 | Dubose et al. |
| 2011/0144824 A1 | * | 6/2011 | Campesi et al. .......... 700/297 |

FOREIGN PATENT DOCUMENTS

| | | |
|---|---|---|
| GB | 2041588 | 9/1980 |
| JP | 0038587 | 3/1979 |
| JP | 4315964 | 11/1992 |
| JP | 8184616 | 7/1996 |
| WO | 8605887 | 10/1986 |
| WO | WO9823019 | 5/1998 |
| WO | 2004-008649 | 1/2004 |

OTHER PUBLICATIONS

Hong Kong Electronics, Hong Kong Development Council 1997, 2 pages. Aug. 1997.

Hong Kong Electronics, Hong Kong Development Council 1997, 2 pages. Oct. 1997.

Hong Kong Electronics, Hong Kong Development Council 1997, 2 pages. Dec. 1997.

Bluelounge—The Sanctuary; http://www.bluelounge.com/products/thesanctuary, 3 pgs. Retrieved Aug. 27, 2010.

Bluelounge—Extra Connectors. http://www.bluelounge.com/products/extraconnectors, 3 pgs. Retrieved Aug. 27, 2010.

International Search Report for PCT Application No. PCT/US2001/020286, 14 pages. Mar. 15, 2011.

International Search Report for PCT Application No. PCT/US2009/041476, 10 pages. Jun. 24, 2009.

International Search Report and Written Opinion for PCT Application No. PCT/US2009/041476, 13 pages, Jun. 24, 2009.

International Search Report and Written Opinion for PCT Application No. PCT/US2012/043412, 10 pages, Jan. 3, 2013.

International Search Report for PCT Application No. PCT/US2011/023829, 9 pages, Apr. 6, 2011.

International Search Report for PCT Application No. PCT/US2011/039684, 11 pages, Sep. 26, 2011.

* cited by examiner

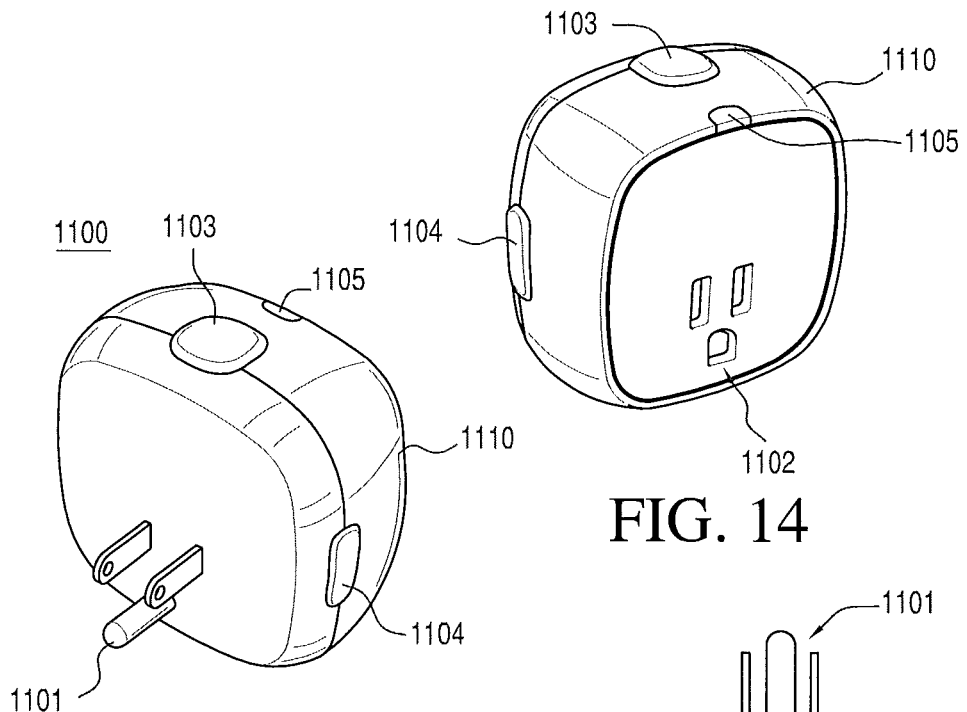
FIG. 11
FIG. 14
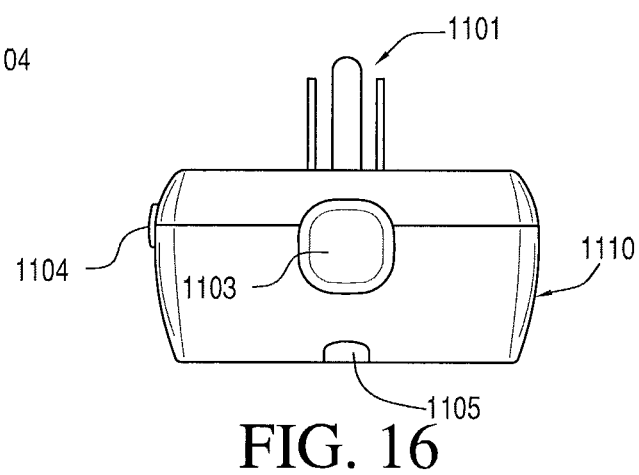
FIG. 16
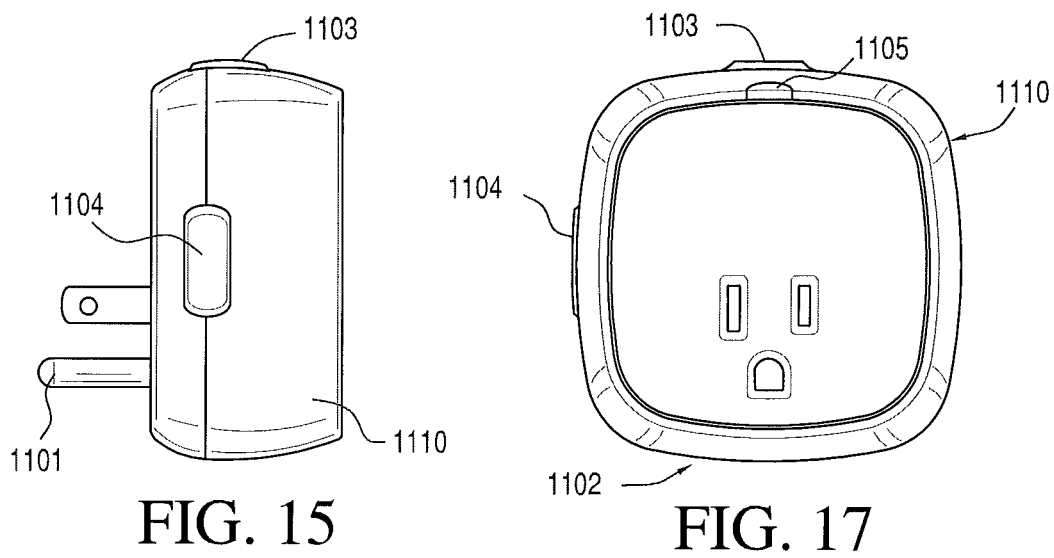
FIG. 15
FIG. 17

ELECTRIC POWER SUPPLY AND RELATED METHODS

CROSS-REFERENCE TO RELATED APPLICATIONS

This application claims the benefit of U.S. Provisional Application Ser. No. 61/498,807, filed Jun. 20, 2011, and is a continuation-in-part of (1) PCT Application No. PCT/US2011/020286, filed Jan. 5, 2011, (2) U.S. Non-Provisional application Ser. No. 12/985,339, filed Jan. 5, 2011, (3) PCT Application No. PCT/US2009/041476, filed Apr. 22, 2009, and (4) U.S. Non-Provisional application Ser. No. 12/428,468, filed on Apr. 22, 2009.

PCT Application No. PCT/US2011/020286 and U.S. Non-Provisional application Ser. No. 12/985,339 both claim the benefit of U.S. Provisional Application Ser. No. 61/292,490, filed on Jan. 5, 2010.

PCT Application No. PCT/US2009/041476 and U.S. Non-Provisional application Ser. No. 12/428,468 both claim the benefit of (i) U.S. Provisional Application Ser. No. 61/155,468, filed on Feb. 25, 2009, and (ii) U.S. Provisional Application Ser. No. 61/047,070, filed on Apr. 22, 2008.

The contents of the references listed above are incorporated herein by reference.

TECHNICAL FIELD

Subject matter described herein relates to electric power supply devices, and more particularly to electricity distribution and/or electricity management of electric power supplies for electronic devices.

BACKGROUND

As electronic devices continue to become more embedded in the day to day activities of people, improved systems and methods for providing electricity to power electronic devices are becoming increasingly more important. Accordingly, a need or potential for benefit exists for systems and methods that can efficiently provide electricity to electronic devices.

BRIEF DESCRIPTION OF THE DRAWINGS

To facilitate further description of the embodiments, the following drawings are provided in which:

FIG. 11 is an isometric view of an embodiment of a housing for an improved electric power supply;

FIGS. 14-17 are additional isometric views of the embodiment of the housing for the improved power supply of FIG. 11;

Figure 1:
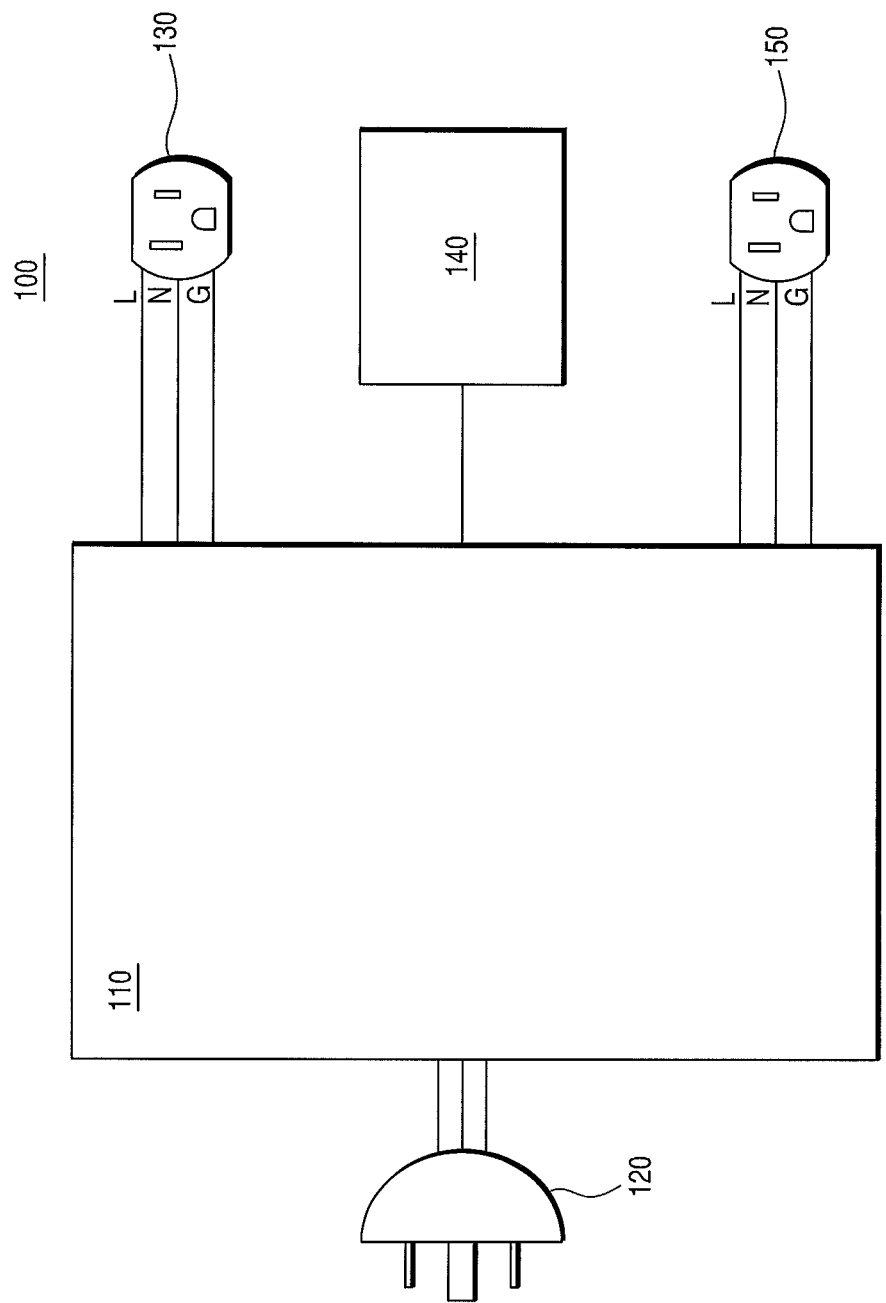
FIG. 1 is a block diagram illustrating an improved electric power supply including aspects of the subject matter described herein.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter. The aspects described above and other aspects of the subject matter described herein are illustrated by way of example and not limited in the accompanying figures in which like reference numerals indicate substantially similar elements.

For simplicity and clarity of illustration, the drawing figures illustrate the general manner of construction, and descriptions and details of well-known features and techniques may be omitted to avoid unnecessarily obscuring aspects of the subject matter described herein. Additionally, elements in the drawing figures are not necessarily drawn to scale. For example, the dimensions of some of the elements in the figures may be exaggerated relative to other elements to help improve understanding of embodiments of the subject matter described herein.

The terms "first," "second," "third," "fourth," and the like in the Detailed Description and in the claims, if any, are used for distinguishing between similar elements and not necessarily for describing a particular sequential or chronological order. It is to be understood that the terms so used are interchangeable under appropriate circumstances such that the embodiments of the subject matter described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the Detailed Description and in the claims, if any, are used for descriptive purposes and not necessarily for describing permanent relative positions. It is to be understood that the terms so used are interchangeable under appropriate circumstances such that the aspects of the subject matter described herein are, for example, capable of operation in other orientations than those illustrated or otherwise described herein. The term "on," as used herein, is defined as on, at, or otherwise substantially adjacent to or next to or over.

The terms "couple," "coupled," "couples," "coupling," and the like should be broadly understood and refer to connecting two or more elements or signals, electrically, mechanically, or otherwise, either directly or indirectly through intervening circuitry and/or elements. Two or more electrical elements may be coupled, either direct or indirectly, but not be mechanically coupled; two or more mechanical elements may be mechanically coupled, either direct or indirectly, but not be coupled; two or more electrical elements may be mechanically coupled, directly or indirectly, but not be coupled. Coupling (whether only mechanical, only electrical, both, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of a clip being coupled to an outer casing does not mean that the clip cannot be removed (readily or otherwise) from, or that it is permanently connected to, the outer casing.

DETAILED DESCRIPTION

Some embodiments include an electrical system. The electrical system comprises an electrical input configured to receive electricity, at least one electrical output configured to be coupled to at least one electrical load, and an assembly. The assembly comprises a switch module, a startup module, a conservation module, a low-voltage electricity supply module, a toggle module, and a control module. The electricity received at the electrical input can comprise operational electricity. The assembly can be configured to permit a user to selectively couple the electrical input to the at least one electrical output in order to make available output electricity to the at least one electrical output for a period of time determined by the user. The assembly can be configured to utilize the operational electricity to power at least one of the switch module or the control module. While the output electricity is being made available to the at least one electrical output for the period of time determined by the user, the electricity can further comprise the output electricity. While the assembly is utilizing the operational electricity to power at least one of the switch module or the control module, the assembly can be configured to operate first in a startup state followed by a run state. The operational electricity can be less during the run state than during the startup state. The switch module can be configured to be coupled to at least one of the electrical input, the startup module, the power conservation module, or the at least one electrical output. The switch module can be coupled to the control module and the low-voltage electricity supply module. The startup module can be configured to be coupled to at least one of the electrical input or the toggle module. The startup module can be coupled to the power conservation module. The power conservation module can be coupled to the low-voltage electricity supply. The low-voltage electricity supply module can be coupled to the toggle module and the control module. The toggle module can be coupled to the control module.

Various embodiments include a method for manufacturing an electrical system. The method can comprise: providing an electrical input configured to receive electricity; providing at least one electrical output configured to be coupled to at least one electrical load; providing an assembly comprising a switch module, a startup module, a power conservation module, a low-voltage electricity supply module, a toggle module, and a control module; coupling the switch module to the control module and the low-voltage electricity supply module; coupling the startup module to the power conservation module; coupling the power conservation module to the low-voltage electricity supply; coupling the low-voltage electricity supply module to the toggle module and the control module; and coupling the toggle module to the control module. The electricity received at the electrical input can comprise operational electricity. The assembly can be configured to permit a user to selectively couple the electrical input to the at least one electrical output in order to make available output electricity to the at least one electrical output for a period of time determined by the user. The assembly can be configured to utilize the operational electricity to power at least one of the switch module or the control module. While the output electricity is being made available to the at least one electrical output for the period of time determined by the user, the electricity can further comprise the output electricity. While the assembly is utilizing the operational electricity to power at least one of the switch module or the control module, the assembly can be configured to operate first in a startup state followed by a run state. The operational electricity can be less during the run state than during the startup state. The switch module can be configured to be coupled to at least one of the electrical input, the startup module, the power conservation module, or the at least one electrical output. The startup module can be configured to be coupled to at least one of the electrical input or the toggle module.

Other embodiments include a method for selectively coupling an electrical input to at least one electrical output with an assembly in order to make available output electricity to the at least one electrical output for a period of time determined by a user, where the electrical input is configured to receive electricity, the at least one electrical output is configured to be coupled to at least one electrical load, and the assembly is configured to be coupled to at least one of the electrical input or the at least one electrical output. The method can comprising: receiving electricity at the electrical input; receiving at the assembly sufficient operational electricity of the electricity at the electrical input to engage a coupling mechanism of the assembly, the coupling mechanism operating to couple the electrical input to the at least one electrical output such that the assembly couples the electrical input to the at least one electrical output to make available output electricity of the electricity at the electrical input to the at least one electrical output for the period of time determined by the user; after receiving at the assembly the sufficient operational electricity to engage the coupling mechanism of the assembly, receiving at the assembly sufficient operational electricity of the electricity at the electrical input such that the coupling mechanism maintains coupling the electrical input to the at least one electrical output, where the operational electricity sufficient to activate the coupling mechanism exceeds the operational electricity sufficient to maintain coupling the electrical input to the at least one electrical output; and terminating the electrical input being coupled to the at least one electrical output upon completion of the period of time determined by the user by disengaging the coupling mechanism of the assembly.

In one embodiment, an electrical system can comprise an electrical input module configured to receive input electricity, an electrical output module configured to provide output electricity to an electrical load coupled thereto, a switch module coupled to the electrical input module, a startup module coupled to the switch module, a power conservation module coupled to the switch module, and an electrical assembly comprising at least the switch module, the startup module, and the power conservation module. The electrical assembly can be powered by operational electricity derived from the input electricity. The output electricity can be derived from the input electricity at the electrical assembly. The electrical system can be configured to operate in a startup state, and in a run state following the startup state. During the startup state, the switch module can couple the electrical input module to the startup module. During the run state, the switch module can couple the electrical input module to the power conservation module and to the electrical output module. The operational electricity is greater during the startup state than during the run state.

In one example, a method can be used for selectively coupling an electrical input to an electrical output via an electrical assembly such as to make available output electricity to the electrical output. The electrical input being can be configured to receive input electricity, the electrical output can be configured to be coupled to at least one electrical load, and the electrical assembly can comprise a switch module, a startup module, and a power conservation module. Such method can comprise performing a startup state for the electrical assembly, and maintaining a run state for the electrical assembly. Performing the startup state for the electrical assembly can comprise coupling the electrical input to the power supply module via the startup module of the electrical assembly, sourcing, with the power supply, a first operational electricity through the startup module from the input electricity, and powering the switch module to latch, using power derived by the power supply module from the first operational electricity, to thereby couple the electrical input to the electrical output and to thereby couple the electrical input to the power supply module via the power conservation module. Maintaining the run state for the electrical assembly can comprise sourcing, with the power supply, a second operational electricity through the power conservation module from the input electricity, and powering the switch module to remain latched using power derived by the power supply module from the second operational electricity. The first operational electricity is greater than the second operational electricity.

In one example, a method for manufacturing an electrical system can comprise (a) providing an electrical input module configured to receive input electricity, (b) providing an electrical output module configured to provide output electricity to an electrical load coupled thereto, (c) providing a switch module, (d) providing a startup module, (e) providing a power conservation module, and/or (f) coupling the switch module, the startup module, and the power conservation module together into an electrical assembly. The method can also comprise configuring the electrical system to operate in a startup state, and in a run state following the startup state. The electrical assembly can be configured to be powered by operational electricity derived from the input electricity. During the startup state, the switch module can be configured to couple the electrical input module to the startup module. During the run state, the switch module can be configured to couple the electrical input module to the power conservation module and to the electrical output module. The operational electricity is greater during the startup state than during the run state.

Referring now to the figures, FIG. 1 is a block diagram illustrating an embodiment of an exemplary system for providing a multi-outlet controlled power strip including multiple inputs, surge protection and incorporating an improved electric power supply. FIG. 1 includes power strip 100 (also called a relocatable power tap (RPT)) including control circuitry 110, power plug 120, constant "on" outlet(s) 130, command input device 140 and controlled outlet(s) 150. Control circuitry 110 is a circuit configured to receive power signals and disperse power signals to constant "on" outlet(s) 130 and possibly command input device 140 if so configured, and further disperse power signals to controlled outlet(s) 150 based on input received from command input device 140. Control circuitry 110 can include some or all the improved power supply circuitry that is detailed in FIGS. 2-4 as well as in FIGS. 6-8 below. In some embodiments, control circuitry 110 additionally includes protection circuitry. Protection circuitry is described in FIG. 2 and specifically detailed in FIG. 5, below.

Power plug 120 is an electrical conduit that is physically coupled to and in electrical communication with control circuitry 110. Power plug 120 is configured to pass a power signal received from a power source to control circuitry 110 when power plug 120 is physically coupled to and in electrical communication with a power source (not shown). Constant "on" outlet(s) 130 are a power outlet that are physically coupled to and in constant electrical communication with control circuitry 110 and are further configured to pass a power signal received from control circuitry 110 to any device with which it is in electrical communication.

Command input device 140 is any input device that is physically coupled to and in electrical communication with control circuitry 110 and is further configured to pass a command signal to control circuitry 110 based on a received command signal or command action that command input device 140 received previously. Controlled outlet(s) 150 are a power outlet that are physically coupled to and in controlled electrical communication with control circuitry 110 and are further selectively configured to pass a power signal received from control circuitry 110 to any device with which it is in electrical communication. Command input device 140 can be implemented as any suitable command input device, such as, for example a master outlet as part of a master/slave power strip configuration providing a control signal to control circuitry 110 by drawing current from control circuitry 110, a receiver device providing a control signal to control circuitry 110, a sensing device providing a control signal to control circuitry 110, and the like. Examples of a receiver device providing a control signal to control circuitry 110 include a radio frequency (RF) receiver, a light emitting diode (LED) receiver, a wireless networked receiver, a short range wireless receiver that is part of a personal area network (PAN), and the like.

In operation, when power plug 120 is operably coupled to and in electrical communication with an appropriate power source (e.g., an alternating current (a.c.) or other power outlet fixture), power becomes available to constant "on" outlet(s) 130 and command input device 140, as appropriate. At this time, if command input device 140 has not provided an appropriate command signal to control circuitry 110, power is NOT available to controlled outlet(s) 150, and any device(s) operably coupled to and in electrical communication with controlled outlet(s) 150 will NOT receive any current or power. Control circuitry 110 is configured to detect when a control signal is received from command input device 140. In an example, when command input device 140 provides an "on" control signal to control circuitry 110, control circuitry 110 will provide power to controlled outlet(s) 150 thereby providing current and/or power to any devices coupled to and in electrical communication with controlled outlet(s) 150. Similarly, when command input device 140 provides an "off" control signal to control circuitry 110 and then changes the control signal to an "on" control signal, control circuitry 110 will provide power to controlled outlet(s) 150 thereby providing current and/or power to any devices coupled to and in electrical communication with controlled outlet(s) 150.

The exemplary configuration illustrated in FIG. 1 allows a user, via constant "on" outlet(s) 130, the flexibility to assign certain devices (e.g., a clock, cable/satellite receiver, etc.) to be supplied with constant power as well as determine when other devices receive power. Additionally, the configuration allows a user, via command input device 140 and controlled outlet(s) 150, to control when power is supplied to a primary device (e.g., a personal computer, such as, a laptop or desktop computer) as well as or in addition to secondary devices, such as, peripherals (e.g., printers, scanners, etc.).

Figure 2:
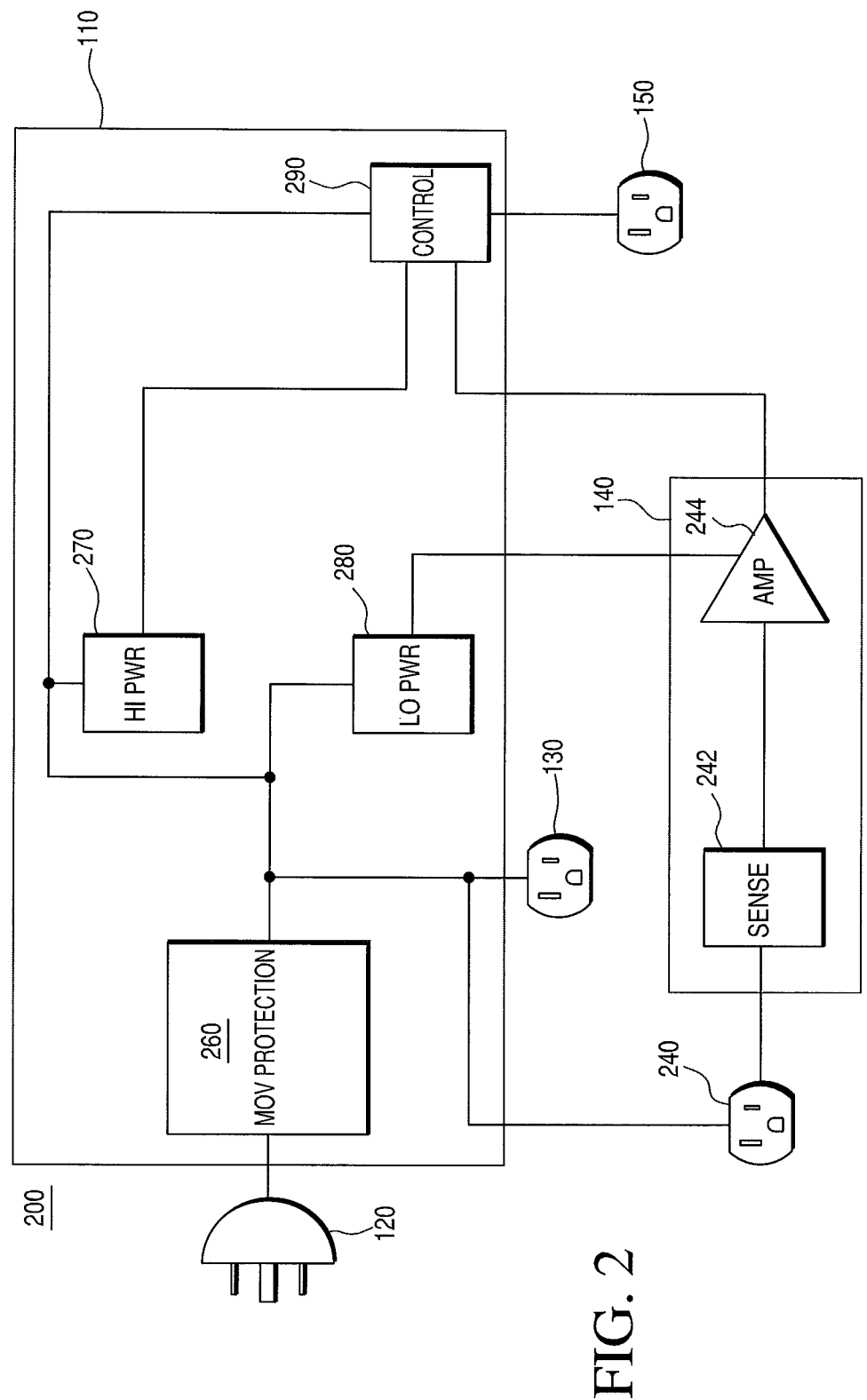
FIG. 2 is a block diagram illustrating an embodiment of the improved electric power supply of FIG. 1 including aspects of the subject matter described herein.

FIG. 2 is a block diagram illustrating an embodiment of an exemplary system for providing a multi-outlet controlled power strip including surge protection and incorporating an improved power supply. The power strip 200 in FIG. 2 is a detailed view of power strip 100 of FIG. 1. As shown in FIG. 2, power strip 200 includes: control circuitry 110, power plug 120, constant "on" outlet(s) 130, command input device 140 (configured as a master outlet) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes master outlet 240, sensing (SENSE) circuit 242 amplification (AMP) circuit 244. Elements numbered as in FIG. 1 function in a substantially similarly way.

MOV protection circuit 260 has an input and an output. The input of MOV protection circuit 260 is coupled and in communication with power plug 120. The output of MOV protection circuit 260 is coupled and in communication with constant "on" outlet(s) 130, master outlet 240 portion of command input device 140, HI PWR circuit 270, LO PWR circuit 280, and control circuit 290. MOV protection circuit 260 receives a power signal from power plug 120 and provides protected power signals to constant "on" outlet(s) 130, command input device 140, HI PWR circuit 270, LO PWR circuit 280, and control circuit 290. An embodiment of MOV protection circuit 260 is described in FIG. 5, below. In operation, MOV protection circuit 260 provides one or more of the following: conditions the received power signal to, among other things, reduce incoming radiated and conducted high frequency signals and noise; reduces the amplitude of incoming overvoltage spikes/surges; provides protection for power strip 200 from defective MOV units within MOV protection circuit 260; and determines the presence of a ground connection as well as communicate that information to a user. In short, MOV protection circuit 260 provides protected power to all other circuitry and outlets within power strip 200.

HI PWR circuit 270 has an input and an output. The input of HI PWR circuit 270 is coupled and in communication with MOV protection circuit 260, constant "on" outlet(s) 130, master outlet 240 portion of command input device 140 and LO PWR circuit 280. The output of HI PWR circuit 270 is coupled and in communication with control circuit 290. LO PWR circuit 280 has an input and an output. The input of LO PWR circuit 280 is coupled and in communication with MOV protection circuit 260, constant "on" outlet(s) 130, master outlet 240 portion of command input device 140 and HI PWR circuit 270. The output of LO PWR circuit 280 is coupled and in communication with AMP circuit 244 portion of command input device 140. HI PWR circuit 270 and LO PWR circuit 280 each receive a protected alternating current (AC) power signal from MOV protection circuit 260 and generate different levels of low voltage power for the internal circuitry of power strip 200. HI PWR circuit 270 and LO PWR circuit 280 efficiently convert line AC power to the voltages required to operate control circuit 290 and AMP circuit 244, respectively. HI PWR circuit 270 and LO PWR circuit 280 can be optimized to take advantage of the most efficient power levels to run the internal circuitry of power strip 200. In operation, LO PWR circuit 280 supplies real power to AMP circuit 244, and HI PWR circuit 270 supplies real power to the control circuit 290 allowing for efficient use of power. The uniqueness of this approach as compared to a more traditional single power supply approach is that a power savings as high as 4 to 1 can be achieved over the traditional method. An embodiment of HI PWR circuit 270 and LO PWR circuit 280 and the advantages of utilizing this configuration are further described in FIGS. 6-8, below.

Control circuit 290 has an input and an output. The input of control circuit 290 is coupled and in separate communication with MOV protection circuit 260, HI PWR circuit 270 and AMP circuit 244 portion of command input device 140. The output of control circuit 290 is coupled and in communication with controlled outlet(s) 150. Control circuit 290 receives a real power signal from HI PWR circuit 270 and additionally receives a driving signal from AMP circuit 244 when a device that is plugged into master outlet 240 portion of command input device 140 is drawing enough power to be active. When control circuit 290 receives the driving signal from AMP circuit 244, control circuit 290 allows current to flow between MOV protection circuit 260 and controlled outlet(s) 150.

SENSE circuit 242 of command input device 140 includes an input and an output. The input of SENSE circuit 242 is coupled and in communication with master outlet 240 of command input device 140. The output of SENSE circuit 242 is coupled and in communication with AMP circuit 244 of command input device 140. SENSE circuit 242 monitors an output signal from master outlet 240 and provides a sensing signal to AMP circuit 244 indicating whether or not master outlet 240 is in use or is at least drawing current above a threshold or minimum predetermined valve. In operation, SENSE circuit 242 determines that master outlet 240 is drawing current when a device that is in electrical communication with master outlet 240 is drawing enough current to exceed a current threshold, such as drawing enough current to power the device in an "ON" state. In such a situation, SENSE circuit 242 produces a sensing signal in response to master outlet 240 drawing at least a predetermined amount of current and provides the created sensing signal to AMP circuit 244. In some embodiments, SENSE circuit 242 is powered by master outlet 240 because master outlet 240 is always "ON." In such embodiments, current drawn from master outlet 240 that is monitored by SENSE circuit 242 can exclude the current (and power) that SENSE circuit 242 requires to run, and/or SENSE circuit 242 can be programmed (by hardware, software, or otherwise) or adjusted to account for the current (and power) that SENSE circuit 242 draws from master outlet 240.

AMP circuit 244 of command input device 140 includes an input and an output. The input of AMP circuit 244 is coupled and in separate communication with SENSE circuit 242 and LO PWR circuit 280. The output of AMP circuit 244 is coupled and in communication with control circuit 290. AMP circuit 244 receives a real power signal from LO PWR circuit 280 and additionally receives a sensing signal from SENSE circuit 242 that is based on the status of master outlet 240. AMP circuit 244 compares the signal received from SENSE circuit 242 to a threshold to determine whether master outlet 240 is "on." If the signal received from SENSE circuit 242 equals or exceeds a threshold value, AMP circuit 244 generates a driving signal and provides the generated driving signal to control circuit 290.

In operation, power strip 200 enables a user to configure the power strip to utilize one primary device (e.g., a personal computer, such as, a laptop or desktop computer) in electrical communication with command input device 140 configured as a master/slave device to control when power is supplied to secondary devices, such as, peripherals (e.g., printers, scanners, etc.), desk lighting, and the like. In the same or a different embodiment, when a primary device is in "standby" state and is coupled to and in electrical communication with command input device 140 configured as a master/slave device, the primary device will receive current from command input device 140, but the amount of current will be lower than when the device is in the "on" state. In this "standby" state, the device is receiving current at a level that is below a predetermined threshold level. In an example of this embodiment, power strip 200 treats the "standby" state similar to the "off" state such that, in both of these states: (1) command input device 140 is not providing sufficient power or current to the primary device that is coupled to and in electrical communication with command input device 140; and (2) control circuitry 110 will not provide power to controlled outlet(s) 150 and, therefore, will not provide current to any secondary devices coupled to and in electrical communication with controlled outlet(s) 150. An example of this embodiment can occur when the primary device is a television.

Figure 3:
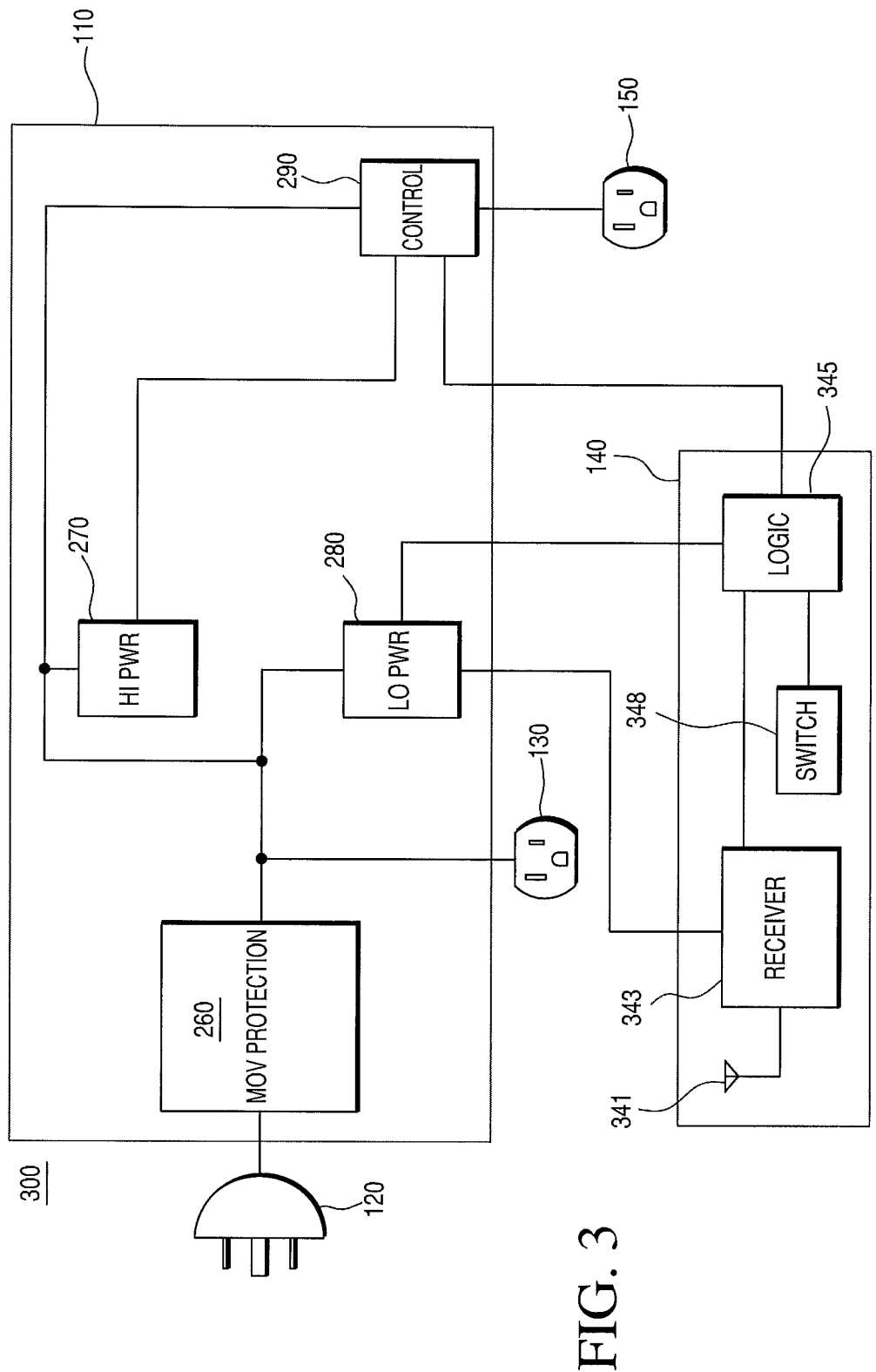
FIG. 3 is a block diagram illustrating another embodiment of the improved electric power supply of FIG. 1 including aspects of the subject matter described herein.

FIG. 3 is a block diagram illustrating another embodiment of an exemplary system for providing a multi-outlet controlled power strip including surge protection and incorporating an improved power supply. Power strip 300 in FIG. 3 is a detailed view of power strip 100 of FIG. 1. As shown in FIG. 3, power strip 300 includes: control circuitry 110, power plug 120, constant "on" outlet(s) 130, command input device 140 (configured as a wireless receiver) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes antenna 341, receiver circuit 343, logic circuit 345 and switch 348. Elements numbered as in FIGS. 1 and/or 2 function in a substantially similarly way.

Antenna 341 of command input device 140 includes an input and an output. The input of antenna 341 is wirelessly coupled and in communication with a transmitter (not shown). The output of antenna 341 is coupled and in communication with receiver circuit 343 of command input device 140. Antenna 341 takes in radiated signals, which include information such as commands, in the form of waves of energy, known as electromagnetic signals, via cable, wire, ambient air, sensors or other mediums. Antenna 341 passes the received signals to receiver circuit 343. In one embodiment, antenna 341 can be a portion of the circuit board that is part of receiver circuit 343, a wire antenna, or a commercially available antenna. Command input device 140 additionally includes switch 348. Switch 348 includes an input and an output. The input of switch 348 is configured to receive commands from a user. The output of switch 348 is coupled to and in communication with logic circuit 345. In some embodiments, switch 348 is implemented as a manual switch. In other embodiments, switch 348 may be implemented as any other user input device capable of performing similar functionality including a mechanical switch in physical communication with logic circuit 345 and the like.

Receiver circuit 343 of command input device 140 includes an input and an output. The input of receiver circuit 343 is coupled and in communication with antenna 341, and the output of receiver circuit 343 is coupled and in communication with logic circuit 345. In one embodiment, receiver circuit 343 is coupled and in communication with LO PWR circuit 280. Receiver circuit 343 is configured to receive received signals from antenna 341, produce a command signal and pass the produced command signal to logic circuit 345. Receiver circuit 343 typically includes a tuner, a detector and an amplifier. The tuner resonates at a particular frequency and amplifies the resonant frequency. The detector detects the command signal within the received signal and extracts the command signal from the received signal. The amplifier amplifies the received command signal. In other embodiments, the same or different components provide substantially similar functionality and may combine functionality of the above described components. Receiver circuit 343 can be implemented as any suitable receiver circuit.

Logic circuit 345 of command input device 140 includes an input and an output. The input of logic circuit 345 is coupled and in communication with receiver circuit 343, switch 348 and LO PWR circuit 280. The output of logic circuit 345 is coupled and in communication with control circuit 290. Logic circuit 345 receives a received command signal from receiver circuit 343, generates an operational signal based on the logic within logic circuit 345 and passes the generated operational signal to control circuit 290. Logic circuit 345 can be implemented as any suitable logic circuit.

In operation, power strip 300 enables a user to wirelessly control the power strip to control when power is supplied to devices, such as, a personal computer or peripherals that are in electrical communication with controlled outlet(s) 150. In the same or a different embodiment, a user can wirelessly control power strip 300 using one or a number of electromagnetic methodologies, such as, for example infrared spectrum, wireless networking spectrum including personal area network (PAN) spectrum, radio frequency (RF) spectrum, light emitting diode (LED) spectrum, and the like. In one embodiment, power strip 300 enables a user to reduce power consumption of the devices in electrical communication with controlled outlet(s) 150 by allowing a user to completely shut power off to her deices.

Figure 4:
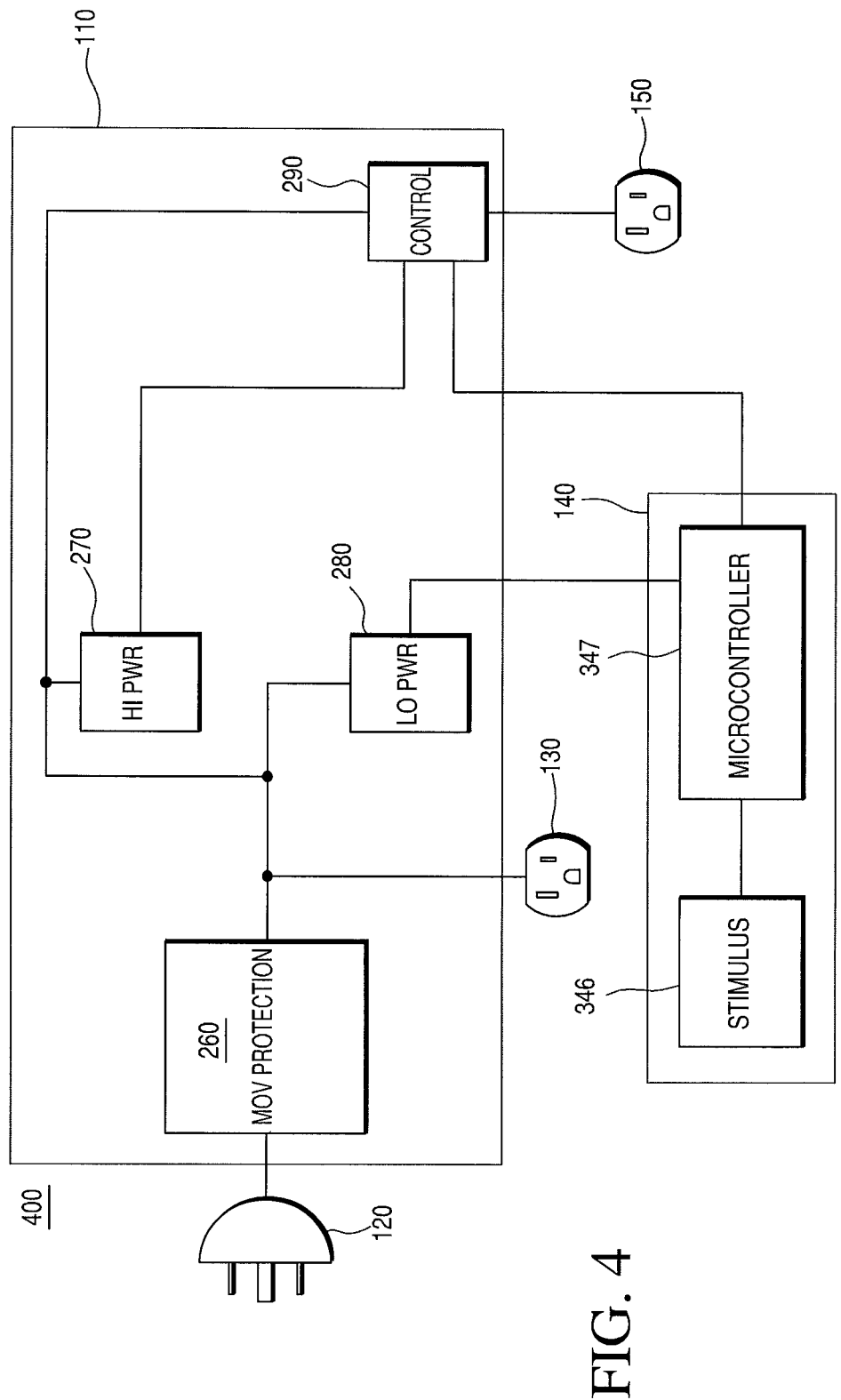
FIG. 4 is a block diagram illustrating yet another embodiment of the improved electric power supply of FIG. 1 including aspects of the subject matter described herein.

FIG. 4 is a block diagram illustrating another embodiment of an exemplary system for providing a multi-outlet controlled power strip including surge protection and incorporating an improved power supply. Power strip 400 in FIG. 4 is a detailed view of power strip 100 of FIG. 1. As shown in FIG. 4, power strip 400 includes: control circuitry 110, power plug 120, constant "on" outlet(s) 130, command input device 140 (configured as a wireless receiver) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes stimulus circuit 446 and microcontroller 447. Elements numbered as in FIGS. 1 and/or 2 function in a substantially similarly way.

Stimulus circuit 446 of command input device 140 includes an input and an output. The input of stimulus circuit 446 is configured to actively or passively sense/detect the presence of a required body within a specified area of the power strip incorporating stimulus circuit 446, such as, for example that of a user within a given distance of power strip 400. In one embodiment, stimulus circuit 446 receives power from microcontroller 447, and in a different embodiment (not shown), stimulus circuit 446 receives power from LO PWR circuit 280. The output of stimulus circuit 446 is coupled and in communication with microcontroller 447 of command input device 140. In some embodiments, stimulus circuit 446 uses an active methodology by radiating energy waves into the area surrounding power strip 400, receiving reflected energy waves from surrounding objects and then producing a command signal which is passed to microcontroller 447. Examples of active energy waves that may be utilized by stimulus circuit 446 include ultrasonic spectrum, radio frequency (RF) spectrum, light emitting diode (LED) spectrum, and the like. In other embodiments, stimulus circuit 446 uses a passive methodology by sensing energy from the area surrounding power strip 400 and then producing a command signal which is passed to microcontroller 447. Examples of active energy waves that may be utilized by stimulus circuit 446 include infrared spectrum, audio spectrum and the like. Stimulus circuit 446 can be implemented as any suitable circuitry.

Microcontroller 447 of command input device 140 includes an input and an output. The input of microcontroller 447 is coupled and in communication with stimulus circuit 446 and LO PWR circuit 280. The output of microcontroller 447 is coupled and in communication with control circuit 290. Microcontroller 447 receives a command signal from stimulus circuit 446, generates an operational signal based on the logic within microcontroller 447 and passes the generated operational signal to control circuit 290. Microcontroller 447 can be implemented as any suitable logic circuit.

In operation, power strip 400 enables a user to control the power strip and determine when power is supplied to devices, such as, a personal computer or peripherals that are in electrical communication with controlled outlet(s) 150. In the same or a different embodiment, a user can control power strip 400 and determine when a user may be nearby using one or a number of active methodologies, such as, for example ultrasonic spectrum, radio frequency (RF) spectrum, light emitting diode (LED) spectrum, and the like. In other embodiments, a user can control power strip 400 and determine when a user may be nearby using one or a number of passive methodologies, such as, for example infrared spectrum, audio spectrum and the like. In one embodiment, power strip 400 enables a user to reduce power consumption of the devices in electrical communication with controlled outlet(s) 150 by allowing a user to completely shut power off to her devices until stimulus circuit 446 determines one or more specific criteria have been met.

Figure 5:
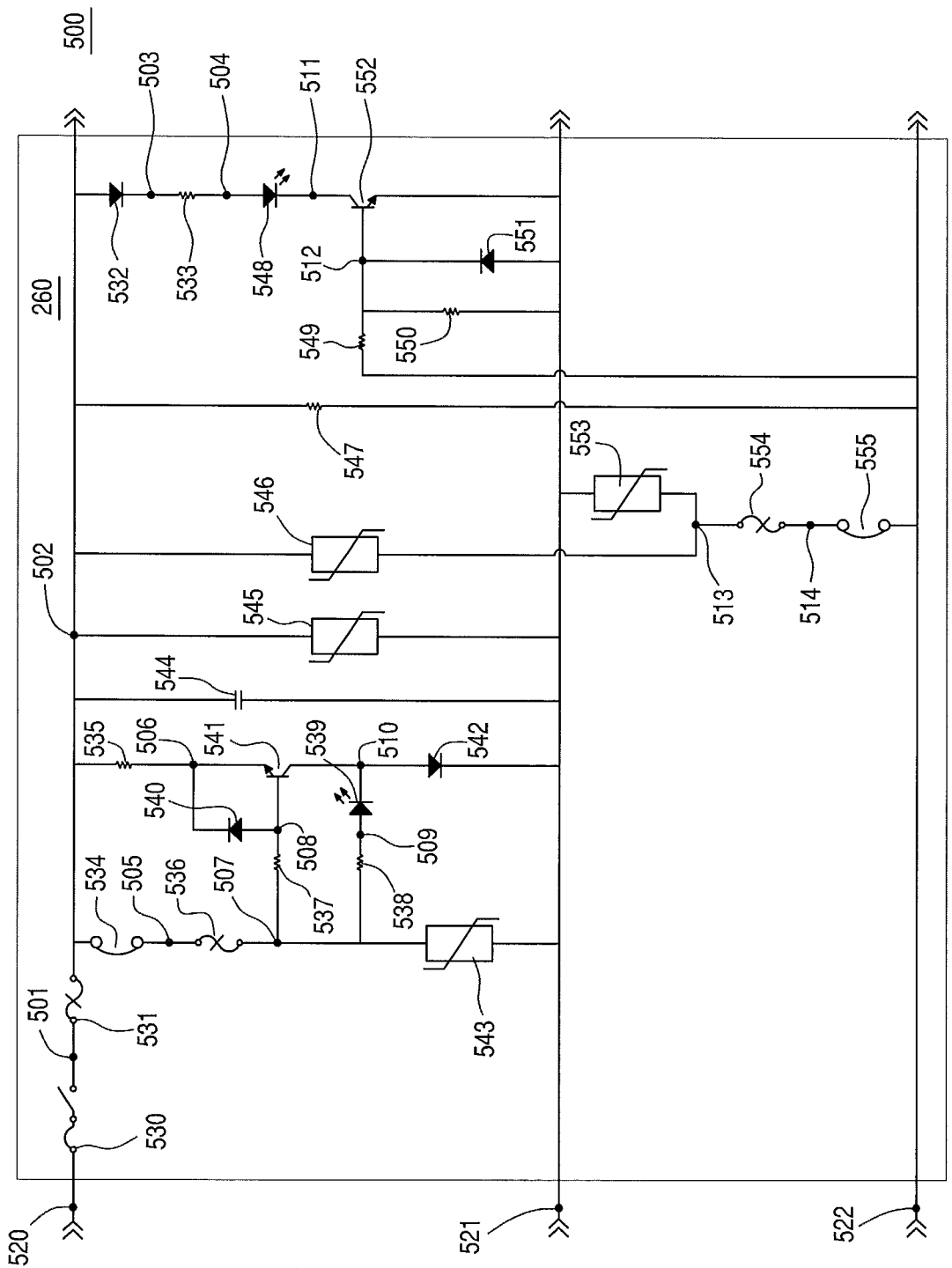
FIG. 5 is a schematic diagram illustrating an embodiment of a metal oxide varistor (MOV) protection circuit portion of FIGS. 2-4 including aspects of the subject matter described herein.

FIG. 5 is a circuit schematic diagram illustrating an embodiment of an exemplary MOV protection circuit 500, such as, for example MOV protection circuit 260 of FIGS. 2-4 above. MOV protection circuit 500 performs the functionality as described in FIGS. 2-4 above by receiving raw power from a power source and providing protected, real power to the remainder of the elements within the circuit, such as, the additional elements described in FIGS. 2-4, above. The concepts underlying MOV protection circuit 500 are known in the art, and therefore only certain portions of MOV protection circuit 500 will be described herein. MOV protection circuit 500 includes a line node 520, a neutral node 521 and a ground node 522 as well as numerous other nodes 501-514. Node 520 is in electrical communication with a line voltage. Node 521 is in electrical communication with the neutral line. Node 522 is in electrical communication with ground.

In FIG. 5, circuit breaker 530 is located between node 520 and node 501, and thermal fuse 531 is located between node 501 and 502. Diode 532 includes an anode coupled to node 502 and a cathode coupled to node 503, and resistor 533 is located between node 503 and 504. Wire fuse 534 is located between node 502 and node 505, thermal fuse 536 is located between node 505 and node 507, and MOV 543 is located between node 507 and node 521. Resistor 535 is located between node 502 and node 506, capacitor 544 is located between node 502 and node 521, MOV 545 is located between node 502 and node 521, and resistor 547 is located between node 502 and node 522. Resistor 537 is located between node 507 and node 508, and diode 540 includes an anode coupled to node 508 and a cathode coupled to node 506. Bipolar junction transistor (BJT) 541 includes a base coupled to node 508, an emitter coupled to node 506 and a collector coupled to node 510. Resistor 538 is located between node 507 and node 509, and LED 539 includes an anode coupled to node 509 and a cathode coupled to node 510. Diode 542 includes an anode coupled to node 510 and a cathode coupled to node 521. MOV 546 is located between node 502 and node 513. LED 548 includes an anode coupled to node 504 and a cathode coupled to node 511. BJT 552 includes a collector coupled to node 511, a base coupled to node 512 and an emitter coupled to node 521. Resistor 549 is located between node 512 and node 522, resistor 550 is located between node 512 and node 521. Diode 551 includes a cathode coupled to node 512 and an anode coupled to node 521. MOV 553 is located between node 521 and node 513, thermal fuse 554 is located between node 513 and node 514, and wire fuse 555 is located between node 514 and node 522.

In FIG. 5, capacitor 544 reduces unwanted signals or noise from external sources. MOVs 543, 546, 553 and 545 reduce unwanted voltage spikes to acceptable levels. Bipolar junction transistor (BJT) 541 and associated components are a "crowbar circuit" to sense when MOV 543 is no longer providing protection and to completely and permanently disable the relocatable power tap, such as, power strip 200 in FIG. 2. BJT 552 and associated components determine if power strip 200 is properly grounded or not and communicate the determination to a user through some type of user interface (e.g., if not properly grounded, light emitting diode (LED) LED 548 lights up to show a fault). Resistor 550 counters the collector leakage current (Icbo) of BJT 552. Diode 532 provides direct current (DC) power for the circuit as well as diode 551, which prevents a reverse bias voltage from biasing the base of BJT 552. In this embodiment, if a connection to ground is lost or was never present, resistors 547 and 549 function to pull the base of BJT 552 "high" thereby causing BJT 552 to conduct and supply power to the light emitting diode LED 548 which when active indicates loss of ground to a user.

In FIG. 5, circuit breaker 530 can be implemented as any suitable circuit breaker. Thermal fuses 531 and 536 can be implemented as any suitable 15 amp, 125 volt thermal fuses. Thermal fuse 554 can be implemented as any suitable five amp, 125 volt thermal fuse. Diodes 540, 532 and 542 can be implemented as any suitable diodes, such as, 1N4007 diodes available from Fairchild Semiconductor Corp of San Jose, Calif. Diode 551 can be implemented as any suitable diode, such as, a 1N4148 diode available from Fairchild Semiconductor Corp of San Jose, Calif. LED 539 can be implemented as any suitable green LED. LED 548 can be implemented as any suitable red LED. Wire fuse 534 can be implemented as any suitable wire fuse having a diameter of 0.3 mm. Wire fuse 555 can be implemented as any suitable wire fuse having a diameter of 0.23 mm. MOVs 543, 546, and 553 can be implemented as any suitable MOVs, such as, GNR20D201K MOVs available from Ceramate of Luchu, Taoyuan, Taiwan. MOV 545 can be implemented as any suitable MOV. BJT 541 can be implemented as any suitable BJT, such as, a KSP94 BJT available from Fairchild Semiconductor Corp of San Jose, Calif. BJT 552 can be implemented as any suitable BJT, such as, an KSP94 BJT available from Fairchild Semiconductor Corp of San Jose, Calif. Capacitor 544 can be implemented as any suitable capacitor. Resistor 537 can be implemented as any suitable 5.1 kΩ/0.5 watt resistor. Resistor 535 can be implemented as any suitable 910Ω/2 watt flame-proof resistor. Resistors 533 and 538 can be implemented as any suitable 39 kΩ/0.25 watt resistors. Resistors 547 and 549 can be implemented as any suitable 2 MΩ/0.5 watt resistors. Resistor 550 can be implemented as any suitable 1 MΩ/0.25 watt resistor. Resistor elements can be obtained from any reputable electronic parts distributor or retailer.

Although the circuit as detailed in FIG. 5 and described above is a typical solution for providing the above described functionality, the functions detailed and described may be implemented using different types of components. For example, the MOVs may be replaced with transient voltage suppressor (TVS) devices, discrete transistor circuits using integrated circuitry, or electromagnetic interference/radio frequency interference (EMI/RFI) suppression circuitry utilizing inductors, transformers and any combination of components to create the required suppression.

Figure 6:
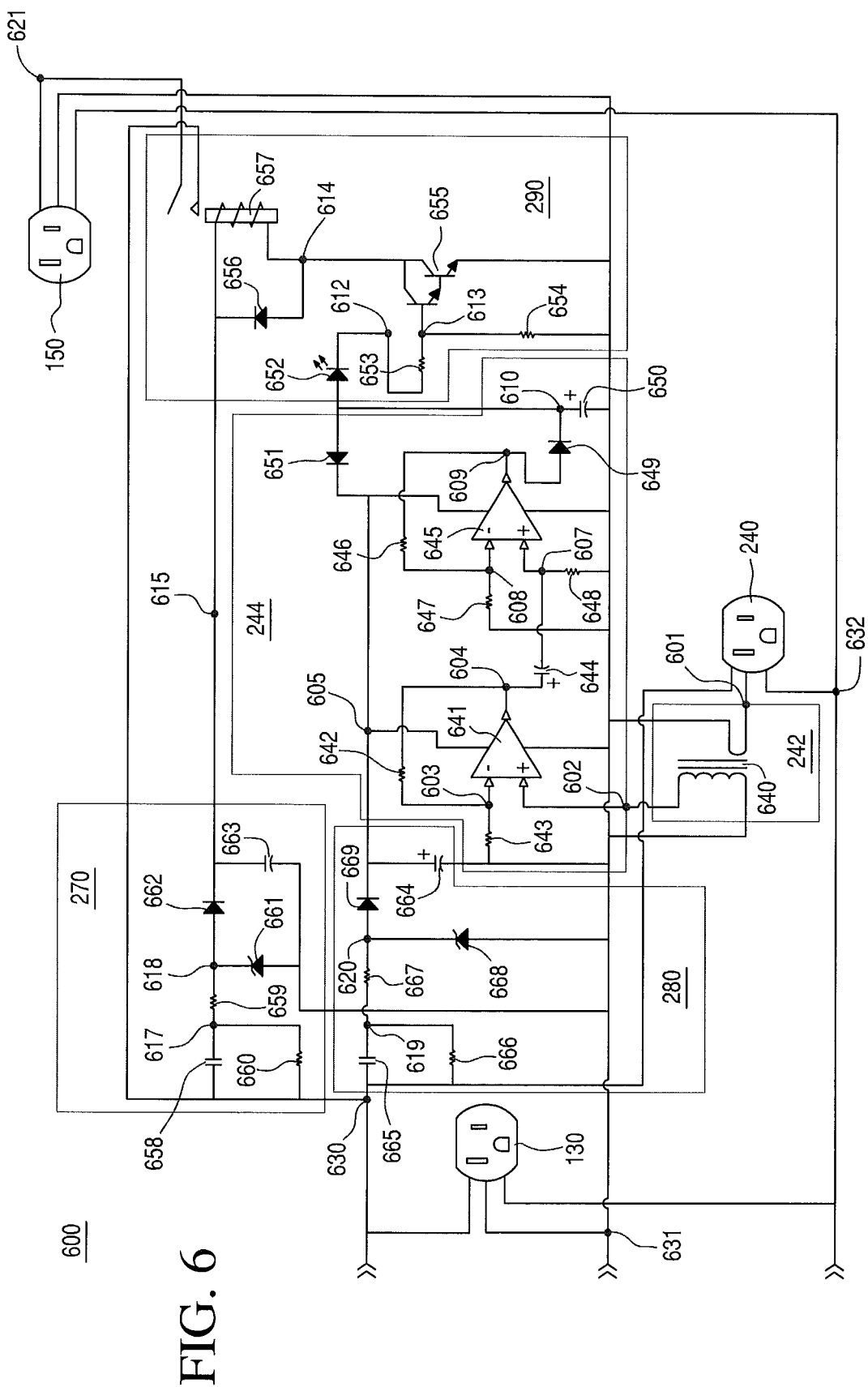
FIG. 6 is a schematic diagram illustrating an embodiment of the improved electric power supply of FIG. 2 that includes aspects of the subject matter described herein.

FIG. 6 is a circuit schematic diagram illustrating an embodiment of a portion of an exemplary system for providing a multi-outlet master/slave power strip incorporating an improved power supply and excluding an MOV portion. Power strip 600 in FIG. 6 is a detailed view of a portion of power strip 200 of FIG. 2, but for clarity, excludes the portion of power strip 200 disclosed and described as MOV protection circuit 500 of FIG. 5. Power strip 600 performs the functionality as described in FIG. 2 by receiving protected power, such as, from an MOV protection circuit (i.e., MOV protection circuit 260 of FIG. 2) and providing multi-outlet master/slave power strip functionality as also described in FIG. 2, above. Power strip 600 includes: master outlet 240, controlled outlet(s) 150, hi-power (HI PWR) circuit 270, low-power (LO PWR) circuit 280, sensing (SENSE) circuit 242, amplification (AMP) circuit 244 and control circuit 290. Power strip 600 includes a line node 630, a neutral node 631 and a ground node 632 as well as numerous other nodes. Node 630 is in electrical communication with a line voltage, and in one embodiment is substantially similar to node 502 in FIG. 5. Node 631 is in electrical communication with the neutral line. Node 632 is in electrical communication with ground. Elements numbered as in FIGS. 1 and/or 2 function in a substantially similarly way.

Master outlet 240 includes a plug receptacle for interfacing with a device power cord as well as three (3) inputs including a line input coupled to a line node 630, a neutral input coupled to node 601 and a ground input coupled to node 632. SENSE circuit 242 includes a current transformer (CT) 640 that includes a primary winding having a first end coupled to node 601 and a second end coupled to node 631. CT 640 additionally includes a secondary winding having a first end coupled to node 631 and a second end coupled to node 602. SENSE circuit 242 is configured to sense when a device that is interfacing with master outlet 240 is drawing current and then provides a sensing signal (SENSE SIG) to AMP circuit 244 based on the current draw. In an embodiment, the neutral input of master outlet 240 passes through the core of SENSE circuit 242 and is coupled to node 631. In some embodiments, when current is drawn by a device coupled via the plug receptacle of master outlet 240, the current flows via a path that is coupled to CT 640 of SENSE circuit 242 and induces a small voltage in the secondary winding of CT 640, the SENSE SIG.

In FIG. 6, AMP circuit 244 includes a first operational amplifier (Op Amp) 641 that includes a non-inverting input coupled to node 602, an inverting input coupled to node 603, an output coupled to node 604, a DC power supply input coupled to node 605 (also called Vcc) and a DC return input coupled to node 631. Resistor 642 is located between node 603 and node 604, and resistor 643 is located between node 603 and node 631. Polarized capacitor 644 includes an anode coupled to node 604 and a cathode coupled to node 607. Op Amp 645 includes a non-inverting input coupled to node 607, an inverting input coupled to node 608, an output coupled to node 609, a DC power supply input coupled to node 605 (also called Vcc) and a DC return input coupled to node 631. In one embodiment, Vcc is a fixed low power DC power signal. Resistor 646 is located between node 608 and node 609, resistor 647 is located between node 608 and node 631, and resistor 648 is located between node 607 and node 631. Diode 649 includes an anode coupled to node 609 and a cathode coupled to node 610. Polarized capacitor 650 includes an anode coupled to node 610 and a cathode coupled to node 631. Finally, diode 651 includes an anode coupled to node 610 and a cathode coupled to node 605.

AMP circuit 244 includes two operational amplifiers configured to receive a SENSE SIG from the secondary winding of CT 640 and produce a driving signal that is provided to control circuit 290. In some embodiments, AMP circuit 244 includes two (2) operational amplifiers (641 and 645) which amplify the voltage signal (SENSE SIG) to produce an amplified control signal (CTRL SIG) and provide the CTRL SIG to control circuit 290. In an example and referring to FIG. 6, SENSE SIG is amplified by the circuit of Op Amp 641, resistor 642 and resistor 643 by a factor of about 61.6 to produce and intermediate control signal. Further to this example, only the AC component of the intermediate control signal is passed by capacitor 644 and impressed across resistor 648. In this example, because there is no DC component, about half the AC signal is lost in the rail making the effective intermediate control signal voltage gain approximately 31. The intermediate control signal is then amplified by the circuit of Op Amp 645, resistor 647 and resistor 646 by a factor of approximately 29.6 with the result that the overall signal voltage gain is about 911 to produce the amplified control signal, CTRL SIG. In this example, the CTRL SIG voltage is peak-detected by the combination of capacitor 650 and diode 649.

In FIG. 6, control circuit 290 includes LED 652 including an anode coupled to node 610 and a cathode coupled to node 612; resistor 653 is located between node 612 and node 613; and resistor 654 is located between node 613 and node 631. Multi-bipolar junction transistor (BJT) circuit 655 is configured as a Darlington pair and includes a base coupled to node 613, a collector coupled to node 614 and an emitter coupled to node 631. Diode 656 includes an anode coupled to node 614 and a cathode coupled to node 615. Relay/switch 657 includes a first end coupled to node 614, a second end coupled to node 615, a stationary normally open contact coupled to node 630 and an armature moving contact coupled to node 621, which is a switch leg.

In operation, the CTRL SIG passes across both LED 652 and resistor 653 to bias BJT circuit 655 into conduction. Biasing BJT circuit 655 turns on or closes relay/switch 657, which energizes controlled outlet(s) 150. In an example, relay/switch 657 is implemented as a single pole, single throw switch. In this embodiment, diode 656 absorbs counter electromagnetic fields (EMF) from relay/switch 657; resistor 654 is used to counter Icbo from BJT circuit 655; and diode 651 discharges capacitor 650 on shutdown of power strip 600.

In FIG. 6, HI PWR circuit 270 includes capacitor 658 located between node 630 and node 617; resistor 659 is located between node 617 and node 618; and diode 662 includes an anode coupled to node 618 and a cathode coupled to node 615. Resistor 660 is located between node 630 and node 617. Zener diode 661 includes a cathode coupled to node 618 and an anode coupled to node 631, and polarized capacitor 663 includes an anode coupled to node 615 and a cathode coupled to node 631.

In operation, capacitor 658 is a reactive voltage divider, which supplies a reduced current limited voltage to resistor 659 and zener diode 661. Additionally, in this embodiment resistor 660 functions as a bleeder resistor and resistor 659 provides additional resistance in the event of over-voltages. Further to the embodiment, zener diode 661 and diode 662 are configured to provide 24 volts for a half wave rectified power signal. Additionally, in this embodiment, diode 662 is located and configured so that, during the opposite half cycle, polarized capacitor 663 is not discharged into zener diode 661, which is configured to be forward biased. Further to the embodiment, polarized capacitor 663 stores and smoothes out the energy required to run the control circuit 290. In an example, HI PWR circuit 270 supplies variable (high and low) DC power signals to control circuit 290 via node 615, and further supplies an AC power signal to relay/switch 657 via node 630.

In FIG. 6, LOW PWR circuit 280 includes a polarized capacitor 664, which includes an anode coupled to node 605 and a cathode coupled to node 606. Capacitor 665 is located between node 619 and node 630, and resistor 666 is also located between node 619 and node 630. Resistor 667 is located between 619 and 620. Zener diode 668 includes a cathode coupled to node 620 and an anode coupled to node 631, and diode 669 includes an anode coupled to node 620 and a cathode coupled to node 605.

In operation, capacitor 665 is a reactive voltage divider that supplies a reduced current limited voltage to resistor 667 and zener diode 668. Additionally, in this embodiment, resistor 666 functions as a bleeder resistor, and resistor 667 provides additional resistance in the event of over-voltages. In an example, zener diode 668 and diode 669 are configured to provide 6.2 volts for a half wave rectified power signal. Additionally, in this embodiment diode 669 is located and configured so that, during the opposite half cycle, capacitor 664 is not discharged into diode 669, which is configured to be forward biased. Further to the embodiment, capacitor 664 stores and smoothes out the energy required to run the AMP circuit 244.

In the power supply portion of power strip 600, the two power circuits (HI PWR circuit 270 and LO PWR circuit 280) are substantially similar in design, but have different power values to supply to other portions of power strip 600. Utilizing a dual power supply methodology allows for a more efficient delivery of power (24V and 6.2V) to downstream active elements of power strip 600. The efficiency is realized as a single supply supplying dual voltages that are substantially different from what would be required by a resistive methodology to voltage divide the voltage down, thereby producing heat and wasting additional power.

Each of controlled outlet(s) 150 includes a plug receptacle for interfacing with a device power cord as well as three (3) inputs including a line input coupled to relay/switch 657, a neutral input coupled to node 631 and a ground input coupled to node 632. Each of constant "on" outlet(s) 130 include a plug receptacle for interfacing with a device power cord as well as three (3) inputs including a line input coupled to node 630, a neutral input coupled to node 631 and a ground input coupled to node 632.

In FIG. 6, CT 640 can be implemented as any suitable current transformer. Op Amps 641 and 645 can be implemented as any suitable operational amplifiers, such as, for example LM358 operational amplifiers available from Fairchild Semiconductor Corp of San Jose, Calif. Diodes 649, 651, 656, 662 and 669 can be implemented as any suitable diodes, such as, 1N4007 diodes available from Fairchild Semiconductor Corp of San Jose, Calif. Zener Diode 661 can be implemented as any suitable 24 volt Zener diode. Zener Diode 668 can be implemented as any suitable 6.2 volt Zener diode. LED 652 can be implemented as any suitable green LED. Relay/switch 657 can be implemented as any suitable single pole, single throw (SPST) relay. Multi-BJT circuit 655 can be implemented as any suitable multi-BJT, such as, an KSP13 BJT available from Fairchild Semiconductor Corp of San Jose, Calif. Resistors 660 and 666 can be implemented as any suitable 1 MΩ resistors. Resistors 659 and 667 can be implemented as any suitable 100Ω flame-proof resistors. Polarized capacitors 650 and 663 can be implemented as any suitable 100 µF polarized capacitors. Resistor 642 can be implemented as any suitable 20 kΩ resistor. Resistor 643 can be implemented as any suitable 330Ω resistor. Resistor 646 can be implemented as any suitable 160 kΩ resistor. Resistor 647 can be implemented as any suitable 5600Ω resistor. Resistor 648 can be implemented as any suitable 5100Ω resistor. Resistor 653 can be implemented as any suitable 1 kΩ resistor. Resistor 654 can be implemented as any suitable 3 kΩ resistor. Polarized capacitor 644 can be implemented as any suitable 1 µF polarized capacitor. Capacitor 658 can be implemented as any suitable 330 nF capacitor. Polarized capacitor 664 can be implemented as any suitable 330 µF polarized capacitor. Capacitor 665 can be implemented as any suitable 220 nF capacitor. Resistor and capacitor elements can be obtained from any reputable electronic parts distributor or retailer.

Figure 7:
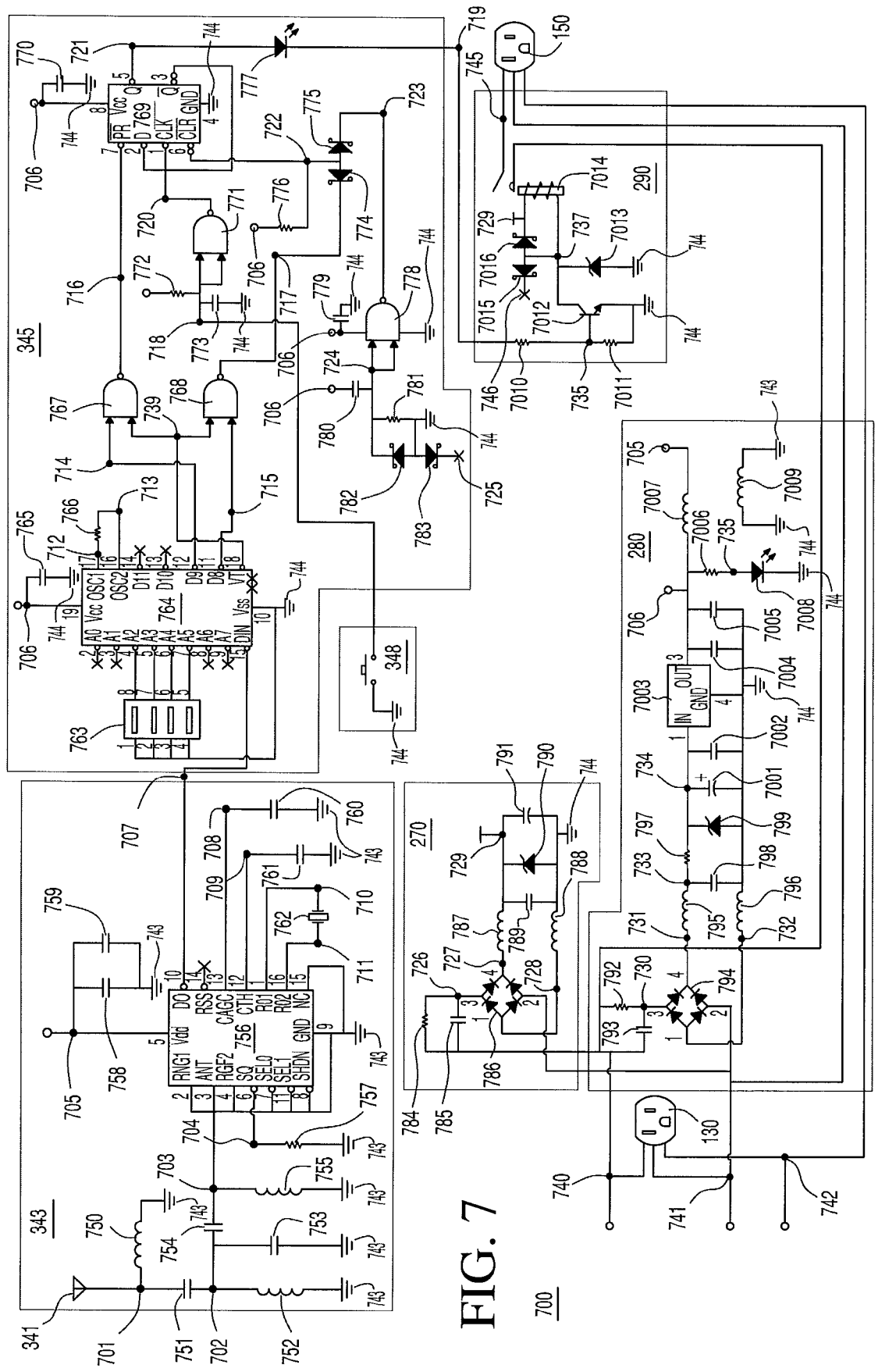
FIG. 7 is a schematic diagram illustrating an embodiment of the improved electric power supply of FIG. 3 that includes aspects of the subject matter described herein.

FIG. 7 is a circuit schematic diagram illustrating an embodiment of a portion of an exemplary system for providing a multi-outlet controlled power strip incorporating an improved power supply and excluding an MOV portion. The power strip 700 in FIG. 7 is a detailed view of a portion of power strip 300 of FIG. 3, but for clarity, excludes the portion of power strip 300 disclosed and described as MOV protection circuit 500 of FIG. 5. Power strip 700 performs the functionality as described in FIG. 3 by receiving protected power, such as, from an MOV protection circuit (i.e., MOV protection circuit 260 of FIG. 3) and providing multi-outlet controlled power strip functionality as also described in FIG. 3, above. Power strip 700 includes constant "on" outlet(s) 130, controlled outlet(s) 150, hi-power (HI PWR) circuit 270, low-power (LO PWR) circuit 280, control circuit 290, antenna 341, receiver circuit 343, logic circuit 345, and manual switch 348. In some embodiments, antenna 341 is configured as part of receiver circuit 343. Power strip 700 includes a line node 740, a neutral node 741 and a ground node 742 as well as numerous other nodes. Node 740 is in electrical communication with a line voltage, and in one embodiment is substantially similar to node 502 in FIG. 5. Node 741 is in electrical communication with the neutral line. Node 742 is in electrical communication with ground. Elements numbered as in FIGS. 1, 2 and/or 3 function in a substantially similarly way.

In FIG. 7, receiver circuit 343 includes an antenna 341 and receiver chip 756 as well as other elements that will be described below. Receiver circuit 343 includes antenna 341 that is coupled to node 701. Inductor 750 is located between node 701 and a radio frequency ground (RFGND) 743, and capacitor 751 is located between node 701 and node 702. Inductor 752 is located between node 702 and RFGND 743, and capacitor 753 is located between node 702 and RFGND 743. Capacitor 754 is located between node 702 and node 703, and inductor 755 is located between node 703 and RFGND 743. Receiver chip 756 includes: an antenna pin ANT coupled to node 703; a power supply pin Vdd coupled to node 705; a DO pin coupled to node 707; a CAGC pin coupled to node 708; a CTH pin coupled to node 709; a RO1 pin coupled to node 710; a RO2 pin coupled to node 711; and a RNG1 pin, a RFG2 pin, a SEL0 pin, a SEL1 pin, a SHDN pin, an NC pin and a GND pin coupled to RFGND 743. Resistor 757 is located between node 704 and RFGND 743. Capacitor 758 is located between node 705 and RFGND 743, and capacitor 759 also is located between node 705 and RFGND 743. Capacitor 760 is located between node 708 and RFGND 743, and capacitor 761 is located between node 709 and RFGND 743. Crystal 762 is located between node 710 and node 711.

In FIG. 7, logic circuit 345 includes an address selector switch 763, decoder 764, integrated circuit 769, as well as other elements. Switch 763 is an addressable selector switch and includes four (4) input pins that are coupled to GND 744 and four output pins that are coupled to pins A2-A5 of decoder 764. In other embodiments, switch 763 may be configured to include more, or less, pins with a corresponding reduction or increase in associated pins on decoder 764. Decoder 764 additionally includes: a power supply pin Vcc coupled to node 706; an OSC1 pin coupled to node 712; an OSC2 pin coupled to node 713; a D9 pin coupled to node 714; a D8 pin coupled to node 715; a VT pin coupled to node 739; and a Vss pin coupled to GND 744. Capacitor 765 is located between node 706 and GND 744. Resistor 766 is located between node 712 and node 713. Logic chips 767 is a NAND gate logic chip having a first input coupled to node 714, a second input coupled to node 739, and an output coupled to node 716. Logic chips 768 is a NAND gate logic chip having a first input coupled to node 739, a second input coupled to node 715, and an output coupled to node 717. Integrated circuit 769 includes: a Vcc pin coupled to node 706; an inverted PR pin coupled to node 716; a D pin coupled to an inverted Q pin of integrated circuit 769; a CLK pin coupled to node 720; an inverted CLR pin coupled to node 722; a Q pin coupled to node 721; and a GND pin coupled to GND 744. Capacitor 770 is coupled between node 706 and GND 744. Logic chips 771 is a NAND gate logic chip having a first input coupled to node 718, a second input also coupled to node 718, and an output coupled to node 720. Resistor 772 is located between node 718 and node 706, and capacitor 773 is located between node 718 and GND 744. Manual Switch 348 includes an output pin coupled to node 718 and a ground pin coupled to GND 744. A diode pair includes a first diode 774 having an anode coupled to node 722 and a cathode coupled to node 717, and a second diode 775 having an anode coupled to node 722 and a cathode coupled to node 723. Resistor 776 is located between node 722 and node 706. Switch power LED 777 includes an anode coupled to node 721 and a cathode coupled to node 719. Logic chip 778 is a NAND gate logic chip having a first input coupled to node 724, a second input also coupled to node 724 and an output coupled to node 723, a DC power supply input coupled to node 706 and a DC return input coupled to GND 744. Capacitor 779 is located between node 706 and GND 744. Capacitor 780 is located between node 706 and node 724, and resistor 781 is located between node 724 and GND 744. A diode pair includes a first diode 782 having a cathode coupled to node 724 and an anode coupled to GND 744 and a second diode 783 having a cathode coupled to node 725 and an anode coupled to GND 744. In one embodiment, logic chips 767, 768, 771 and 778 are implemented as NAND gates with Schmitt Triggers.

In operation, a user determines when the peripheral devices receiving power from controlled outlet(s) 150 should be enabled or disabled. The user sends an encoded signal to the unit to perform the on or off function. Antenna 341 receives the electromagnetic radiation and converts it into an electrical signal. Receiver circuit 343 selects or tunes the signal, amplifies it, and then recovers the digital signal embedded in the transmission. Receiver circuit 343 then supplies the digital signal to decoder 764 within logic circuit 345 which determines if the transmitted signal belongs to power strip 700 and the type of signal, such as, whether it is an on or an off signal. An on signal forces the flip/flop of integrated circuit 769 to output a one, and an off signal forces the flip/flop of integrated circuit 769 to output a zero. The switch 348, if pressed, changes the flip/flop to the next state. A one turns on LED 777, transistor BJT 7012, and relay circuit 7014 (elements described below); which energizes the controlled outlet(s) 150. A zero turns everything off. The power supply comprises of two modules, one to generate power for the relay and one for the rest of the circuitry. This feature is part of the energy savings scheme.

Further to the above, the received electromagnetic signal is processed through a preselect/matching filter composed of inductors 750, 752 and 755 and capacitors 751, 753 and 754. This filter matches the output impedance of antenna 341 to the input impedance of the receiver circuit 343. This process additionally helps to attenuate any out of channel signals resulting in pre-tuning the receiver. The signal is next passed into receiver chip 756 and is further tuned to a single frequency with a relatively narrow bandwidth, thus screening out most all other signals, resulting in obtaining the signal of interest. Receiver chip 756 amplifies this signal and utilizes a detection methodology to recover the embedded digital signal. Capacitors 758 and 759 remove any signals from receiver circuit 343 that could find their way in from a power supply. Crystal 762 provides a precise frequency used to run the tuning circuit. Resistor 757 is a zero ohm resistor and if removed allows the squelch feature of the radio to be used. Capacitor 761 is used in the detection circuit of receiver chip 756 and stores a relative threshold value for receiver chip 756 to determine whether to output a logic one or a logic zero signal in the serial data output. Capacitor 753 is used in the Automatic Gain Control ("AGC") circuit of the receiver. AGC is used to adjust the gain of the radio to a value fixed relative to the detector requirements for reliable output data.

The tuned signal is fed into decoder 764, which decodes this serial data into address and function. The address is checked against the value set on switch 763. If there is a match, then an on or off function is output depending on the match data, with an "on" output passing to port pin D9 of decoder 764 and an "off" output passing to port pin D8 of decoder 764. Resistor 766 sets an internal RC generated clock frequency to run the decoder 764. Capacitor 765 prevents power supply noise from leaving or entering decoder 764. Additionally, capacitor 770 and capacitor 779 perform the same function on integrated circuit 769 and logic chips 767, 768, 771 and 778, respectively.

If decoder 764 recognizes a valid address, then pin VT is set "high" for the address time, which allows the function signal to pass through a transmission gate made up of logic chips 767 and 768. If the signal is a "one," it is fed directly into the flip/flop integrated circuit 769 preset (PR bar) pin and forces a "one" resulting in an "on" signal at the Q output. The opposite signal, in this case a "zero," is fed into the D input of the flip/flop from the Q-bar output of integrated circuit 769. If a clock signal is fed into the CLK input of the flip/flop, then it will change state. Whenever a clock signal is received at the CLK input, the flip/flop will change state. The clock signal originates from logic chips 771, which is a Schmitt triggered gate. The gate receives a signal from switch 348 every time the user presses the switch button of switch 348. The switch signal from switch 348 is de-bounced by resistor 772 and capacitor 773. When the user presses the button associated with switch 348, controlled outlet(s) 150 change state. The "off" signal from the transmission gate (i.e., logic chips 767 and 768) goes through an "OR" gate composed of resistor 776 and diode-pair 774 and 775. The "off" signal passes to the CLR-bar pin of the flip/flop. Receiving the "off" signal forces LED 777, BJT 7012 and relay circuit 7014 of control circuit 290, and controlled outlet(s) 150 to switch "off." Because there is an "OR gate" logic circuit within logic circuit 345, the other signal that forces everything to the "off" state is a power on reset. This signal is generated at power "on" by logic chip (e.g., Schmitt trigger gate) 778, capacitor 780 and resistor 781. One side of diode-pair 782 and 783 quickly discharges capacitor 780 to prepare capacitor 780 to help generate another power on reset signal if required. When flip/flop circuit is "on," as defined by the Q output of integrated circuit (IC) 769 is a "one" or "high," then current flows through the LED 777 causing it to light up and indicate that the controlled outlet(s) 150 are "on."

In FIG. 7, HI PWR circuit 270 includes a resistor 784 located between node 740 and node 726, and a capacitor 785 located between node 740 and node 726. Full-wave bridge rectifier 786 includes a pin1 coupled to node 728, a pin2 coupled to node 741, pin3 coupled to node 726, and pin4 coupled to node 727. Inductor 787 is located between node 727 and node 729. Inductor 788 is located between node 728 and node GND 744. Capacitor 789 is located between node 729 and GND 744, Zener diode 790 includes an anode coupled to GND 744 and a cathode coupled to node 729, and polarized capacitor 791 includes an anode couple to node 729 and a cathode coupled to GND 744.

In FIG. 7, LO PWR circuit 280 includes a resistor 792 located between node 730 and 740, and capacitor 793 is located between node 730 and 740. Full-wave bridge rectifier 794 includes a pin1 coupled to node 732, a pin2 coupled to node 741, pin3 coupled to node 730, and pin4 coupled to node 731. Inductor 795 is located between node 731 and node 733, and inductor 796 is located between node 732 and GND 744. Resistor 797 is located between node 733 and node 734, and capacitor 798 is located between node 733 and GND 744. Zener diode 799 includes an anode coupled to GND 744 and a cathode coupled to node 734; polarized capacitor 7001 includes an anode couple to node 734 and a cathode coupled to GND 744; and capacitor 7002 is located between node 734 and GND 744. Low drop-out (LDO) regulator 7003 includes an input pin coupled to node 734, an output pin coupled to node 706, and a ground pin coupled to GND 744. Capacitor 7004 is located between node 706 and GND 744, and capacitor 7005 is located between node 706 and GND 744. Resistor 7006 is located between node 706 and node 735. Inductor 7007 is located between node 706 and node 705. LED 7008 includes an anode coupled to node 735 and a cathode coupled to GND 744. Inductor 7009 is located between RFGND 743 and GND 744.

Because HI PWR circuit 270 and LO PWR circuit 280 are similar but with different values to supply power as required, only one will be described in detail, as the other is functionally the same. Capacitor 793 of LO PWR circuit 280 is a reactive voltage divider, which supplies a reduced voltage that is current limited to resistor 797 and LDO regulator 7003. Resistor 792 is a bleeder resistor. Capacitor 798, inductors 795 and 796, resistor 797 and Zener diode 799 provide protection in the event of over voltages. Full-wave bridge rectifier 794 converts the incoming AC power to DC. Capacitors 7001 and 7002 further protect against surge voltages, help smooth the incoming rectified voltage and provide a broad band low impedance source for LDO regulator 7003. LDO regulator 7003 is an active low drop out regulator, which provides a fixed voltage output for receiver circuit 343 and logic circuit 345. Capacitors 7004 and 7005 further smooth the output voltage and provide a required pole for LDO regulator 7003. Inductors 7007 and 7009 isolate noise generated in the logic circuit from the radio. Resistor 7006 and LED 7008 are not used to generate power, but are an indicator circuit providing an indicator light when two conditions are both met. The two conditions are: (1) that constant "on" outlet(s) 130 have power; and (2) the main MOVs of MOV protection circuit 500 in FIG. 5 have not failed.

Utilizing HI PWR circuit 270 and LO PWR circuit 280 as a two section power supply design reduces power consumption of the power supply. In operation and understanding that power is a function of voltage times current, if a circuit will operate at some fixed current level, but at various voltages, then choosing the lowest voltage will use the least amount of power. Therefore, the low voltage supply (i.e., LO PWR circuit 280) is used to generate low voltage power for the radio and logic circuitry. This configuration uses the minimal amount of power for the low voltage circuitry because the reactive input power supply wastes no real power to generate the low voltage from the high voltage AC line power. The voltage for the relay is the high voltage supply (i.e., HI PWR circuit 270). Like the low voltage supply, the high voltage supply uses a reactive input to drop the line voltage to the voltage required for the relay. The high voltage supply is also a "soft" supply. That is, the voltage drops while a load current is drawn from the supply, providing even more of a power savings. The uniqueness of this approach as compared to the more traditional single power supply approach is that a power savings as high as 4 to 1 can be achieved over the traditional method.

In FIG. 7, control circuit 290 includes resistor 7010 that is located between node 719 and node 735, and resistor 7011 is located between node 735 and GND 744. Bipolar transistor BJT 7012 includes a base coupled to node 735, a collector coupled to node 737, and an emitter coupled to GND 744. Zener diode 7013 includes a cathode coupled to node 737 and an anode coupled to GND 744. Relay circuit 7014 includes a first end coupled to node 737, a second end coupled to node 729, a stationary normally open contact coupled to node 740 and an armature moving contact coupled to node 745, which is a switch leg. A diode pair includes a first diode 7015 having a cathode coupled to node 746 and an anode coupled to node 737 and a second diode 7016 having a cathode coupled to node 729 and an anode also coupled to node 737.

In operation, current flows from logic circuit 345 to control circuit 290 through resistor 7010, which limits the current for both LED 777 and the base of BJT 7012. When current flow through resistor 7010, BJT 7012 turns "on" and allows current to flow in the coil of relay circuit 7014 of control circuit 290 causing relay circuit 7014 to close its contacts and supply power to the controlled outlet(s) 150. If the flip/flop circuit of logic circuit 345 is "off," as defined by the Q output of integrated circuit 769 is zero or "low," then the LED 777 is not forward biased, and BJT 7012, relay circuit 7014, and controlled outlet(s) 150 are "off." When controlled outlet(s) 150 are "off," there is no current flow into the base of BJT 7012 other than Icbo. Because the Icbo leakage current could turn the transistor on, resistor 7011 drains any BJT 7012 Icbo to a safe level thereby preventing BJT 7012 from turning "on." Only one half of the diode-pair including diodes 7015 and 7016 (7016 across the relay coil) is used for counter EMF when BJT 7012 turns off. Zener diode 7013 is used to protect BJT 7012 against surge voltage from the AC line that pass through the power supply.

Figure 8:
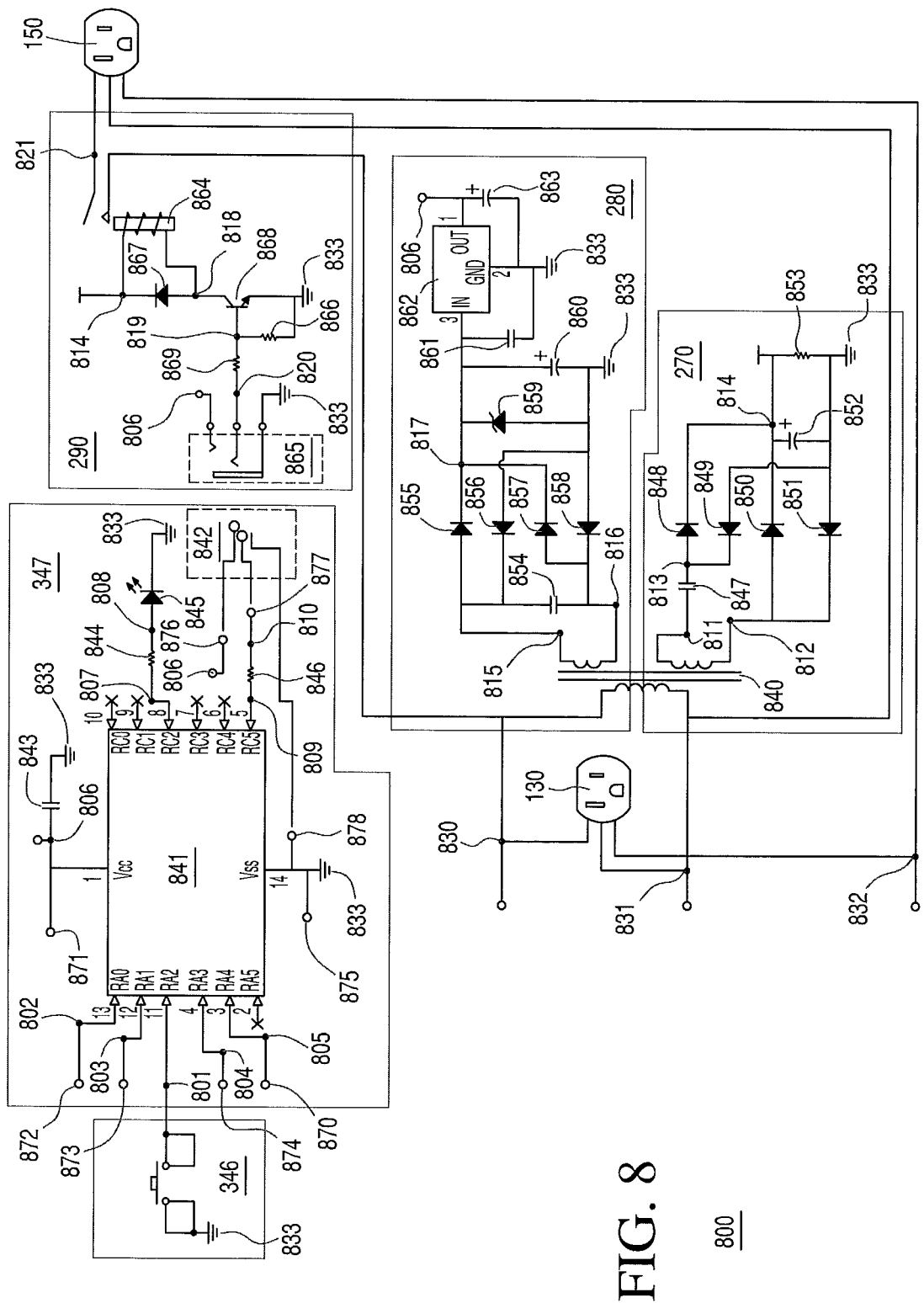
FIG. 8 is a schematic diagram illustrating an embodiment of the improved electric power supply of FIG. 4 that includes aspects of the subject matter described herein.

In FIG. 7, receiver chip 756 can be implemented as any suitable receiver chip, such as, for example a MICRF211 available from Micrel Inc of San Jose, Calif. Crystal 762 can be implemented as any suitable crystal device having a frequency of 13.52127 MHz. Address selector switch 763 can be implemented as any suitable 4 position DIP address selector switch. Decoder 764 can be implemented as any suitable logic chip, such as, for example a HT12D available from Holtek Semiconductor Inc. of Fremont, Calif. NAND gate logic chips 767, 768, 771 and 778 can be implemented as any suitable NAND gate logic chips, such as, for example a MM74HC132 available from Fairchild Semiconductor Corp of San Jose, Calif. Integrated circuit 769 can be implemented as any suitable logic chip, such as, for example a NC7SZ74 available from Fairchild Semiconductor Corp of San Jose, Calif. LDO regulator 7003 can be implemented as any suitable LDO regulator, such as, for example a LP2950ACDT-3.3 available from ON Semiconductor of Phoenix, Ariz. BJT 7012 can be implemented as any suitable BJT. Relay circuit 7014 can be implemented as any suitable single pole, single throw (SPST) relay. Diode—pairs 774 and 775, 782 and 783, and 7015 and 7016 can be implemented as any suitable diode—pair device, such as, for example a BAS40SL available from Fairchild Semiconductor Corp of San Jose, Calif. Full-wave bridge rectifiers 786 and 794 can be implemented as any suitable full-wave bridge rectifier, such as, for example a S1ZB60 available from Shindengen America, Inc of Bannockburn, Ill. LEDs 777 and 7008 can be implemented as any suitable green LEDs. Zener Diode 790 can be implemented as any suitable 24 volt Zener diode. Zener Diode 799 can be implemented as any suitable 4.7 volt Zener diode. Zener Diode 7013 can be implemented as any suitable 27 volt Zener diode. Inductors 787, 788, 795, 796, 7007, and 7009 are inductors having 1 kΩ at 100. Inductor 750 can be implemented as any suitable 30 nH inductor. Inductor 752 can be implemented as any suitable 24 nH inductor. Inductor 755 can be implemented as any suitable 39 nH inductor. Capacitors 758, 761, 765, 770, 779, 789, 798, 7002, and 7004 can be implemented as any suitable 0.1 μF capacitors. Capacitors 759, 760 and 7005 can be implemented as any suitable 4.7 μF capacitors. Capacitors 773 and 780 can be implemented as any suitable 0.22 μF capacitors. Capacitor 751 can be implemented as any suitable 1.2 pF capacitor. Capacitor 753 can be implemented as any suitable 5.6 pF capacitor. Capacitor 785 can be implemented as any suitable 0.15 μF capacitor. Capacitor 793 can be implemented as any suitable 0.27 μF. Polarized capacitors 791 and 7001 can be implemented as any suitable 100 μF at 50 volts polarized capacitors. Resistors 784 and 792 can be implemented as any suitable 470 kΩ resistors. Resistor 766 can be implemented as any suitable 32.4 kΩ resistor. Resistor 772 can be implemented as any suitable 22.11 kΩ resistor. Resistor 776 can be implemented as any suitable 20.0 kΩ resistor. Resistor 781 can be implemented as any suitable 200 kΩ resistor. Resistor 797 can be implemented as any suitable 510Ω resistor. Resistor 7006 can be implemented as any suitable 3010Ω resistor. Resistor 7010 can be implemented as any suitable 1630Ω resistor. Resistor 7011 can be implemented as any suitable 100 kΩ resistor. Resistor and capacitor elements can be obtained from any reputable electronic parts distributor or retailer FIG. 8 is a circuit schematic diagram illustrating an embodiment of a portion of an exemplary system for providing a multi-outlet controlled power strip incorporating an improved power supply and excluding an MOV portion. The power strip 800 in FIG. 8 is a detailed view of a portion of power strip 400 of FIG. 4 but for clarity, excludes the portion of power strip 400 disclosed and described as MOV protection circuit 500 of FIG. 5. Power strip 800 performs the functionality as described in FIG. 4 by receiving protected power, such as, from an MOV protection circuit (i.e., MOV protection circuit 260 of FIG. 3) and providing multi-outlet controlled power strip functionality as also described in FIG. 4, above. Power strip 800 includes constant "on" outlet(s) 130, controlled outlet(s) 150, hi-power (HI PWR) circuit 270, low-power (LO PWR) circuit 280, control circuit 290, stimuli circuit 346, logic circuit 347, and transformer 840. Power strip 800 includes a line node 830, a neutral node 831, and a ground node 832. Node 830 is in electrical communication with a line voltage, and in one embodiment is substantially similar to node 502 in FIG. 5. Node 831 is in electrical communication with the neutral line. Node 832 is in electrical communication with ground. Elements numbered as in FIGS. 1, 2 and/or 4 function in a substantially similarly way. Transformer 840 includes a primary winding, a low-power secondary winding in electromagnetic communication with the primary winding and a hi-power secondary winding in electromagnetic communication with the primary winding. The primary winding of transformer 840 includes a first tap that is in electrical communication with node 830, and a second tap that is in electrical communication with node 831. Transformer includes additional elements that will be described further below. Additionally, stimuli circuit 346 is configured as a manual switch input circuit. In some embodiments, stimuli circuit 346 can be configured as any number of different stimuli circuits, such as, for example as a motion sensor circuit, a thermal sensor circuit, an ultrasonic sensor, and the like. FIG. 8 illustrates a line isolated power supply that may be utilized for safety concerns when part(s) of a circuit are accessible to the user.

In operation, a user, and/or the device, depending on the input stimulus, determines when the peripheral devices should be supplied with power. In some embodiments, the user presses a button to switch on the switched outlets and start a timer, which then ends the sequence. In other embodiments, other input stimuli may completely automate the process, or the process may be completely manual, or some combination thereof. In one embodiment, power strip 800 operates as follows: a press of a switch sends an instruction signal to a microcontroller to turn on an LED and the circuitry associated with activating a relay, which energizes the controlled outlets; after a fixed time, the LED will start to blink on and off; if the button is not activated in the next short time window, the microcontroller turns the controlled outlets "off;" and if the button is pressed, the LED stays "on," the relay remains "on" and the timer resets and restarts. In other embodiments, depending on the stimulus and the programming, different or all portions of the sequence may be automated. As with previous embodiments the power supply consists of two modules, one to generate power for the relay and one for the rest of the circuitry, and again this feature is part of the energy savings scheme.

In FIG. 8, logic circuit 347 includes a logic chip 841 and an electrical plug 842, as well as other elements that will be described below. In some embodiments, electrical plug 842 allows for the logic circuit 347 portion of power strip 800 to be removed from the circuit, if necessary. Logic chip 841 includes: an RA0 pin coupled to node 802; a RA1 pin coupled to node 803, a RA2 pin coupled to node 801, a RA3 pin coupled to node 804, a RA4 pin coupled to node 805, a power supply pin Vcc coupled to node 806, a RC2 pin coupled to node 807, a RC5 pin coupled to node 809, and a Vss pin coupled to GND 833. Test pin 870 is coupled to node 805; programming pad 871 is coupled to node 806; programming pad 872 is coupled to node 802; programming pad 873 is coupled to node 803; programming pad 874 is coupled to node 804; and programming pad 875 is coupled to node GND 833. In some embodiments, pins RA0-RA3 are configured as programming pins, and pin RA4 is configured to provide clock information, such as, for example for programming support. Capacitor 843 is located between node 806 and GND 833. Resistor 844 is located between node 807 and node 808. LED 845 includes an anode coupled to node 808 and a cathode coupled to GND 833. Resistor 846 is located between node 809 and node 810. Electrical plug 842 includes a first pin coupled to node 806, a second pin coupled to node 810 and a third pin coupled to GND 833. In operation, each of the pins of electrical plug 842 mechanically and coupled to a corresponding female connector located within jack 865 of control circuit 290.

In operation, logic chip 841 is implemented as a microcontroller that is programmed for the sequence through signals applied at programming pads 871-875. A timing test signal can be measured at test pin 870 when test code is invoked. Capacitor 843 is used to help isolate digital noise from the power supply. At the start of the fixed time period described above, current flows through resistor 844 to LED 845 and the LED illuminates. Resistor 844 limits the current. In one embodiment, logic circuit 347 is a separate module from the outlet strip and is electrically connected through electrical plug 842 of logic circuit 347 and jack 865 of control circuit 290. In one embodiment, electrical plug 842 is implemented as a 3.5 millimeter (mm) stereo phone plug, and jack 865 is implemented as a mating jack on power strip 800. In some embodiments, portions of electrical plug 842 are soldered to pads 876-878. In operation, electrical plug 842 carries a signal used to power circuitry that activates controlled outlet(s) 150 and additionally provides power for logic chip 841, stimuli circuit 346, and LED 845. Further to the example, at the start of the timing sequence and at the same time logic chip 841 supplies current to LED 845, logic chip 841 additionally supplies current to resistor 846. Resistor 846 is in series with a signal wire in electrical plug 842 and passes power to resistor 869, and hence, to control circuit 290.

In FIG. 8, HI PWR circuit 270 includes the hi-power secondary winding portion of transformer 840 that includes a first tap coupled to node 811, and a second tap coupled to node 812. Capacitor 847 is located between node 811 and node 813. Diode 848 includes an anode that is coupled to node 813 and a cathode that is coupled to node 814. Diode 849 includes a cathode that is coupled to node 813 and an anode that is coupled to GND 833. Diode 850 includes an anode that is coupled to node 812 and a cathode that is coupled to node 814. Diode 851 includes a cathode that is coupled to node 812 and an anode that is coupled to GND 833. Polarized capacitor 852 includes an anode that is coupled to node 814 and a cathode that is coupled to GND 833. Resistor 853 is located between node 814 and GND 833.

In FIG. 8, LO PWR circuit 280 includes the low-power secondary winding portion of transformer 840 that includes a first tap coupled to node 815, and a second tap coupled to node 816. Capacitor 854 is located between node 815 and node 816. Diode 855 includes an anode that is coupled to node 815 and a cathode that is coupled to node 817. Diode 856 includes a cathode that is coupled to node 815 and an anode that is coupled to GND 833. Diode 857 includes an anode that is coupled to node 816 and a cathode that is coupled to node 817. Diode 858 includes a cathode that is coupled to node 816 and an anode that is coupled to GND 833. Zener diode 859 includes a cathode that is coupled to node 817 and an anode that is coupled to GND 833. Polarized capacitor 860 includes an anode that is coupled to node 817 and a cathode that is coupled to GND 833. Capacitor 861 is located between node 817 and GND 833. Low drop-out (LDO) regulator 862 includes an input pin coupled to node 817, an output pin coupled to node 806, and a ground pin coupled to GND 833. Polarized capacitor 863 includes an anode that is coupled to node 806 and a cathode that is coupled to GND 833.

In FIG. 8, power for power strip 800 is supplied from transformer 840. The input of transformer 840 protects the user from electric shock in the event contact is made between the user and exposed metal connected to the circuit. Transformer 840 has two secondary windings that are similar, but have different voltage values for supplying different levels of power, as required. For both power values supplied, transformer 840 efficiently reduces the input voltage on the primary winding of transformer 840 to some usable value. For the high voltage supply, capacitor 847 is a reactive current limiter to the full-wave rectifier diode bridge 848, 849, 850, and 851. Polarized capacitor 852 stores and smoothes the voltage supplied to the relay circuit 864. Resistor 853 bleeds excess energy from polarized capacitor 852.

The low voltage supply uses diodes 855, 856, 857 and 858 as the full wave rectifier bridge. The input to the bridge is shunted by capacitor 854, and the output of the bridge is shunted by Zener diode 859. Both of these components are used to help attenuate any voltage surges. Capacitors 860 and 861 also help to mitigate surge damage. Capacitors 860 and 861 have other functions. Capacitors 860 and 861 help smooth the incoming rectified voltage and provide a broad band low impedance source for regulator 862. Regulator 862 is an active low drop out regulator, which provides a fixed voltage output for the micro controller and related circuitry.

Polarized capacitor 863 helps to further smooth the output voltage and provides a required pole for the regulator.

In FIG. 8, control circuit 290 includes relay circuit 864, jack 865, as well as other elements that will be described below. Relay circuit 864 includes a first end coupled to node 814, a second end coupled to node 818, a stationary normally open contact coupled to node 830 and an armature moving contact coupled to node 821, which is a switch leg. Diode 867 includes a cathode that is coupled to node 814 and an anode that is coupled to node 818. Bipolar transistor BJT 868 includes a collector coupled to node 818, a base coupled to node 819 and an emitter coupled to GND 833. Resistor 866 is located between node 819 and GND 833, and resistor 869 is located between node 819 and node 820. Jack 865 includes a first pin coupled to GND 833, a second pin coupled to node 806 and a third pin coupled to node 820. In operation, each of the female connectors of jack 865 mechanically and electrically receive a corresponding male connector located at electrical plug 842 of logic circuit 347.

In operation, electrical plug 842 of logic circuit 347 passes power to resistor 869 of control circuit 290 via jack 865. Because resistor 869 is in series with the base of a BJT 868, when the power is passed to resistor 869, BJT 868 turns "on" which turns relay circuit 864 "on." Relay circuit 864 then energizes the controlled outlet(s) 150. Resistors 846 and 869 limit the current to the base of BJT 868. Resistor 846 also helps to protect logic chip 841 from electrostatic discharge (ESD). Diode 867 is used to absorb the counter EMF generated by the magnetic field collapse from relay circuit 864 when BJT 868 turns "off." Resistor 866 is used to defeat the effect of Icbo if the logic circuit 347 is not coupled to control circuit 290 via jack 865.

In FIG. 8, utilizing a two-tiered power supply design reduces power consumption within power strip 800. The reduced power consumption occurs as power is a function of voltage times current and if a circuit will operate at some fixed current level but at various voltages, then utilizing the lowest voltage will result in the least amount of power consumption. Therefore, a low voltage supply is used to generate low voltage power for logic chip 841 and associated circuitry. This technique uses the minimal amount of power for the low voltage circuitry because the transformer input power supply wastes little power to generate the low voltage from the high voltage AC line power. The voltage for relay circuit 864 is the high voltage supply. Like the low voltage supply, the high voltage supply uses a transformer input to drop the line voltage to the voltage required for the relay circuit 864. Unlike the low voltage supply, there is also a reactive current limiter, which wastes no real power. This is called a "soft" supply. The reactive current limiter takes advantage of an effect of relay circuit 864. In other words, as load current is drawn from the supply, the voltage drops, providing even more of a power savings. Additionally, although relay circuit 864 requires a high voltage to initially close its contacts and energize controlled outlet(s) 150 and uses the energy stored in capacitor 852 for initial engagement, relay circuit 864 can remain closed during operation using a lower voltage and therefore using less power. The uniqueness of this approach is that a power savings can be achieved over traditional methods.

In FIG. 8, utilizing a two-tiered power supply design reduces power consumption within power strip 800. The reduced power consumption occurs as power is a function of voltage times current and if a circuit will operate at some fixed current level but at various voltages, then utilizing the lowest voltage will result in the least amount of power consumption. Therefore, a low voltage supply is used to generate low voltage power for logic chip 841 and associated circuitry. This technique uses the minimal amount of power for the low voltage circuitry because the transformer input power supply wastes little power to generate the low voltage from the high voltage AC line power. The voltage for relay circuit 864 is the high voltage supply. Like the low voltage supply, the high voltage supply uses a transformer input to drop the line voltage to the voltage required for the relay circuit 864. Unlike the low voltage supply, there is also a reactive current limiter, which wastes no real power. This is called a "soft" supply. The reactive current limiter takes advantage of an effect of relay circuit 864. In other words, as load current is drawn from the supply, the voltage drops, providing even more of a power savings. Additionally, although relay circuit 864 requires a high voltage to initially close its contacts and energize controlled outlet(s) 150 and uses the energy stored in capacitor 852 for initial engagement, relay circuit 864 can remain closed during operation using a lower voltage and therefore using less power. The uniqueness of this approach is that a power savings can be achieved over traditional methods.

Figure 9:
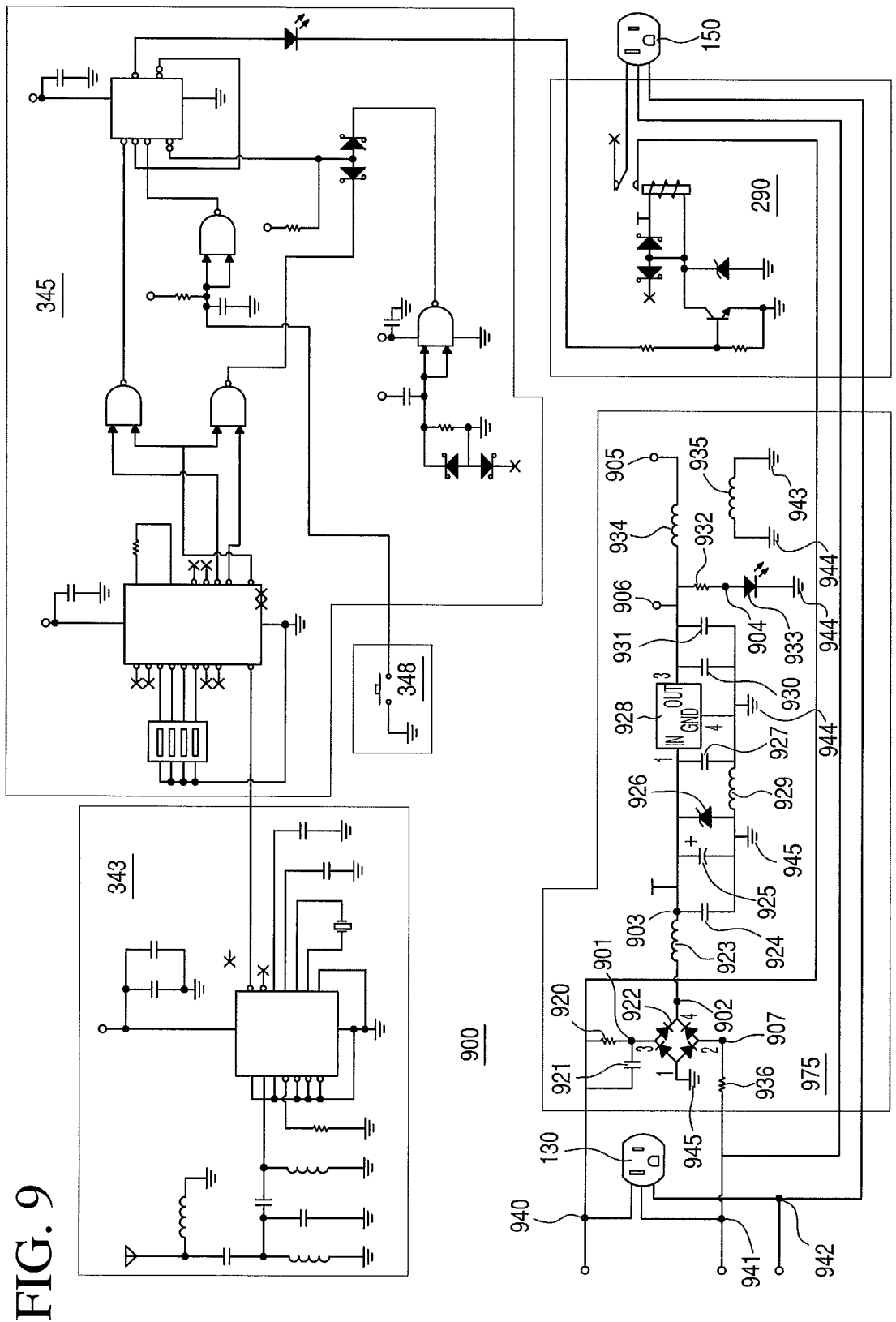
FIG. 9 is a schematic diagram illustrating another embodiment of the improved electric power supply of FIG. 2 that includes aspects of the subject matter described herein.

FIG. 9 is a circuit schematic diagram illustrating an embodiment of a portion of an exemplary system for providing a multi-outlet controlled power strip incorporating an improved power supply and excluding an MOV portion. The power strip 900 in FIG. 9 is another embodiment of a portion of power strip 300 of FIG. 3. Portions of power strip 900 are substantially similar to portions of power strip 700 of FIG. 7, function in substantially similar ways and their elements will not be described further. The power strip 900 in FIG. 9 is a detailed view of another embodiment of power strip 300 of FIG. 3 and includes a single improved power supply but, for clarity, excludes the portion of power strip 300 disclosed and described as MOV protection circuit 500 of FIG. 5. Power strip 900 performs the functionality as described in FIG. 3 by receiving protected power, such as, from an MOV protection circuit (i.e., MOV protection circuit 260 of FIG. 3) and providing multi-outlet controlled power strip functionality. Power strip 900 includes constant "on" outlet(s) 130, controlled outlet(s) 150, power supply circuit 975, control circuit 290, receiver circuit 343, logic circuit 345, and manual switch 348. Power strip 900 includes a line node 940, a neutral node 941 and a ground node 942 as well as numerous other nodes. Node 940 is in electrical communication with a line voltage, and in one embodiment is substantially similar to node 502 in FIG. 5. Node 941 is in electrical communication with the neutral line. Node 942 is in electrical communication with ground. Elements numbered as in FIGS. 1, 2, 3 and/or 7 function in a substantially similarly way.

In operation, a user determines when the peripheral devices should have power. The user sends an encoded signal to the unit to perform the power "on" or "off" function. Receiver circuit 343 receives the signal, tunes, amplifies, and converts it into an electrical signal that is passed to logic circuit 345 for implementation. As described in FIG. 7 above, logic circuit 345 switches controlled outlet(s) 150 "on" or "off." Manual switch 348 also switches the controlled outlet(s) 150 "on" or "off." The power supply is a single module, which generates power for both relay circuit 7014 of control circuit 290 and the low voltage circuitry of power supply circuit 975, described below.

In FIG. 9, power supply circuit 975 includes a resistor 920 located between node 901 and 940, and capacitor 921 located between node 901 and 940. Full-wave bridge rectifier 922 includes a pin1 coupled to relay ground node (RLYGND) 945, pin2 coupled to node 907, pin3 coupled to node 901, and pin4 coupled to node 902. Resistor 936 is located between node 907 and node 941. Inductor 923 is located between node 902 and node 903. Capacitor 924 is located between node 903 and RLYGND 945. Polarized capacitor 925 includes an anode coupled to node 903 and a cathode coupled to RLYGND 945, and Zener diode 926 includes an anode coupled to RLYGND 945 and a cathode coupled to node 903. Inductor 929 is located between RLYGND 945 and GND 944. Capacitor 927 is located between node 903 and GND 944. Low drop-out (LDO) regulator 928 includes an input pin coupled to node 903, an output pin coupled to node 906, and a ground pin coupled to GND 944. Capacitor 930 is located between node 906 and GND 944, and capacitor 931 is located between node 906 and GND 944. Resistor 932 is located between node 906 and node 904, and LED 933 includes an anode coupled to node 904 and a cathode coupled to GND 944. Inductor 934 is located between node 906 and node 905. Inductor 935 is located between RFGND 943 and GND 944.

In FIG. 9, Resistor 932 and LED 933 are not used to generate power, but are an indicator circuit providing an indicator light when two conditions are both met. The two conditions are: (1) that constant "on" outlet(s) 130 have power; and (2) the main MOVs of MOV protection circuit 500 in FIG. 5 have not failed. Capacitor 921 is a reactive voltage divider, which supplies a reduced voltage that is current limited to the full-wave bridge rectifier 922. Resistor 920 is a bleeder resistor for capacitor 921. Resistor 936 is a fuse in the event that capacitor 921 shorted. Resistor 936 is shown as a zero ohm resistor, but in other embodiments Resistor 936 can be, for example, a 100 ohms and 1 watt flameproof resistor. Full-wave bridge rectifier 922 converts incoming AC power to DC power. Capacitors 924 and 925, inductor 923 and Zener diode 926 act to attenuate surge over-voltages. Capacitor 925 smoothes the rectified voltage from the bridge and stores the energy for use by relay circuit 7014 of control circuit 290. Zener diode 926 has a second function in which it establishes the maximum voltage across capacitor 925. Capacitor 927 and inductor 929 protect against surge voltages. Capacitor 927 also provides a high-frequency, low-impedance source for LDO regulator 928 allowing LDO regulator 928 to respond to fast changing loads. LDO regulator 928 is an active LDO regulator that provides a fixed voltage output for the receiver circuit 343 and logic circuit 345. Capacitors 930 and 931 help to further smooth the output voltage and provide a required pole for LDO regulator 928. Inductors 934 and 935 isolate noise generated in the logic circuit from the radio.

In FIG. 9, Zener diode 926 generates the 24 volts needed to initially close relay circuit 7014 of control circuit 290. This voltage is too high for the rest of the circuitry and is regulated down to 3.3 volts by LDO regulator 928. Unfortunately, the process of regulating the voltage down from 24 volts to 3.3 volts is inefficient and consumes real power in the LDO regulator 928 and in Zener diode 926. To counteract this problem, the value of capacitor 921 keeps the inefficient power consumption at a minimum. When relay circuit 7014 of control circuit 290 is engaged, the voltage across Zener diode 926 reduces to approximately 7.6 volts and there is little to no power wastage in Zener diode 926 as well as reduced power wastage within LDO regulator 928. This embodiment, while not saving as much power as the dual power supplies previously described, still saves power both in the design function and in the design itself.

In FIG. 9, LDO regulator 928 can be implemented as any suitable LDO regulator, such as, for example a LP2950ACDT-3.3 available from ON Semiconductor of Phoenix, Ariz. Full-wave bridge rectifier 922 can be implemented as any suitable full-wave bridge rectifier, such as, for example a S1ZB60 available from Shindengen America, Inc of Bannockburn, Ill. Zener Diode 926 can be implemented as any suitable 24 volt Zener diode. LED 933 can be implemented as any suitable green LED. Inductors 923, 929, 934 and 935 are inductors having 1 kΩ at 100. Capacitors 924, 927 and 930 can be implemented as any suitable 0.1 μF capacitors. Capacitor 921 can be implemented as any suitable 0.4 μF capacitor. Polarized capacitor 925 can be implemented as any suitable 100 μF at 50 volts polarized capacitor. Capacitor 931 can be implemented as any suitable 4.7 μF capacitor. Resistor 920 can be implemented as any suitable 470 kΩ resistor. Resistor 932 can be implemented as any suitable 332Ω resistor. Resistor and capacitor elements can be obtained from any reputable electronic parts distributor or retailer.

Figure 10:
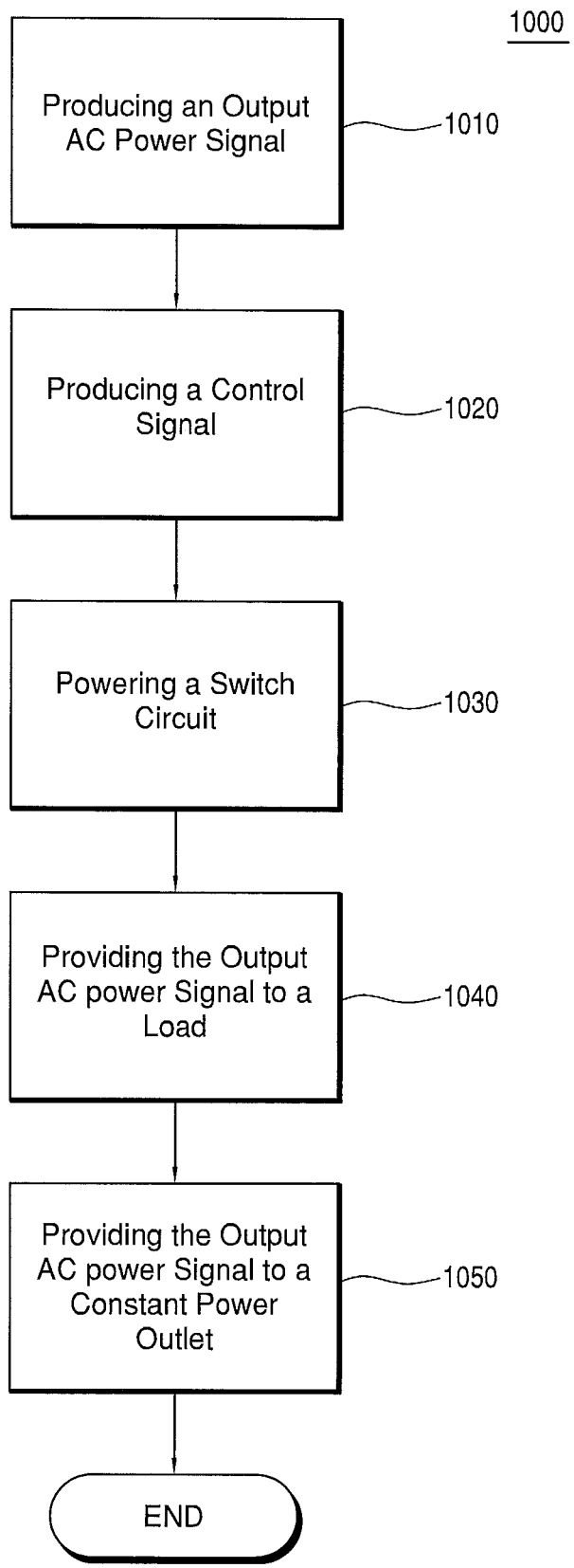
FIG. 10 is block diagram illustrating a method for providing electricity that includes aspects of the subject matter described herein.

FIG. 10 illustrates an example of a method 1000 of providing a selectable output AC power signal, according to an embodiment of the present invention. Method 1000 includes a process 1010 of producing an output AC power signal, a first DC power signal, and a second DC power signal at a power supply and based on a received input AC power signal. As an example, method 1000 can be a method associated with power strip 200 in FIG. 2, power strip 300 in FIG. 3, and/or power strip 400 in FIG. 4. In this example, the output AC power signal of process 1010 can be similar to the output AC power signal for constant "on" outlet(s) 130, controlled outlet(s) 150, and/or master outlet(s) 240. in this same example, the first DC power signal of process 1010 can be similar to the output of HI PWR circuit 270, and the second DC power signal of process 1010 can be similar to the output of LO PWR circuit 280. In addition, the received input AC power signal of process 1010 can be similar to the input for power plug 120.

Next, method 1000 includes a process 1020 of producing a control signal at a control circuit based on a received command signal and the second DC power signal. As an example, the control signal of process 1020 can be similar to the signal transmitted from command input device 140 to control circuit 290 (FIGS. 2-4). In this same example, the command signal of process 1020 can be similar to the command signal generated within and transmitted within command input device 140 (FIGS. 2-4).

Subsequently, method 1000 includes a process 1030 of powering a switch circuit with the first DC power signal based on the control signal and the second DC power signal. As an example, the switch circuit of process 1030 can be a portion of control circuit 290 (FIGS. 2-4).

After process 1030, method 1000 includes a process 1040 of providing the output AC power signal to a load when the switch circuit is powered. As an example, the load of process 1040 can be similar to a device plugged in to any of constant "on" outlet(s) 130, controlled outlet(s) 150, or master outlet(s) 240 (FIGS. 2-4).

Next, in some embodiments, method 1000 can include a process 1050 of providing the output AC power signal to a constant power outlet when the output AC power signal is produced. As an example, the constant power outlet of process 1050 can be similar to constant "on" outlet(s) 130 (FIGS. 2-4).

FIG. 11 illustrates an isometric view of an embodiment of an exemplary system 1100 for providing a relocatable power tap (RPT) incorporating an improved power supply that uses approximately zero power when inactive. In some embodiments, the "zero power when inactive feature" incorporated within this device may be used in other embodiments of power distribution/management devices, such as, for example, multi-outlet controlled power strips, multi-outlet controlled power strips with surge protection, and multi-outlet controlled power strips using various stimuli (e.g., manual, remote, sensor, and the like). In other embodiments and as similarly described above with respect to FIGS. 1-10, this configuration of control circuitry 110 (FIG. 10) prevents excessive use of energy in the Run State (e.g., maintaining the switched state of the energized relay). In these embodiments, when using the features described above and below, this configuration of internal assembly 1210 (FIG. 12) achieves the above improvements as well as zero power use in the Inactive State. In some embodiments, "approximately zero power" and "zero power" mean power in the nanoampere range, the picoampere range, or the femtoampere range.

Skipping ahead, FIGS. 14 through 17 illustrate additional isometric views of system 1100. System 1100 includes various components, including electrical prongs 1101, an electrical outlet 1102, switches, buttons, slides, and/or other user input devices 1103 and 1104, visual, audible, and/or tactile indicators 1105, and housing 1110. In one embodiment, user input device 1103 has two settings (e.g., on and off), and user input device 1104 has three settings (e.g., 1.5 hours, 3 hours, and 6 hours). Electrical prongs 1101 and electrical outlet 1102 can be configured for US electrical systems or other electrical systems. Electrical prongs 1101 can include two or three prongs, and electrical outlet 1102 can include two or three holes. In one embodiment, system 1100 comprises a system that can be held in a user's hand and that can be manually coupled to an electrical wall outlet by the user without using any tools.

Figure 12:
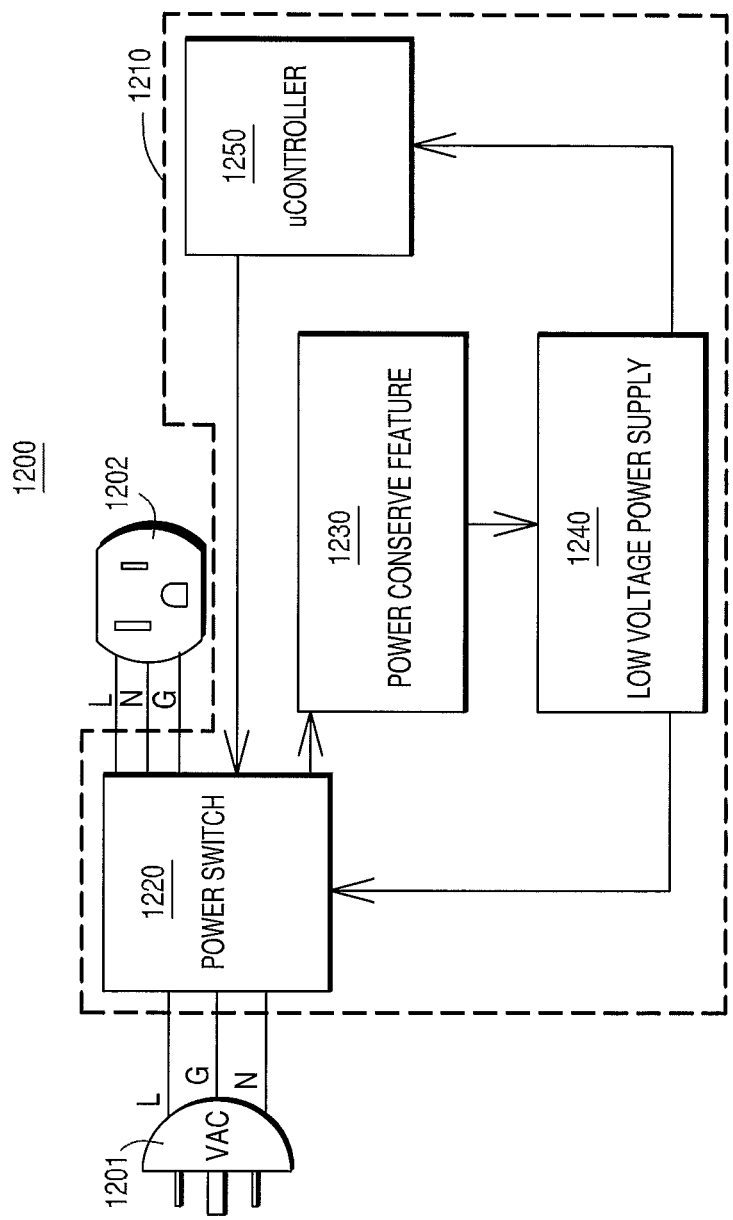
FIG. 12 is a block diagram illustrating another embodiment of an improved electric power supply.

FIG. 12 is a block diagram illustrating an embodiment of an exemplary system 1200 for providing a RPT incorporating an improved power supply that uses approximately zero power when inactive. System 1200 in FIG. 12 is a detailed view of system 1100 of FIG. 11. As shown in FIG. 12, system 1200 can comprise internal assembly 1210, power plug 1201, and outlet 1202. Internal assembly 1210 can comprise Power Switch Block (PSB) 1220, Power Conserve Feature Block (PCFB) 1230, Low Voltage Power Supply Block (LVPSB) 1240, and microcontroller (uController) 1250. uController 1250 can be a microcontroller, a processor with a separate memory component, or other equivalent component(s). As described above with respect to FIGS. 1-10, internal assembly 1210 can be configured to function in either a start-up state (Start Up State) or in a continuous run state (Run State). Additionally, internal assembly 1210 can be configured to function in an inactive state using zero power (Inactive State). In operation, these states can be entered sequentially with the Start Up State being the first state, the Run State being the second state, and the Inactive State being the third state. In other embodiments, the states can be entered into according to a different sequence.

Referring to FIG. 12, the power and power switching function can be contained in PSB 1220. PSB 1220 can be coupled to power plug 1201 and outlet 1202. PSB 1220 can be configured to receive an unswitched AC power signal from power plug 1201 and provide switched AC power signal to a load coupled to outlet 1202. PSB 1220 can be coupled to PCFB 1230 and LVPSB 1240, and can be in electrical communication with uController 1250. PSB 1220 can be configured to provide a high-voltage AC signal to PCFB 1230.

In some situations, PCFB 1230 can be coupled to LVPSB 1240. When PCFB 1230 is coupled to LVPSB 1240 and PCFB 1230 receives the high voltage AC signal from PSB 1220, PCFB 1230 can be configured to attenuate the high voltage AC signal into a low voltage AC signal and to pass the low voltage AC signal to LVPSB 1240. In some situations, during the Start Up State PCFB 1230 can attenuate the high voltage AC signal into a low voltage AC signal while dissipating real power for a short period of time. In these situations, during the Run State PCFB 1230 can attenuate the high voltage AC signal into a low voltage AC signal without dissipating real power. Additionally, PCFB 1230 can comprise a manual switch (e.g., a manual switch, a momentary switch, a push button switch, etc.) for allowing a user controlled Start Up State initiation.

LVPSB 1240 can be additionally coupled to PSB 1220 and uController 1250. LVPSB 1240 can be configured to receive the low voltage AC signal from PCFB 1230 and to convert the low voltage AC signal into a first low voltage DC signal and a second low voltage DC signal. LVPSB 1240 can be configured to pass the first low voltage DC signal to PSB 1220 and to pass the second low voltage DC signal to uController 1250. In some embodiments, simultaneous to LVPSB 1240 converting the low voltage AC signal into a first low voltage DC signal and a second low voltage DC signal, the low voltage AC signal from PCFB 1230 also can cause LVPSB 1240 to optically or otherwise visibly indicate that power is on. In other embodiments, the indication may be presented by any means such as audio, tactile, and the like, or any combination thereof. In some embodiments, the initial indication can be at a higher intensity (e.g., during the manual button press for the Start Up State due to PCFB 1230 dissipating real power in this state) for as long as the manual switch is depressed.

As described above, uController 1250 is in electrical communication with PSB 1220. uController 1250 can be configured to receive the second low voltage DC signal from LVPSB 1240 and a time select signal from a user interface (e.g., a slide switch, potentiometer, an encoder, a remote device, etc.). The received signals help uController 1250 determine the length of time internal assembly 1210 will allow power plug 1201 to provide the switched AC power signal to outlet 1202 via PSB 1220.

In operation, when the manual switch located within PCFB 1230 is depressed to initiate the Start Up State, which in turn allows a timer function within uController 1250 to countdown a time period based on the received time select signal, a resulting low voltage AC signal is produced by PCFB 1230 causing LVPSB 1240 to send the first low voltage DC signal to PSB 1220 to latch at the switched AC power signal (the output power level) associated with outlet 1202. In some embodiments, when internal assembly 1210 is in the Start Up State (e.g., when the user presses the manual switch), the first low voltage DC is provided to PSB 1220 and is dissipating real power within PCFB 1230 (as described above). In these embodiments, when internal assembly 1210 is in the Run State (e.g., when the user releases the manual switch), the first low voltage DC signal can be seamlessly provided to PSB 1220 and is not dissipating real power within PCFB 1230 (as described above). In the case of stopping the RPT during normal operations, there can be a single method—a timed method. During the timed method stop, the time select signal determines the length of time loaded into a time counter within uController 1250. Because uController 1250 is in electrical communication with PSB 1220, when the time counter counts down to zero, uController 1250 sends a control signal to PSB 1220 to disconnect the switched AC power signal from outlet 1202.

Figure 13:
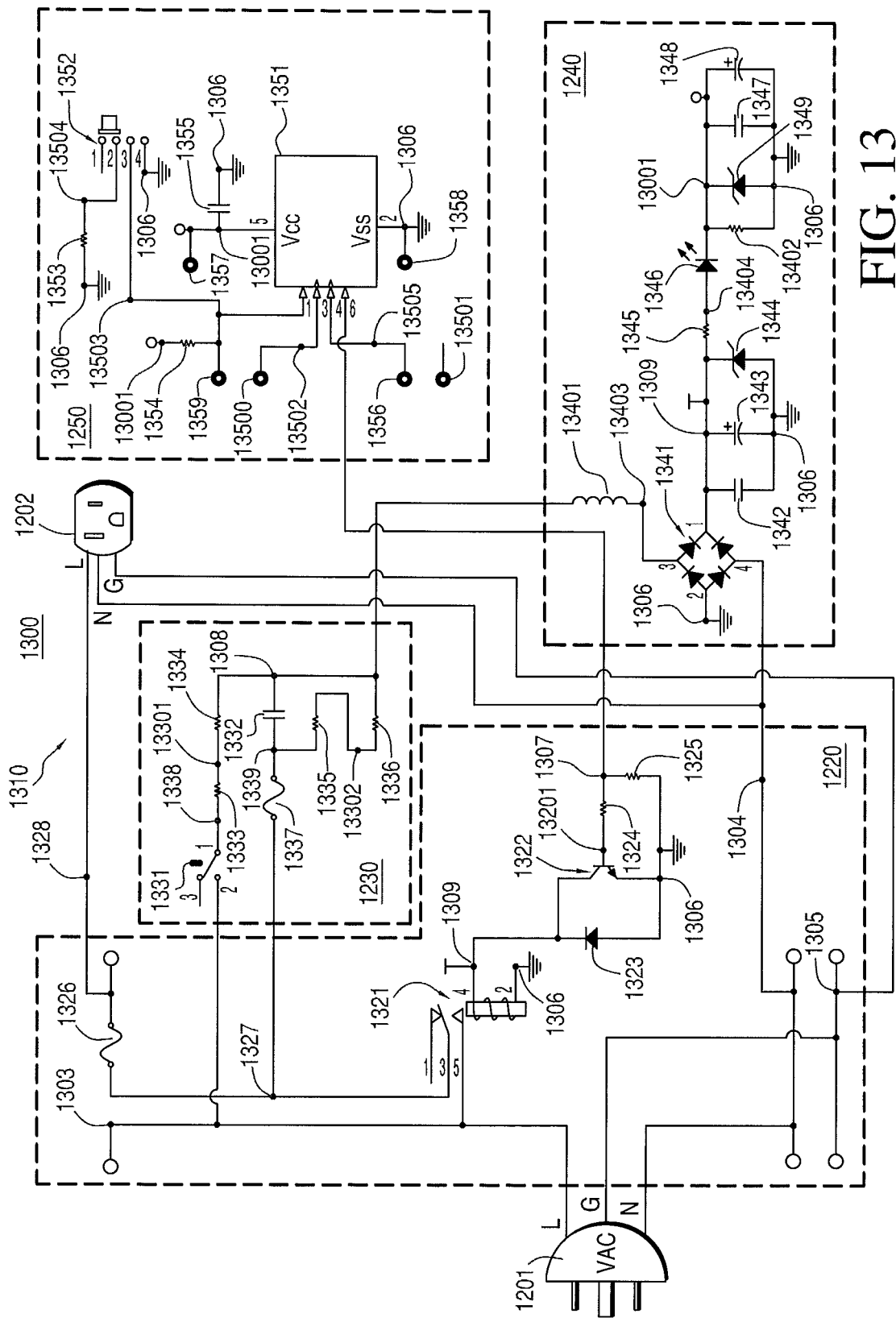
FIG. 13 is an embodiment of a schematic diagram of the improved electric power supply of FIG. 12.

FIG. 13 is a circuit schematic diagram illustrating an embodiment of a portion of an exemplary system for providing a relocatable power tap (RPT) incorporating an improved power supply that uses approximately zero power when inactive. RPT 1300 in FIG. 13 is a detailed view of a portion of RPT 1200 of FIG. 12. RPT 1300 performs the functionality as described in FIG. 12 by receiving an unswitched AC power signal from a power distribution node, such as, for example a wall outlet, and providing a switched AC power signal to an associated single outlet contained within RPT 1200. In a different embodiment, the RPT receives the unswitched AC power signal from the power distribution node, and provides the switched AC power signal to multiple outlets contained within the RPT. RPT 1300 comprises internal assembly 1310, power plug 1201 and outlet 1202. Internal assembly 1310 includes Power Switch Block (PSB) 1220, Power Conserve Feature Block (PCFB) 1230, Low Voltage Power Supply Block (LVPSB) 1240, and uController 1250. RPT 1300 comprises an unswitched line node 1303, a neutral node 1304, and a ground node 1305, and can comprise numerous other nodes. Unswitched line node 1303 is in electrical communication with an AC power signal. Node 1304 is in electrical communication with the neutral line. Node 1305 is in electrical communication with ground. Elements in FIG. 13 that are numbered as in FIG. 12 can function in a substantially similar way, as described with respect to FIG. 12. As described above with respect to FIGS. 1-10, internal assembly 1310 is configured to function in either a start-up state (Start Up State) or in a continuous run state (Run State). Additionally, internal assembly 1310 is configured to function in an inactive state using approximately zero power (Inactive State). In operation, these states are entered sequentially with the Start Up State being the first state, the Run State being the second state, and the Inactive State being the third state. In other embodiments, these states are performed in a different sequence.

Power plug 1201 comprises a prong assembly for interfacing with a wall outlet as well as three (3) outputs including a line output coupled to unswitched line node 1303, a neutral output coupled to node 1304 and a ground output coupled to node 1305. PSB 1220 comprises relay 1321, trace fuse 1326, diode 1323, bi-polar junction transistor (BJT) 1322, resistor 1324, and resistor 1325. Relay 1321 of PSB 1220 can comprise five (5) pins with pin5 coupled to unswitched line node 1303. Additionally, pin3 of relay 1321 is coupled to node 1327; pin2 of relay 1321 is coupled to internal ground node 1306; and pin4 of relay 1321 is coupled to node 1309. In other embodiments, relay 1321 can be implemented as a four (4) pin relay. Trace fuse 1326 comprises a first end coupled to node 1327 and a second end coupled to node 1328. The cathode of diode 1323 is coupled to node 1309, and the anode of diode 1323 is coupled to internal ground node 1306. Bi-polar junction transistor (BJT) 1322 comprises an emitter, a collector, and a base. The collector of BJT 1322 is coupled to node 1309; the emitter of BJT 1322 is coupled to internal ground node 1306; and the base of BJT 1322 is coupled to node 13201. Resistor 1324 includes a first end and a second end. The first end of resistor 1324 is coupled to node 13201, and the second end of resistor 1324 is coupled to node 1307. Resistor 1325 includes a first end and a second end. The first end of resistor 1325 is coupled to node 1307, and the second end of resistor 1325 is coupled to internal ground node 1306.

In FIG. 13, PCFB 1230 comprises manual switch 1331, capacitor 1332, resistor 1333, resistor 1334, resistor 1335, resistor 1336, and trace fuse 1337. Manual switch 1331 of PCFB 1230 comprises three (3) pins. Pin2 of manual switch 1331 is coupled to unswitched line node 1303. Additionally, pin1 of manual switch 1331 is coupled to node 1338. In other embodiments, manual switch 1331 can be implemented as a two (2) pin manual switch. Resistor 1333 includes a first end and a second end. The first end of resistor 1333 is coupled to node 1338, and the second end of resistor 1333 is coupled to node 13301. Resistor 1334 includes a first end and a second end. The first end of resistor 1334 is coupled to node 13301, and the second end of resistor 1334 is coupled to node 1308. Trace fuse 1337 includes a first end and a second end. The first end of trace fuse 1337 is coupled to node 1327, and the second end of trace fuse 1337 is coupled to node 1339. Capacitor 1332 is implemented as a non-polarized capacitor and includes a first end and a second end. The first end of capacitor 1332 is coupled to node 1339, and the second end of capacitor 1332 is coupled to node 1308. Resistor 1335 includes a first end and a second end. The first end of resistor 1335 is coupled to node 1339, and the second end of resistor 1335 is coupled to node 13302. Resistor 1336 includes a first end and a second end. The first end of resistor 1336 is coupled to node 13302, and the second end of resistor 1336 is coupled to node 1308.

In FIG. 13, LVPSB 1240 comprises full-wave bridge rectifier 1341, non-polarized capacitor 1342, polarized capacitor 1343, Zener diode 1344, resistor 1345, light emitting diode (LED) 1346, non-polarized capacitor 1347, polarized capacitor 1348, Zener diode 1349, inductor 13401, and resistor 13402. Inductor 13401 includes a first end and a second end. The first end of inductor 13401 is coupled to node 1308, and the second end of inductor 13401 is coupled to node 13403. In some embodiments, inductor 13401 can be implemented as a ferrite-bead choke. Full-wave bridge rectifier 1341 includes four (4) pins. Pin3 (e.g., AC input) of full-wave bridge rectifier 1341 is coupled to node 13403; a pin2 (e.g., dual anode DC output) is coupled to internal ground node 1306; a pin4 (e.g., AC input) is coupled to node 1304; and a pin1 (e.g., dual cathode DC output) is coupled to node 1309. In some embodiments, the functionality of the full-wave bridge rectifier can be accomplished using discrete diodes. Non-polarized capacitor 1342 includes a first end and a second end. The first end of non-polarized capacitor 1342 is coupled to node 1309, and the second end of non-polarized capacitor 1342 is coupled to internal ground node 1306. Polarized capacitor 1343 includes an anode and a cathode. The anode of polarized capacitor 1343 is coupled to node 1309, and the cathode of polarized capacitor 1343 is coupled to internal ground node 1306. Zener diode 1344 includes an anode and a cathode. The cathode of Zener diode 1344 is coupled to node 1309, and the anode of Zener diode 1344 is coupled to internal ground node 1306. Resistor 1345 includes a first end and a second end. The first end of resistor 1345 is coupled to node 1309, and the second end of resistor 1345 is coupled to node 13404. LED 1346 includes an anode and a cathode. The anode of LED 1346 is coupled to node 13404, and the cathode of LED 1346 is coupled to node 13001. Resistor 13402 includes a first end and a second end. The first end of resistor 13402 is coupled to node 13001, and the second end of resistor 13402 is coupled to internal ground node 1306. Zener diode 1349 includes an anode and a cathode. The cathode of Zener diode 1349 is coupled to node 13001, and the anode of Zener diode 1349 is coupled to internal ground node 1306. Non-polarized capacitor 1347 includes a first end and a second end. The first end of non-polarized capacitor 1347 is coupled to node 13001, and the second end of non-polarized capacitor 1347 is coupled to internal ground node 1306. Polarized capacitor 1348 includes an anode and a cathode. The anode of polarized capacitor 1348 is coupled to node 13001, and the cathode of polarized capacitor 1348 is coupled to internal ground node 1306.

In FIG. 13, uController 1250 comprises uController 1351, slide switch 1352, resistor 1353, resistor 1354, non-polarized capacitor 1355, and programming pads 1356-1359 and 13500-13501. uController 1351 includes six (6) pins. Pin6 of uController 1351 is coupled to node 1307; pin5 of uController 1351 is coupled to node 13001; pin4 of uController 1351 is coupled to node 13505; pin3 of uController 1351 is coupled to node 13502; pin2 of uController 1351 is coupled to internal ground node 1306; and pin1 of uController 1351 is coupled to node 13503. In some embodiments, uController 1351 can be implemented as any suitable microcontroller, such as, for example PIC10F22 available from MicroChip Technology, Inc. of Chandler, Ariz. In FIG. 13, slide switch 1352 includes four (4) pins, as well as a manual slide arm (not numbered). Pin2 of slide switch 1352 is coupled to node 13504; pin3 of slide switch 1352 is coupled to node 13503; and pin4 of slide switch 1352 is coupled to internal ground node 1306. Although pin1 is not coupled to any node, in other embodiments pin1 could be utilized. Resistor 1353 includes a first end and a second end. The first end of resistor 1353 is coupled to internal ground node 1306, and the second end of resistor 1353 is coupled to node 13504. Resistor 1354 includes a first end and a second end. The first end of resistor 1354 is coupled to node 13001, and the second end of resistor 1354 is coupled to node 13503. Non-polarized capacitor 1355 includes a first end and a second end. The first end of non-polarized capacitor 1355 is coupled to node 13001, and the second end of non-polarized capacitor 1355 is coupled to internal ground node 1306. Programming pad 1356 is coupled to node 13505; programming pad 1357 is coupled to node 13001; programming pad 1358 is coupled to internal ground node 1306; programming pad 1359 is coupled to node 13503; programming pad 13500 is coupled to node 13502; and programming pad 13501 is coupled to a null node.

In operation, the unswitched AC power signal enters internal assembly 1310 at node 1303 and node 1304 via the associated prongs of power plug 1201. The unswitched AC power signal is passed to pin5 (normally open contact) of relay 1321. In other embodiments, the functionality of relay 1321 may be replaced with triacs, a discrete silicon controlled rectifier contained within a diode bridge, and the like. When relay 1321 is energized, the unswitched AC power signal is passed to trace fuse 1326 and on to outlet 1202 (and, therefore, the load coupled to outlet 1202) via node 1328. The return side of the AC power signal passes from outlet 1202 (and, therefore, the load coupled to outlet 1202) via node 1304 and on to power plug 1201 and is then returned to origin. External ground is fed to power plug 1201 and is passed to outlet 1202 via node 1305. During the Start Up State, a user activates manual switch 1331, and the high-voltage AC signal is passed to pin2 of manual switch 1331 via node 1303. The high-voltage AC signal is passed to resistor 1333 via node 1338 and then on to resistor 1334 via node 13301. The resistor(s) provide voltage attenuation, thereby producing a low voltage AC signal. In some embodiments, resistor 1334 is replaced with a jumper wire, such as, for example in jurisdictions having lower voltages. The low voltage AC signal is then passed to LVPSB 1240 via node 1308. While internal assembly 1310 is in the Start Up State, resistor 1333 and resistor 1334 (if used) are dissipating real power. During the Run State, the user no longer activates manual switch 1331, and the AC power signal cannot be passed to pin2 of manual switch 1331. Instead, the switched high-voltage AC signal is passed to trace fuse 1337 via node 1327 and then on to non-polarized capacitor 1332 via node 1339. Non-polarized capacitor 1332 provides voltage attenuation thereby producing a low voltage AC signal. The low voltage AC signal is then passed to LVPSB 1240 via node 1308. While internal assembly 1310 is in the Run State, non-polarized capacitor 1332 is not dissipating real power. In some embodiments, if a user continues to depress manual switch 1331 during the Run State, resistors 1333 and 1334 will continue dissipating real power while non-polarized capacitor 1332 is not dissipating real power. In other embodiments, resistors 1335 and 1336 are supplied to discharge non-polarized capacitor 1332.

Continuing the operation, when the low voltage AC signal is received at inductor 13401, the low voltage AC signal is passed to full-wave bridge rectifier 1341 via node 13403. In some embodiments, inductor 13401 provides surge protection to the internal circuitry of internal assembly 1310. Full-wave bridge rectifier 1341 receives low voltage AC signal and produces an intermediate low voltage DC signal. The intermediate low voltage DC signal is simultaneously passed to non-polarized capacitor 1342, polarized capacitor 1343, and Zener diode 1344, which in combination produce a smoothed DC power signal called the first low voltage DC signal that is passed to pin4 (e.g., the coil) of relay 1321 via node 1309. When the first low voltage signal is received at relay 1321 in a sufficient quantity, the armature of relay 1321 actuates, thereby moving from pin1 to pin5, and internal assembly 1310 enters the Run State. Simultaneous to the first low voltage DC signal passing to relay 1321 via node 1309, a small portion of the first low voltage DC signal is passed to resistor 1345 via node 1309. Resistor 1309 attenuates the first low voltage DC signal and passes the attenuated first low voltage DC signal to LED 1346 via node 13404 which further attenuates the first low voltage DC signal. LED 1346 simultaneously passes the further attenuated first low voltage DC signal to non-polarized capacitor 1347, polarized capacitor 1348, resistor 13402, and Zener diode 1349, which in combination produce a smoothed DC power signal called the second low voltage DC signal that is passed to uController 1250 via node 13001. In some embodiments, resistor 13402 provides an additional current path allowing LED 1346 to produce additional illumination.

Continuing the operation, when the second low voltage DC signal is received at pin5 of uController 1351 via node 13001, uController 1351 is initialized (e.g., begins the boot process). After uController 1351 initializes, uController 1351 checks pin1 for the time select signal from a user interface (e.g., a slide switch, potentiometer, an encoder, a remote device, etc.) from switch 1352, for example, from a single-pole, three-position slide switch, such as, slide switch 1104 of FIG. 11. In some embodiments, the time select signal provided by switch 1352 can be differentiated as each of the three positions of switch 1352 produces a different voltage level. In these embodiments, resistors 1353 and 1354 aid in switch 1352 producing the three voltage levels of the time select signal. Non-polarized capacitor 1355 absorbs transients, thereby assisting in the stabilization of second low voltage DC signal that is used to power uController 1351. Programming pads 1356-1359 and 13500-13501 are utilized for loading firmware programming into uController 1351 during production.

Continuing the operation, the received time select signal provides a time value to uController 1351, which then is loaded into a countdown register within uController 1351. The time value is the amount that time internal assembly 1310 will allow power plug 1201 to provide the switched AC power signal to outlet 1202 via PSB 1220. While the countdown is running on uController 1351, uController 1351 is checking pin1 for an updated time select signal from switch 1352. In the event a new time select signal is received from switch 1352 at pin1 of uController 1351, the current value to reset to the new value, and the countdown resumes from the new value. In some embodiments, pin1 is coupled to an analog-to-digital converter (ADC) device within uController 1351. In these embodiments, the ADC differentiates between each of the three voltage level values provided by switch 1352.

When the value within the countdown register reaches zero, uController 1351 issues a control signal to PSB 1220. The control signal is received via a resistor network including resistors 1324 and 1325. Resistor 1325 insures when the control signal is absent that no current is flowing into BJT 1322. When the control signal is present, resistor 1324 attenuates the control signal, and the attenuated control signal is passed to the base of BJT 1322 to forward-bias BJT 1322, causing conduction between the emitter and collector of BJT 1322. When BJT 1322 conducts, the first low voltage DC signal at node 1309 is then shunted to internal ground node 1306 and thereby to internal ground. Shunting the first low voltage DC signal to internal ground de-energizes the coil of relay 1321, thus allowing the armature of relay 1321 to return to the normally open position. Returning the armature of relay 1321 to the normally open position interrupts the switched AC power signal from power plug 1201 to outlet 1202. Because a back EMF pulse is typically generated when the coil of relay 1321 is de-energized, diode 1323 is present to absorb the back EMF pulse and therefore protect BJT 1322.

Figure 18:
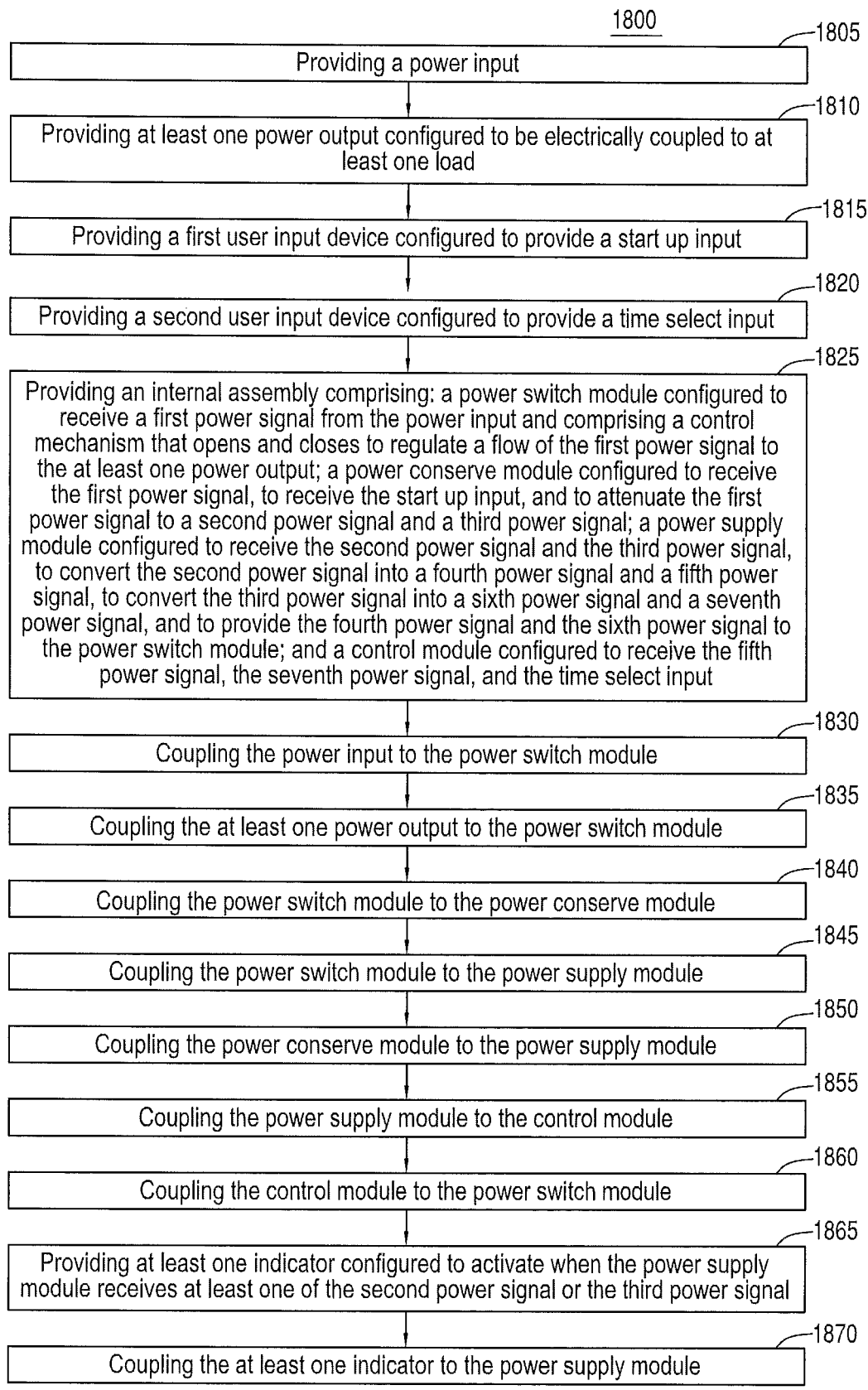
FIG. 18 is a flow chart for an embodiment of a method for manufacturing an electrical system.

Referring back to the figures, FIG. 18 illustrates a flow chart for an embodiment of a method 1800 for manufacturing an electrical system. Method 1800 is merely exemplary and is not limited to the embodiments presented herein. Method 1800 can be employed in many different embodiments or examples not specifically depicted or described herein. In some embodiments, the procedures, processes and/or the activities of method 1800 can be performed in the order presented. In other embodiments, the procedures, processes and/or the activities of the method 1800 can be performed in any other suitable order. In still other embodiments, one or more of the procedures, processes and/or the activities in method 1800 can be combined or skipped.

Referring now to FIG. 18, method 1800 can comprise a procedure 1805 of providing a power input.

Method 1800 can comprise a procedure 1810 of providing at least one power output configured to be coupled to at least one load.

Method 1800 can comprise a procedure 1815 of providing a first user input device configured to provide a start up input.

Method 1800 can comprise a procedure 1820 of providing a second user input device configured to provide a time select input.

Method 1800 can comprise a procedure 1825 of providing an internal assembly comprising: a power switch module configured to receive a first power signal from the power input and comprising a control mechanism that opens and closes to regulate a flow of the first power signal to the at least one power output; a power conserve module configured to receive the first power signal, to receive the start up input, and to attenuate the first power signal to a second power signal and a third power signal; a power supply module configured to receive the second power signal and the third power signal, to convert the second power signal into a fourth power signal and a fifth power signal, to convert the third power signal into a sixth power signal and a seventh power signal, and to provide the fourth power signal and the sixth power signal to the power switch module; and a control module configured to receive the fifth power signal, the seventh power signal, and the time select input.

Method 1800 can comprise a procedure 1830 of coupling the power input to the power switch module.

Method 1800 can comprise a procedure 1835 of coupling the at least one power output to the power switch module.

Method 1800 can comprise a procedure 1840 of coupling the power switch module to the power conserve module.

Method 1800 can comprise a procedure 1845 of coupling the power switch module to the power supply module.

Method 1800 can comprise a procedure 1850 of coupling the power conserve module to the power supply module.

Method 1800 can comprise a procedure 1855 of coupling the power supply module to the control module.

Method 1800 can comprise a procedure 1860 of coupling the control module to the power switch module In some embodiments of Method 1800, the first user input device comprises at least one of a manual switch, a momentary switch, or a push button switch.

In some embodiments of Method 1800, the second user input device comprises at least one of a slide switch, potentiometer, an encoder, or a remote device.

Method 1800 can comprise a procedure 1865 of providing at least one indicator configured to activate when the power supply module receives at least one of the second power signal or the third power signal.

Method 1800 can comprise a procedure 1870 of coupling the at least one indicator to the power supply module.

In many embodiments, at least two of procedures 1830, 1835, 1840, 1845, 1850, 1855, and 1860 can occur simultaneously with each other.

Figure 19:
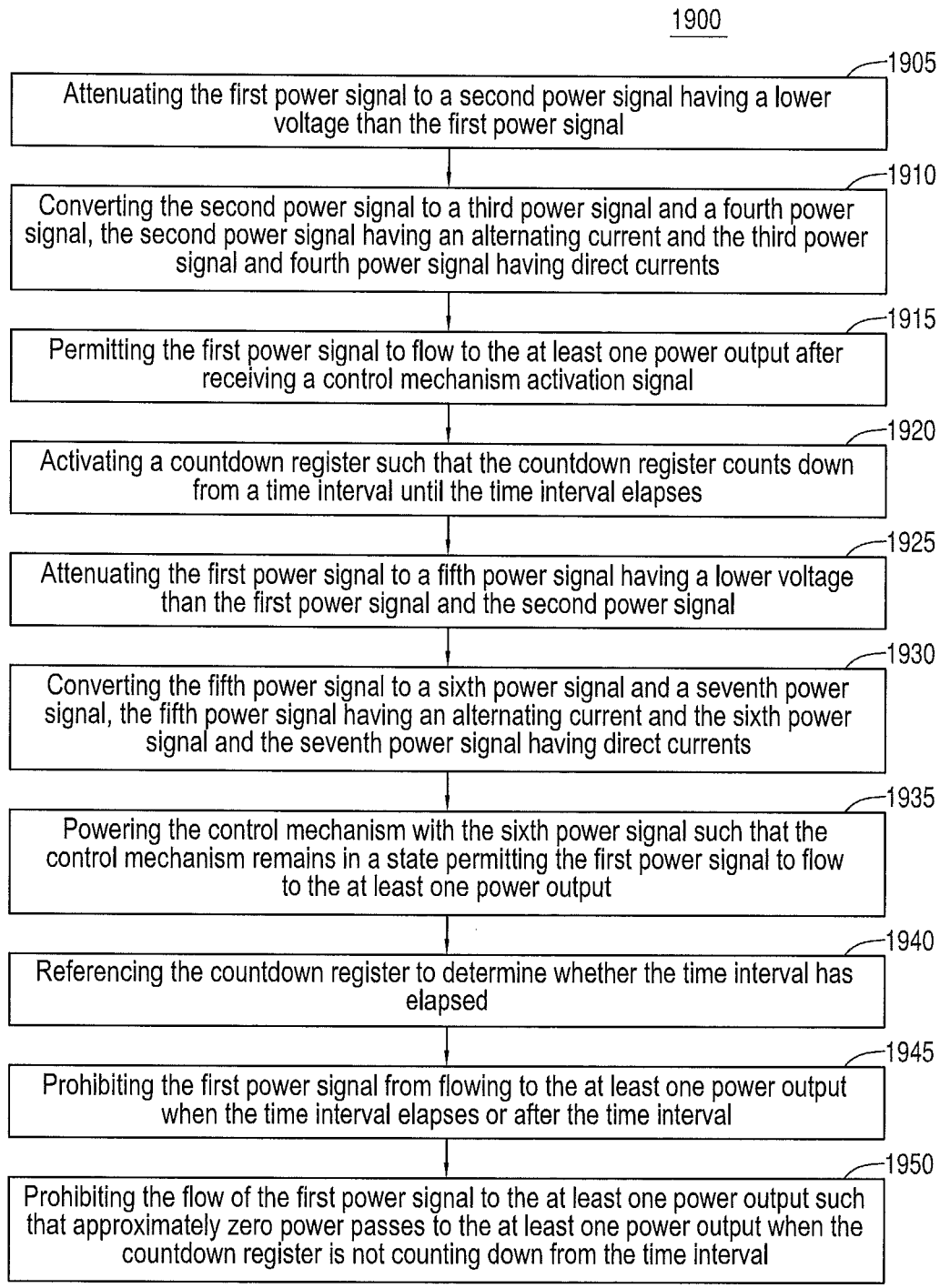
FIG. 19 is a flow chart for an embodiment of a method for regulating a flow of a first power signal to at least one power output.

Referring back to the figures, FIG. 19 illustrates a flow chart for an embodiment of a method 1900 for regulating a flow of a first power signal to at least one power output. Method 1900 is merely exemplary and is not limited to the embodiments presented herein. Method 1900 can be employed in many different embodiments or examples not specifically depicted or described herein. In some embodiments, the procedures, processes and/or the activities of method 1900 can be performed in the order presented. In other embodiments, the procedures, processes and/or the activities of the method 1900 can be performed in any other suitable order. In still other embodiments, one or more of the procedures, processes and/or the activities in method 1900 can be combined or skipped.

Method 1900 can comprise a procedure 1905 of attenuating the first power signal to a second power signal having a lower voltage than the first power signal.

Method 1900 can comprise a procedure 1910 of converting the second power signal to a third power signal and a fourth power signal, the second power signal having an alternating current and the third power signal and fourth power signal having direct currents.

Method 1900 can comprise a procedure 1915 of permitting the first power signal to flow to the at least one power output after receiving a control mechanism activation signal.

Method 1900 can comprise a procedure 1920 of activating a countdown register such that the countdown register counts down from a time interval until the time interval elapses.

Method 1900 can comprise a procedure 1925 of attenuating the first power signal to a fifth power signal having a lower voltage than the first power signal and the second power signal.

Method 1900 can comprise a procedure 1930 of converting the fifth power signal to a sixth power signal and a seventh power signal, the fifth power signal having an alternating current and the sixth power signal and the seventh power signal having direct currents;

Method 1900 can comprise a procedure 1935 of powering the control mechanism with the sixth power signal such that the control mechanism remains in a state permitting the first power signal to flow to the at least one power output;

Method 1900 can comprise a procedure 1940 of referencing the countdown register to determine whether the time interval has elapsed.

Method 1900 can comprise a procedure 1945 of prohibiting the first power signal from flowing to the at least one power output when the time interval elapses or after the time interval.

Method 1900 can comprise a procedure 1950 of prohibiting the flow of the first power signal to the at least one power output such that approximately zero power passes to the at least one power output when the countdown register is not counting down from the time interval.

In some embodiments, method 1900 can comprise a procedure of activating an indicator upon the occurrence of at least one of: converting the second power signal to a third power signal and a fourth power signal, the second power signal having an alternating current and the third power signal and fourth power signal having direct currents; or converting the fifth power signal to a sixth power signal and a seventh power signal, the fifth power signal having an alternating current and the sixth power signal and the seventh power signal having direct currents.

In some embodiments, method 1900 can comprise a procedure of obtaining the first power signal from an electrical wall outlet.

In some embodiments, method 1900 can comprise a procedure of coupling at least one electrical load to the at least one power output.

Figure 20:
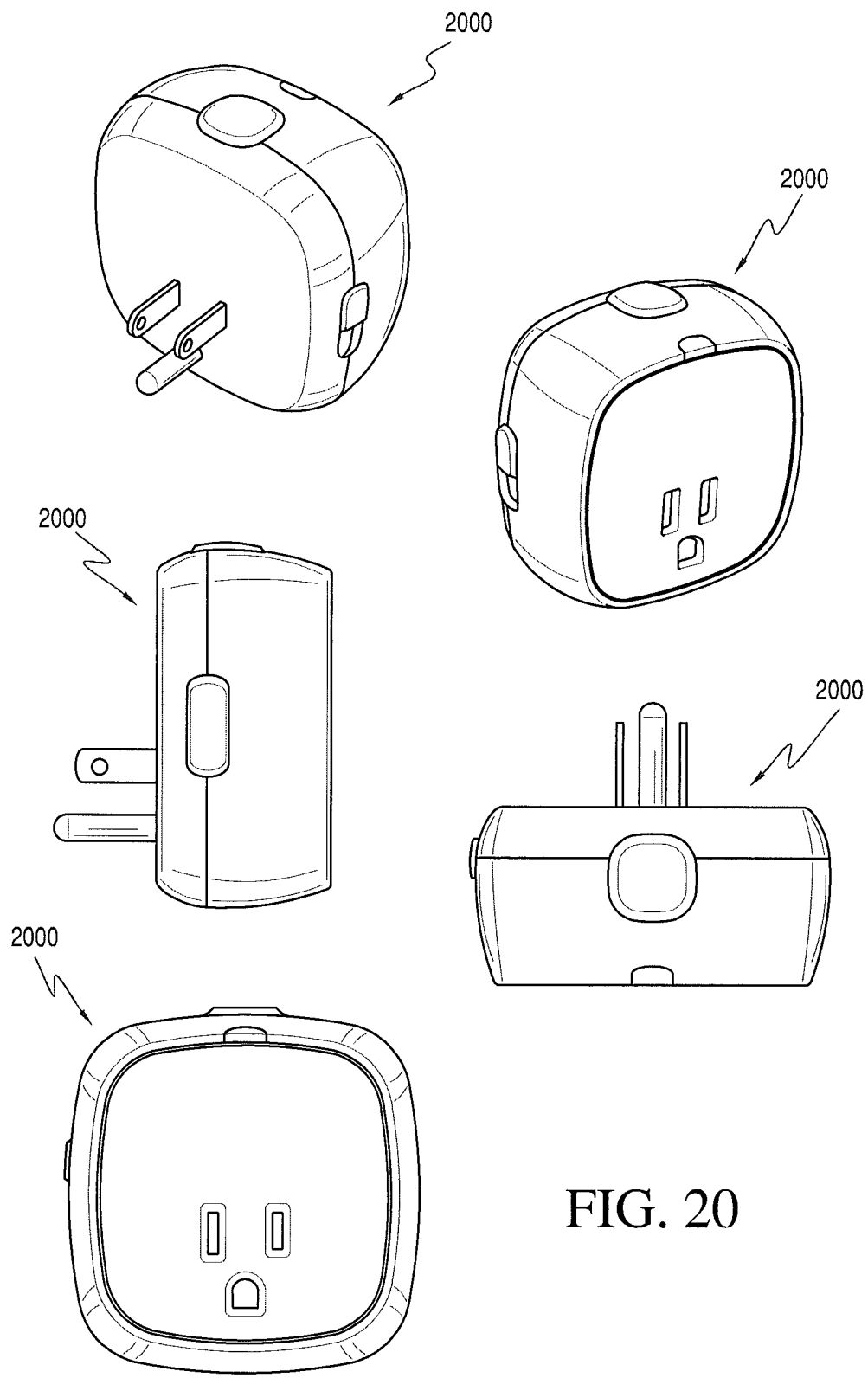
FIG. 20 illustrates multiple views of an embodiment of an exemplary system.

FIG. 20 illustrates multiple views of an embodiment of an exemplary system 2000 comprising electrical system 2100 (FIG. 21), as described below. System 2000 can be similar to system 1100 (FIG. 11), and electrical system 2100 can be similar to system 1200 (FIG. 12). Accordingly, the multiple views of system 2000 illustrated in FIG. 20 can correspond to the similar views of system 1100 (FIG. 11) illustrated in FIGS. 11 and 14-17.

For example, like system 1100 (FIG. 11), in some embodiments, system 2000 and electrical system 2100 (FIG. 21) can be implemented to provide a relocatable power tap (RPT), or another system as described below, being configured to use approximately zero electricity while inactive (e.g., operating in a standby state), to prevent excessive use of electricity while active (e.g., by operating in a run state after operating in a startup state that initially activates system 2000 and/or electrical system 2100 (FIG. 21) and also consumes more electricity than the run state), and/or to be selectively active for a period of time determined by a user. However, through incorporation of electrical system 2100 (FIG. 21) as opposed to system 1200 (FIG. 12), system 2000 (and electrical system 2100 (FIG. 21)) may also provide various advantages and/or may also permit functionality to the user that may not otherwise be available through system 1100 (FIG. 11) (and system 1200 (FIG. 12)). For example and as described in greater detail below, electrical system 2100 (FIG. 21) can prevent damage to electrical system 2100 (FIG. 21) that can result, intentionally or inadvertently, if electrical system 2100 (FIG. 21) remains in a startup state, as described below, for an extended period of time. Furthermore, electrical system 2100 (FIG. 21) can permit the user to define the period of time during which electrical system 2100 (FIG. 21) is selectively active automatically and/or manually.

Furthermore, like system 1200 (FIG. 12), electrical system 2100 (FIG. 21) may also be incorporated in other embodiments of systems for providing electricity distribution and/or electricity management (e.g., other RPTs, such as, for example, multi-outlet controlled power strips, multi-outlet controlled power strips with surge protection, and multi-outlet controlled power strips using various stimuli (e.g., manual, remote, sensor, and the like)) and/or may also be incorporated in any stand-alone device system (e.g., a fan, a television, a computer, a printer, a lamp, etc.).

Figure 21:
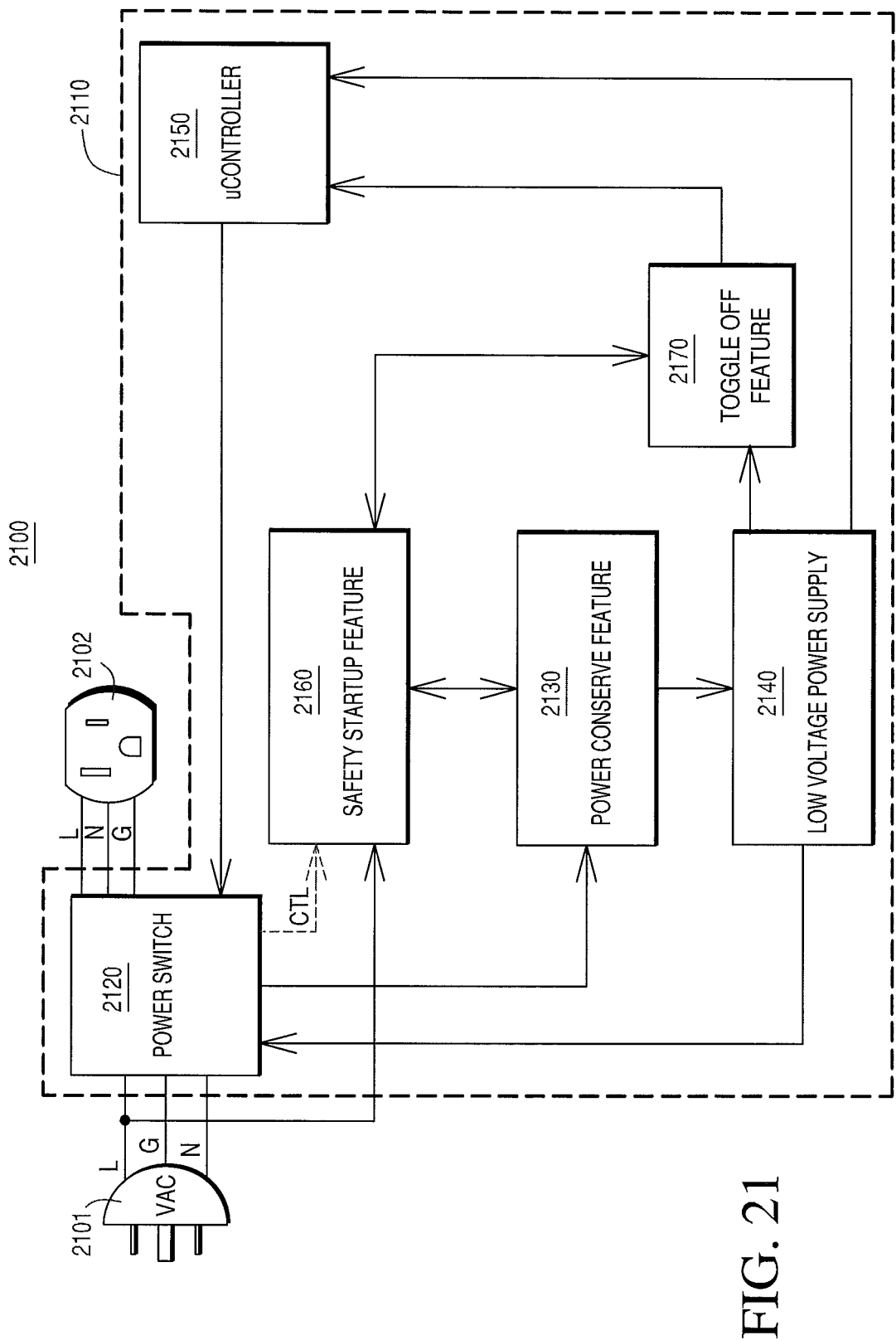
FIG. 21 is a block diagram illustrating an embodiment of an exemplary electrical system.

FIG. 21 is a block diagram illustrating an embodiment of an exemplary electrical system 2100. Electrical system 2100 can be implemented using any of the various embodiments described above with respect to system 2000 (FIG. 20).

Referring now to FIG. 21, electrical system 2100 comprises electrical input 2101. Electrical input 2101 can be configured to receive electricity (e.g., mains electricity), such as, by being coupled to any suitable electrical receptacle. Electrical input 2101 can be similar or identical to power plug 1201 (FIG. 12).

Electrical system 2100 also comprises at least one electrical output 2102. Electrical output(s) 2102 can be configured to be coupled to at least one electrical load (e.g., at least one electronic device). Each electrical output of electrical output(s) 2102 can be similar or identical to outlet 1202 (FIG. 12).

Electrical system 2100 further comprises electrical assembly 2110. In various embodiments, electrical assembly 2110 can be similar to internal assembly 1210 (FIG. 12).

Electrical assembly 2110 still further comprises switch module 2120. Switch module 2120 can be configured to be coupled to at least one of electrical input 2101, startup module 2160, power conservation module 2130, or electrical output(s) 2102. Meanwhile, switch module 2120 also can be coupled to control module 2150 and low-voltage electricity supply module 2140.

In many embodiments, switch module 2120 can be configured to be coupled to electrical input 2101 and electrical output(s) 2102 in response to a start input provided by and/or received from the user via a standby actuator (e.g., a manual switch, a momentary switch, a push button switch, and in some embodiments, a start/stop button, etc.), thereby operating to couple electrical input 2101 and electrical output(s) 2102 together. Providing the start input can be equivalent to coupling electrical input 2101 to startup module 2160 with the standby actuator, as described below. Accordingly, when switch module 2120 is coupling electrical input 2101 to electrical output(s) 2102, when electrical input 2101 is receiving electricity (e.g., alternating current (AC) electricity), and when electrical output(s) 2102 are coupled to the electrical load(s), switch module 2120 can receive the electricity (e.g., the AC electricity) from electrical input 2101 and then make available output electricity (e.g., AC output electricity) to the electrical load(s) coupled to electrical outlet(s) 2102 and/or make available operational electricity (e.g., AC operational electricity) to electrical assembly 2110. Accordingly, the electricity being received at electrical input 2101 can comprise the output electricity and/or the operational electricity. The AC output electricity being made available to electrical outlet(s) 2102 differs from the AC electricity received at electrical input 2101 based upon how much operational electricity is being siphoned away from the AC electricity to operate electrical system 2100 (e.g., switch module 2120 and/or control module 2150, etc.). As will be expanded upon in greater detail below, because in many embodiments at least one aspect of electrical system 2100 can be to minimize the operational electricity utilized by electrical system 2100 for operation while electrical system 2100 is active, in these embodiments, the AC electricity received at electrical input 2101 can be approximately equal to the AC output electricity (i.e., differing in electrical current by no more than nanoamperes, picoamperes, or even femtoamperes). In many embodiments, electrical system 2100 can comprise the standby actuator.

Still referring to FIG. 21, electrical assembly 2110 comprises startup module 2160. Startup module 2160 can be coupled to power conservation module 2130. Meanwhile, startup module 2160 can be configured to be coupled to electrical input 2101, thereby coupling startup module 2160 to electrical input 2101 under certain conditions. Startup module 2160 can be coupled to electrical input 2101 when electrical system 2100 is operating in any of three states (i.e., a startup state, a run state, and a standby state). Specifically, startup module 2160 can be coupled to electrical input 2101 by switch module 2120 and/or by the standby actuator. The manner in which switch module 2120 and the standby actuator are coupling startup module 2160 to electrical input 2101 dictates how and whether startup module 2160 is also coupled to electrical input 2101. In this way, switch module 2120 and the standby actuator can be said to control startup module 2160. Likewise, startup module 2160 can also be configured to be coupled to toggle module 2170 to couple startup module 2160 to toggle module 2170.

As was touched on briefly above and as will be further expanded upon below, because electrical input 2101 is essentially decoupled from electrical assembly 2110 and electrical output(s) 2102 while being in the standby state, electrical system 2100 consumes approximately none of the AC electricity being received at electrical input 2101 while being in the standby state. Accordingly, in the standby state, although switch module 2120 does couple electrical input 2101 to startup module 2160, electrical input 2101 remains decoupled from startup module 2160 in the absence of the standby actuator further coupling electrical input 2101 to startup module 2160. Thus, in these embodiments, because none of the AC electricity received at electrical input 2101 reaches any electricity consuming circuitry of electrical assembly 2110 during the standby state, it can be said that electrical system 2100 consumes approximately none of the AC electricity being received at electrical input 2101 while being in the standby state. While in the standby state, the standby actuator couples startup module 2160 to toggle module 2170.

Meanwhile, in the startup state, switching module 2120 continues coupling startup module 2160 to electrical input 2101 while the standby actuator further couples electrical input 2101 to startup module 2160. When both switching module 2120 and the standby actuator are coupling electrical input 2101 to startup module 2160 during the startup state, startup module 2160 can be coupled to electrical input 2101. Accordingly, in the startup state, startup module 2160 can receive the AC electricity received at electrical input 2101 in the form of AC operational electricity (e.g., high-voltage AC operational electricity). Startup module 2160 can attenuate the AC operational electricity received at startup module 2160 to a lower voltage (e.g. low-voltage AC operational electricity) before making the AC operational electricity available to power conservation module 2130 to which startup module 2160 is coupled as described above. During the startup state, the standby actuator temporarily decouples startup module 2160 from toggle module 2170; however, decoupling startup module 2160 from toggle module 2170 does not necessarily provide any effect on electrical system 2100 until electrical system 2100 is operating in the run state, as is described in greater detail below with respect to toggle module 2170.

As indicated above, electrical assembly 2110 further comprises power conservation module 2130. Power conservation module 2130 can be coupled to low-voltage electricity supply 2140 in addition to startup module 2160. Meanwhile, similar to startup module 2160, power conservation module 2130 can also be coupled to electrical input 2101 by switching module 2120. This configuration can exist both in the startup state as described above with respect to startup module 2160 as well as in the run state. In operation, one difference between the startup state and the run state can be whether the operational electricity being made available by electrical input 2101 to power electrical assembly 2110 is being indirectly received at power conservation module 2130 by first being received at startup module 2160 or is being directly received at power conservation module 2130, bypassing startup module 2160. Accordingly, in the run state, switching module 2120 can be configured so as to decouple (i.e., to the extent that the AC operational electricity must first pass through startup module 2160 before being made available to power conservation module 2130) electrical input 2101 from startup module 2160 and to couple and couple electrical input 2101 to power conservation module 2130 instead.

Power conservation module 2130 can be configured so as to throttle back the operational electricity consumed by electrical assembly 2110 such that the operational electricity consumed by electrical assembly 2110 in the run state is less than the operational electricity consumed by electrical assembly 2110 in the startup state. Specifically, in operation, switching module 2120 consumes part of the operational electricity made available to electrical assembly 2110 in order to couple power conservation module 2130 to electrical input 2101. However, in various embodiments, the operational electricity necessary to initially effectuate coupling power conservation module 2130 (i.e., directly) to electrical input 2101 can exceed the operational electricity necessary to maintain coupling power conservation module 2130 to electrical input 2101. Accordingly, by throttling back the operational electricity consumed by electrical assembly 2110, electrical system 2100 reduces and/or eliminates superfluous electricity being made available to electrical assembly 2110, thereby conserving some of the AC electricity received at electrical input 2101 that is being made available to electrical assembly 2110 and/or electrical output(s) 2102 as AC operational electricity and AC output electricity, respectively.

As a result, in many embodiments, electrical system 2100 operates in the run state after operating in the startup state because the startup state activates switch module 2120 and because the run state maintains the electromechanical configuration of switch module 2120. In various embodiments, in the startup state, receiving sufficient operational electricity at switch module 2120 to cause switch module 2120 to couple and (directly) couple electrical input 2101 to power conservation module 2130 can take approximately 10-50 milliseconds (ms). In the same or different embodiments, upon switch module 2120 coupling electrical input 2101 to power conservation module 2130, electrical system 2100 enters the run state.

In the startup state, when power conservation module 2130 receives the attenuated AC operational electricity from startup module 2160, power conservation module 2130 can further attenuate the AC operational electricity to an even lower voltage before making the AC operational electricity available to low-voltage electricity supply module 2140. Meanwhile, in the run state, when power conservation module 2130 receives unattenuated AC operational electricity from electrical input 2101, power conservation module 2130 can then attenuate the operational electricity to a lower voltage and make available the operational electricity to both startup module 2160 and low-voltage electricity supply module 2140. Whether operating in the startup state or the run state, power conservation module 2130 can attenuate the AC operational electricity without dissipating electrical power of the AC operational electricity. When power conservation module 2130 makes available the AC operational electricity to startup module 2160 in the run state, startup module 2160 can then further attenuate the AC operational electricity in a manner similar to that implemented for the startup state before making the now twice attenuated AC operational electricity available to toggle module 2170.

As indicated above, electrical assembly 2110 also comprises low-voltage electricity supply module 2140. Low-voltage electricity supply module 2140 can be coupled to power conservation module 2130, toggle module 2170, control module 2150, and switch module 2120, as described above. When low-voltage electricity supply module 2140 receives the AC operational electricity from power conservation module 2130, low-voltage electricity supply module 2130 can be configured to transform the AC operational electricity into first direct current (DC) operational electricity, second DC operational electricity, and third DC operational electricity. Low-voltage electricity supply module 2140 makes available the first DC operational electricity to switch module 2120, makes available the second DC operational electricity to control module 2150, and makes available at least a portion of the third DC operational electricity to toggle module 2170. Accordingly, the first DC operational electricity can power switch module 2120, and the second DC operational electricity can power control module 2150. Meanwhile, the portion of the third DC operational electricity can be utilized to implement a stop or standby signal that toggle module 2170 can output to control module 2150, and that can be interrupted by the user via the standby actuator, as described below.

Still referring to FIG. 21, electrical assembly 2110 further comprises toggle module 2170. Toggle module 2170 can be coupled to control module 2150 and low-voltage electricity supply module 2140. Likewise, toggle module 2170 can be configured to be coupled to startup module 2160, as described above. Toggle module 2170 attenuates the AC operational electricity made available to toggle module 2170 by startup module 2160 in the run state and sums the thrice attenuated AC operational electricity with the at least the portion of the third DC operational electricity made available to toggle module 2170. Toggle module 2170 then removes the AC component of the summed thrice attenuated AC operational electricity and the third DC operational electricity, thereby creating fourth DC operational electricity. Toggle module 2170 can output toggle signal 2275, which can comprise the fourth DC operational electricity, and makes toggle signal 2275 available to control module 2150, as described below.

Electrical assembly 2110 comprises control module 2150. Control module 2150 can be configured to control switch module 2120 while electrical system 2100 operates in the run state. Control module 2150 can be configured to receive the second DC operational electricity from low-voltage electricity supply module 2140 and toggle signal 2275 from toggle module 2170. Meanwhile, control module 2150 can be configured to receive a time input provided by and/or received from the user via a timing actuator (e.g., a slide switch, potentiometer, an encoder, a remote device, etc.). Depending on the form of the timing actuator, the time input can be locally and/or remotely provided by and/or received from the user externally and/or internally via mechanical and/or electrical communication. The time input indicates to control module 2150 the period of time for which to permit switch module 2120 to directly couple electrical input 2101 to power conservation module 2130, thereby maintaining electrical input 2101 being coupled to electrical output(s) 2102 to make available the output electricity thereto. For example, in some embodiments, the time input could be 30 minutes, 3 hours, and/or 6 hours. In various embodiments, the timing actuator can provide one or more predetermined time periods from which the user can select the time input. In other embodiments, the timing actuator can be configured such that the user can select (e.g., input) any suitable time period for the time input. In many embodiments, electrical system 2100 can comprise the timing actuator.

Upon receiving the second DC operational electricity from low-voltage electricity supply module 2140 in the startup state, control module 2150 can be configured to startup and to retrieve the time input provided by and/or received from the user via the timing actuator. Following startup and retrieval of the time input, control module 2150 can be configured to begin a countdown timer based on the time input. In some embodiments, if a new time input is provided by and/or received from the user via the timing actuator, before the timer finishes counting down, the new time input is loaded into the countdown timer and the timer is restarted with the new time input. When the timer finishes counting down, control module 2150 can be configured to send DC control electricity (e.g., a control signal) to switch module 2120 that causes switch module 2120 to decouple power conservation module 2130 from electrical input 2101 and to recouple electrical input 2101 to startup module 2160, thereby decoupling electrical assembly 2110 and/or electrical output(s) 2102 from electrical input 2101 and causing electrical system 2100 to return to the default standby state.

In the previous example, the time period during which electrical system 2100 is active (e.g., not in the standby state) is dictated by the time input; however, in the same embodiments, the time period during which electrical system 2100 is active can also be dictated by a stop input provided by and/or received from the user via the standby actuator to control module 2150, as briefly mentioned above. Specifically, upon entering the run state, control module 2150 can be configured to receive toggle signal 2275 from toggle module 2170. Provided that toggle signal 2275 being received by control module 2150 remains uninterrupted, control module 2150 will refrain from sending the DC control electricity to switch module 2120 until the countdown timer finishes counting down. However, providing/receiving the stop input at the standby actuator (e.g., closing the standby actuator while electrical system 2100 is in the run state) operates to at least partially interrupt toggle signal 2275 being received by control module 2150. Accordingly, control module 2150 can be configured to send the DC control electricity to switch module 2120 approximately immediately upon reading the interruption of toggle signal 2275. In this manner, electrical system 2100 can be manually deactivated by the user and/or prior to deactivation upon finishing the countdown of the countdown timer.

In some embodiments, low-voltage electricity supply module 2140 can be configured to indicate that electrical system 2100 is active (e.g., operating in the startup state and/or the run state) via at least one indicator mechanism (e.g., optical indicator mechanism(s), audible indicator mechanism(s), and/or tactile indicator mechanism(s), etc.). In still other embodiments, the indicator mechanism(s) can provide a first indication representing that electrical system 2100 is operating in the startup state and a second indicator representing that electrical system 2100 is operating in the run state. For example, in various embodiments, the indicator mechanism may provide an indication of a greater intensity (e.g., the first indication) during the startup state than during the run state (e.g., the second indication).

Figure 22:
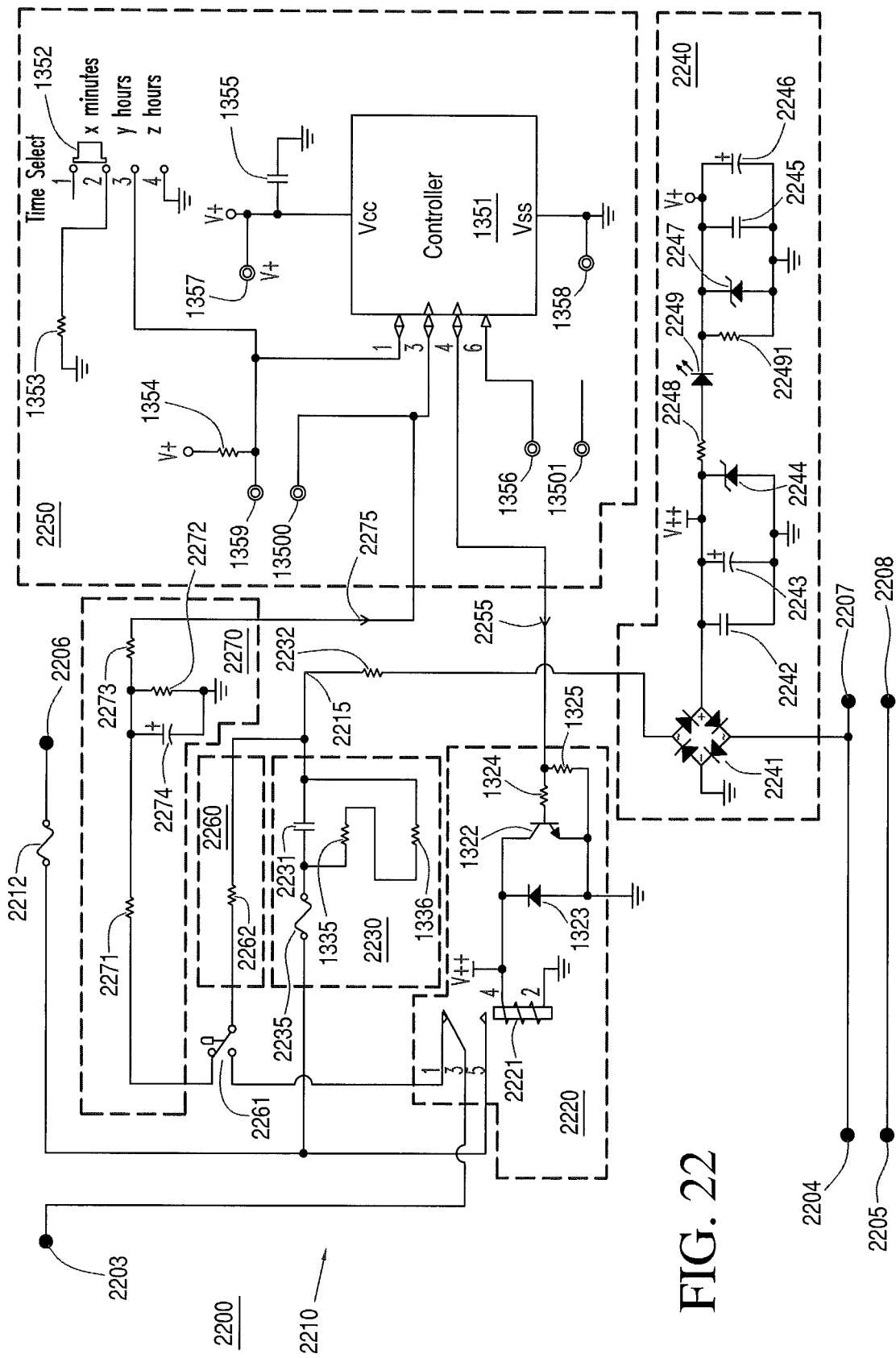
FIG. 22 is a schematic diagram of an embodiment of the electrical system of FIG. 1.

Turning to the next figure, FIG. 22 is a schematic diagram of an embodiment of electrical system 2200. Electrical system 2200 can be similar or identical to electrical system 2100 (FIG. 21).

Referring to FIG. 22, electrical system 2200 comprises electrical assembly 2210. Meanwhile, electrical assembly 2210 comprises switch module 2220, power conservation module 2230, low-voltage electricity supply module 2240, control module 2250, startup module 2260, and toggle module 2270. Electrical assembly 2210 can be similar or identical to electrical assembly 2110 (FIG. 21). Switch module 2220 can be similar or identical to switch module 2120 (FIG. 21). Power conservation module 2230 can be similar or identical to power conservation module 2130 (FIG. 21). Low-voltage electricity supply module 2240 can be similar or identical to low-voltage electricity supply module 2140 (FIG. 21). Control module 2250 can be similar or identical to control module 2150 (FIG. 21). Startup module 2260 can be similar or identical to startup module 2160 (FIG. 21). Toggle module 2270 can be similar or identical to toggle module 2170 (FIG. 21).

Electrical system 2200 can comprise an electrical input module comprising electrical inputs 2203-2205, where electrical input 2203 can be a line-in input, electrical input 2204 can be a neutral-in input, and electrical input 2205 can be a ground input. The electrical input module can be similar or identical to electrical input 2101 (FIG. 21). Accordingly, electricity (e.g., AC electricity) received at the electrical input can be made available to electrical assembly 2210 via line-in 2203 and neutral-in 2204. Meanwhile, electrical system 2200 can comprise at least one electrical output module comprising electrical outputs 2206-2208, where electrical output 2206 can be a line-out output, electrical output 2207 can be a neutral-out output, and electrical output 2208 can be a ground output. The electrical output(s) can be similar or identical to electrical output(s) 2102 (FIG. 21). In an example, the electricity can be 120 VAC at a frequency of 60 Hertz (Hz). The AC electricity received at the electrical input is made available to the default closed contact of the double-throw switch portion of relay 2221 and passed to the default open contact of standby actuator 2261. Standby actuator 2261 can be similar or identical to the standby actuator described above with respect to electrical system 2100 (FIG. 21). In some embodiments, startup module 2260 and/or toggle module 2270 can comprise standby actuator 2261.

In the present example, standby actuator 2261 comprises a first standby actuator terminal coupled to startup module 2260, a second standby actuator terminal coupled to switch module 2220, and third standby actuator terminal coupled to toggle module 2270. Standby actuator 2261 is configurable into a default condition comprising the first standby actuator terminal coupled to the third standby actuator terminal, such as to couple startup module 2260 to toggle module 2270. Standby actuator 2261 is configurable into an actuated condition comprising the first standby actuator terminal coupled to the second standby actuator terminal, such as to couple startup module 2260 to switch module 2220.

Startup module 2260 comprises startup resistor 2262 coupled between the first standby actuator terminal of standby actuator 2261, and electricity supply module 2240. Power conservation module 2230 comprises conservation capacitor 2231 coupled between switch module 2220 and electricity-supply module 2240. In the present example, power conservation module 2230 further comprises conservation resistor 1335 coupled between first and second ends of the conservation capacitor 2231. Also in the present example, power conservation module 2230 further comprises conservation resistor 1336, where conservation resistor 1335 is coupled between the first end of conservation capacitor 2231 and conservation resistor 1336, and where conservation resistor 1336 is coupled between the second end of the conservation capacitor and conservation resistor 1335.

Startup resistor 2262 of startup module 2260 is coupled to conservation capacitor 2231 of power conservation module 2230 at junction node 2215. In the present example, electricity-supply module 2240 is configured to receive, via junction node 2215, at least a portion of the input electricity to generate operational electricity therefrom for one or more modules of electrical system 2200.

Toggle module 2270 comprises a toggle inner node coupling together toggle resistors 2271-2273 and toggle capacitor 2274. Toggle module 2270 also comprises a toggle output node coupled to control module 2250. Toggle resistor 2271 is coupled between toggle inner node and the third standby actuator terminal of standby actuator 2261. Toggle resistor 2272 is coupled between the toggle inner node and ground. Toggle capacitor 2274 is also coupled between the toggle inner node and ground. Toggle resistor 2273 is coupled between the toggle inner node and the toggle output node.

Switch module 2220 comprises relay 2221, which can be similar to relay 1321 of power switch block 1320 (FIG. 13). In general, switch module 2220 can be internally similar to power switch block 1320 (FIG. 13). Relay 2221 comprises a first relay terminal coupled to electrical input 2203, a second relay terminal coupled to standby actuator 2261, and a third relay terminal coupled to power conservation module 2230 and to electrical output 2206. Relay 2221 also comprises a relay coil having a first relay coil terminal coupled to electricity-supply module 2240, and a second relay coil terminal coupled to ground.

Switch module is configurable between a latched condition and an unlatched condition. The unlatched condition comprises the first relay terminal coupled to the second relay terminal when the relay coil is de-energized. The latched condition comprises the first relay terminal coupled to the third relay terminal when the relay coil is energized. When electrical system 2200 is in either of the standby state or the startup state, switch module 2220 is in the unlatched condition and coupled electrical input 2203 to standby actuator 2261. When electrical system 2200 is in the run state, switch module 2220 is in the latched condition and couples electrical input 2203 to power conservation module 2230. The unlatched condition is the default state for relay 2221.

In the present example, switch module 2220 also comprises transistor 1322 having a first terminal coupled to the first relay coil terminal of relay 2221, a second terminal coupled to ground, and a control terminal coupled to control module 2250 and configured to receive switch control signal 2255 therefrom. When switch control signal 2255 is received by transistor 1322 from control module 2250, transistor 1322 is actuated to de-energize the relay coil and set switch module 2220 to the unlatched condition to thereby transition the electrical system 2200 from the run state to the standby state.

In operation, electrical system 2200 can be in a standby state, a run state, and a startup state as described above with respect to electrical system 2100 (FIG. 1). In the present embodiment, during the standby state, electrical input 2203 is decoupled by standby actuator 2261 from electricity-supply module 2240 and from electrical output 2206. Standby actuator 2261 is in the default condition and maintains electrical input 2203 electrically isolated from one or both of startup module 2260 and power conservation module 2230.

During the startup state, electrical input 2203 is coupled through switch module 2220 to electricity-supply module 2240 via startup module 2260, and is decoupled from electrical output 2206. In the startup state, operational electricity for electrical assembly 2210 is sourced by electricity-supply module 2240 through startup module 2260.

During the run state electrical input 2203 is coupled through switch module 2220 to electricity-supply module 2240 via power conservation module 2230, and is coupled to electrical output 2206. In the run state, the operational electricity for electrical assembly 2210 is sourced by electricity-supply module 2240 through power conservation module 2230. While standby actuator 2261 remains in its default condition, electrical input 2203 is coupled to toggle module 2270, via power conservation module 2230 and startup module 2260, to establish toggle signal 2275 as output for toggle module 2270. If, during the run state, standby actuator 2261 is actuated to its actuated condition, then electrical input 2203 is decoupled from toggle module 2270 such as to interrupt toggle signal 2275, thereby requesting that electrical system 2200 be toggled from the run state to the standby state.

In the startup state, with standby actuator 2261 is in its actuated condition, relay 2221 of switch module 2220 is set to couple electrical input 2203 to startup module 2260, and the AC electricity received at electrical input 2203 passes to resistor 2262 of startup module 2260 as operational electricity for electrical assembly 2210 in the startup state. Resistor 2262 attenuates the AC operational electricity to a lower voltage before the AC operational electricity passes to power conservation module 2230, bypassing capacitor 2231 in the process, where resistor 2232 attenuates the AC operational electricity further to an even lower voltage before passing the AC operational electricity to low-voltage electricity supply module 2240 to power electrical assembly 2210 (e.g., switch module 2220 and/or control module 2250). At low-voltage electricity supply module 2240, the now twice attenuated AC operational electricity continues to diode bridge 2241 and returns to neutral at electrical input 2204. As illustrated in FIG. 22, diode bridge 2241 can comprise a single module diode bridge. Nonetheless, in other embodiments, diode bridge 2241 may be implemented as one or more discrete diodes configured to provide the functionality of the diode bridge.

Upon passing through diode bridge 2241, the AC operational electricity can be transformed to DC operational electricity. A first DC operational electricity can then be produced at low-voltage electricity supply module 2240 via any number of methodologies, such as, for example, applying a DC filter and DC regulator to the DC operational electricity output by diode bridge 2241. One example of such a DC filter and DC regulator can be the DC filter of low-voltage electricity supply module 2240 comprising capacitors 2242 and 2243 and the DC regulator of low-voltage electricity supply module 2240 comprising Zener diode 2244.

Low-voltage electricity supply module 2240 makes available the first DC operational electricity to a coil portion (at pin 4) of relay 2221 of switch module 2220, thereby causing the double-throw switch portion of relay 2221 to close and latch (described below) and couple the electrical input to the electrical output(s) to make available output electricity to any electrical load(s) coupled to the electrical output(s). When relay 2221 latches, the default open (contact 5) of the double-throw switch portion of relay 2221 is then closed, coupling the electrical input to power conservation module 2230 to allow at least a portion of the AC electricity received at the electrical input to pass through fuse 2235 to capacitor 2231 of power conservation module 2230 as the AC operational electricity of the run state. Accordingly, when relay 2221 latches, electrical system 2200 begins operating in the run state. In these embodiments, there can be enough inertia in the relay armature (contact 3) of relay 2221 so that by the time the relay armature starts to move and breaks contact with the default closed contact (contact 1) of relay 2221 there is sufficient operational electricity stored in capacitor 2243 to move the armature to close the default open contact (contact 5) of relay 2221. In some embodiments, it can take about approximately 0.5 to 3 cycles of the AC electricity being made available to electrical assembly 2220 to charge capacitor 2243 to a point where it is about ready to close relay 2221 with the first DC operational electricity. As the AC electricity passes through capacitor 2231, capacitor 2231 attenuates the voltage of the AC electricity without dissipating any electrical power of the AC electricity, thereby using less real electrical power to operate electrical system 2200. Additionally, when relay 2221 is latched, the AC electricity received at the electrical input is prevented from continuously being made available to electrical assembly 2210 without being attenuated to a lower voltage, such as to prevent damage to internal electrical assembly 2210. While in the run state, the closing of the default open contact of relay 2221 allows the output electricity to be made available to the electricity output(s) through fuse 2212 and on through line-out 2206 and neutral-out 2207 while the AC operational electricity is siphoned off through fuse 2235 to capacitor 2231.

Approximately simultaneously to the production of the first DC operational electricity, low-voltage electricity supply module 2240 can also produce second DC operational electricity by any number of methodologies, such as, for example applying a DC filter, a DC regulator, and DC attenuator to the first DC operational electricity. One example of such a DC filter, DC regulator, and DC attenuator can be the DC filter of low-voltage electricity supply module 2240 comprising capacitors 2245 and 2246, the DC regulator of low-voltage electricity supply module 2240 comprising of Zener diode 2247, and the DC attenuator of low-voltage electricity supply module 2240 comprising resistor 2248, light emitting diode (LED) 2249 (functioning as a visual indicator), and resistor 22491 that is associated with LED 2249. Low-voltage electricity supply module 2240 makes available the second DC operational electricity to control module 2250. When control module 2250 receives the second DC operational electricity, control module 2250 initializes and begins running a control program.

Approximately simultaneously to producing the first DC operational electricity and the second DC operational electricity, low-voltage electricity supply module 2240 further produces third DC operational electricity. In some embodiments, the third DC operational electricity is made available to toggle module 2270.

As described above, control module 2250 initializes its pins, timers, interrupts and variables (as well as any other start up requirements) and then starts the control program. In some embodiments, the control program instructs control module 2250 to enter a loop and sequentially do the following: checking for a time input and, if new, retrieving and loading the time input into a countdown timer of control module 2250; checking to see if control module 2250 has received toggle signal 2275 from toggle module 2270 and then determining whether toggle signal 2275 has been interrupted; and checking to see if the countdown timer has completed counting down from the time input. In the event that control module 2250 has received toggle signal 2275 from toggle module 2270 and then determined that toggle signal 2275 is interrupted or that the countdown timer has completed counting down the time duration input, control module 2250 can send DC control electricity (like switch control signal 2255) to switch module 2220, thereby unlatching double-throw switch portion of relay 2221 and decoupling the electrical input from the electrical output(s).

While electrical system 2200 operates in the run state and standby actuator 2261 is in its default condition, the attenuated AC operational electricity passing through the capacitor 2231 continues on to resistor 2262 of startup module 2260 approximately simultaneously with continuing on to resistor 2232. Like resistor 2232, resistor 2262 further attenuates the AC operational electricity before making the AC operational electricity available to toggle module 2270. Upon arriving at toggle module 2270, the AC operational electricity is next passed through an electrical network composed of resistor 2271, resistor 2272, resistor 2273, and capacitor 2274. In some embodiments, resistors 2271 and 2272 form a divide-by-2 voltage divider. Because the bottom of the voltage divider resistor 2272 is referenced to ground, one diode in diode bridge 2241 helps to make the voltage across resistor 2272 appear as a half wave DC signal. Capacitor 2274 smoothes this voltage which is then passed through resistor 2273 to pin 3 of microcontroller 1351 of control module 2250.

The mechanism described above for toggle module 2270 sums the third DC operational electricity with the attenuated AC operational electricity, and removes the AC component such as to produce the fourth DC operational electricity that is then made available to control module 2250 as toggle signal 2275. In some embodiments, resistor 2273 provides resistive isolation from capacitor 2274 so that microcontroller 1351 can be programmed in circuit (as pin 3 shares this function).

When programmed, microcontroller 1351 of control module 2250 sets pin 3 to an analog to digital (ADC) input. This ADC input is thus configured to monitor toggle signal 2275 from toggle module 2270. When microcontroller 1351 first senses toggle signal 2275, microcontroller 1351 waits for the interruption of toggle signal 2275 being received at control module 2250, as described above with respect to electrical system 2100 (FIG. 21) and below. So long as standby actuator 2261 remains reopened and control module 2250 does not output switch control signal 2255 to switch module 2220, toggle module 2270 makes available toggle signal 2275 to control module 2250. If standby actuator 2261 is then closed again while electrical system 2100 is operating in the run state, toggle signal 2275 is interrupted causing control module 2250 to output switch control signal 2255 to switch module 2220, thereby unlatching double-throw switch portion of relay 2221 and decoupling electrical input 2203 from electrical output 2206 and from power conservation module 2230.

In some embodiments, electrical system 2200 uses about 4.5 W of AC operational electricity for only approximately 30 milliseconds in the startup state while using only approximately 0.2 W in the run state.

Figure 23:
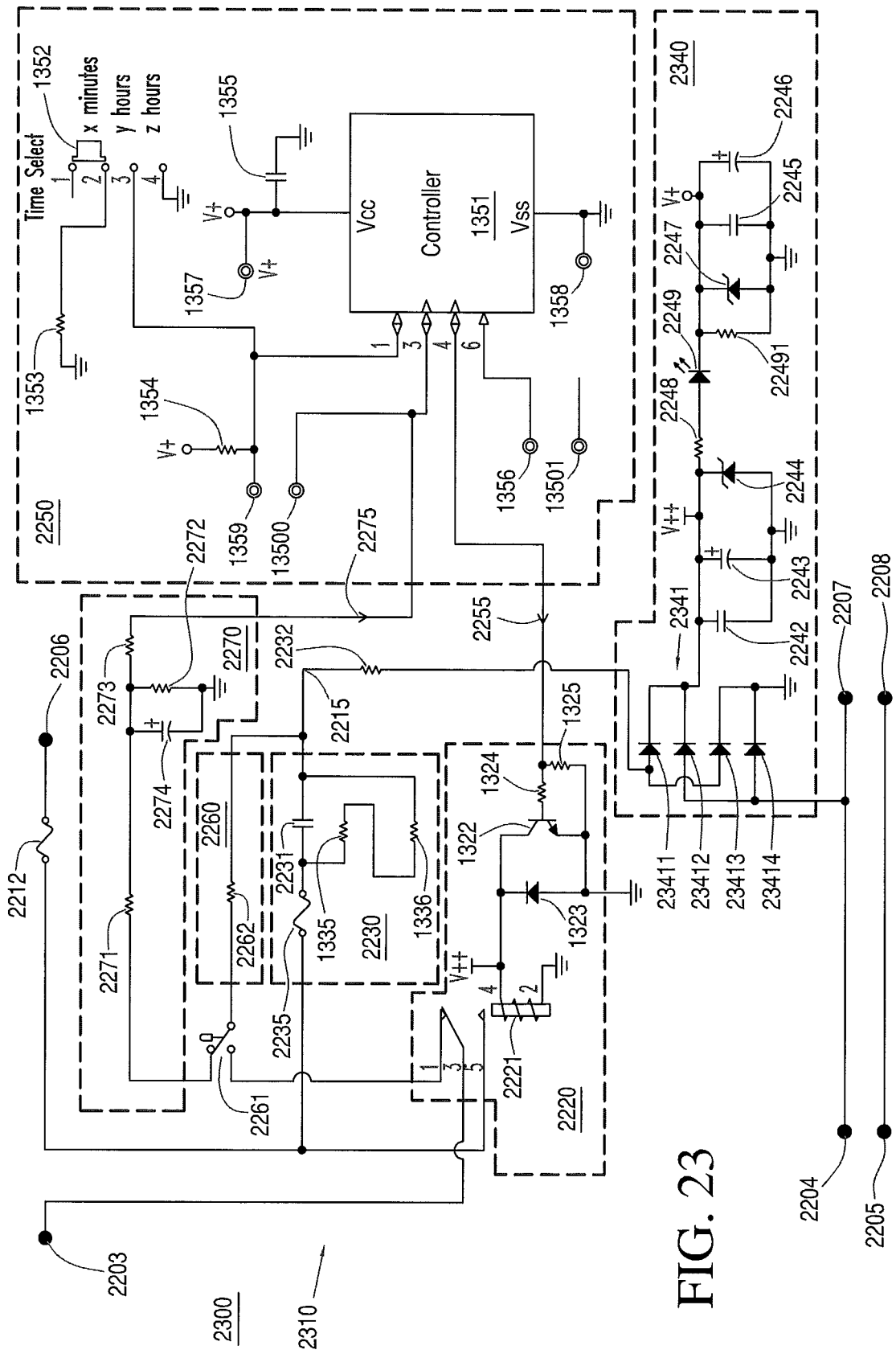
FIG. 23 is a schematic diagram of another embodiment of the electrical system of FIG. 1.

Turning to the next figure, FIG. 23 is a schematic diagram of an embodiment of electrical system 2300. Electrical system 2300 can be substantially similar to electrical system 2200 (FIG. 22) but with modifications incorporated to reduce component costs for certain component vendors.

Electrical system 2300 comprises electrical assembly 2310. Meanwhile, electrical assembly 2310 comprises switch module 2220, power conservation module 2230, low-voltage electricity supply module 2340, control module 2250, startup module 2260, and toggle module 2270. Electrical assembly 2310 can be similar to electrical assembly 2210 (FIG. 22). Low-voltage electricity supply module 2340 can be similar to low-voltage electricity supply module 2240 (FIG. 22).

In FIG. 23, diode bridge 2241 (e.g., a single module diode bridge) of FIG. 22 can be replaced with discrete diodes 23411-23414 being arranged as diode bridge 2341. In these embodiments, discrete diodes 23411-23414 operate substantially similarly to diode bridge 2241 (FIG. 22).

Figure 24:
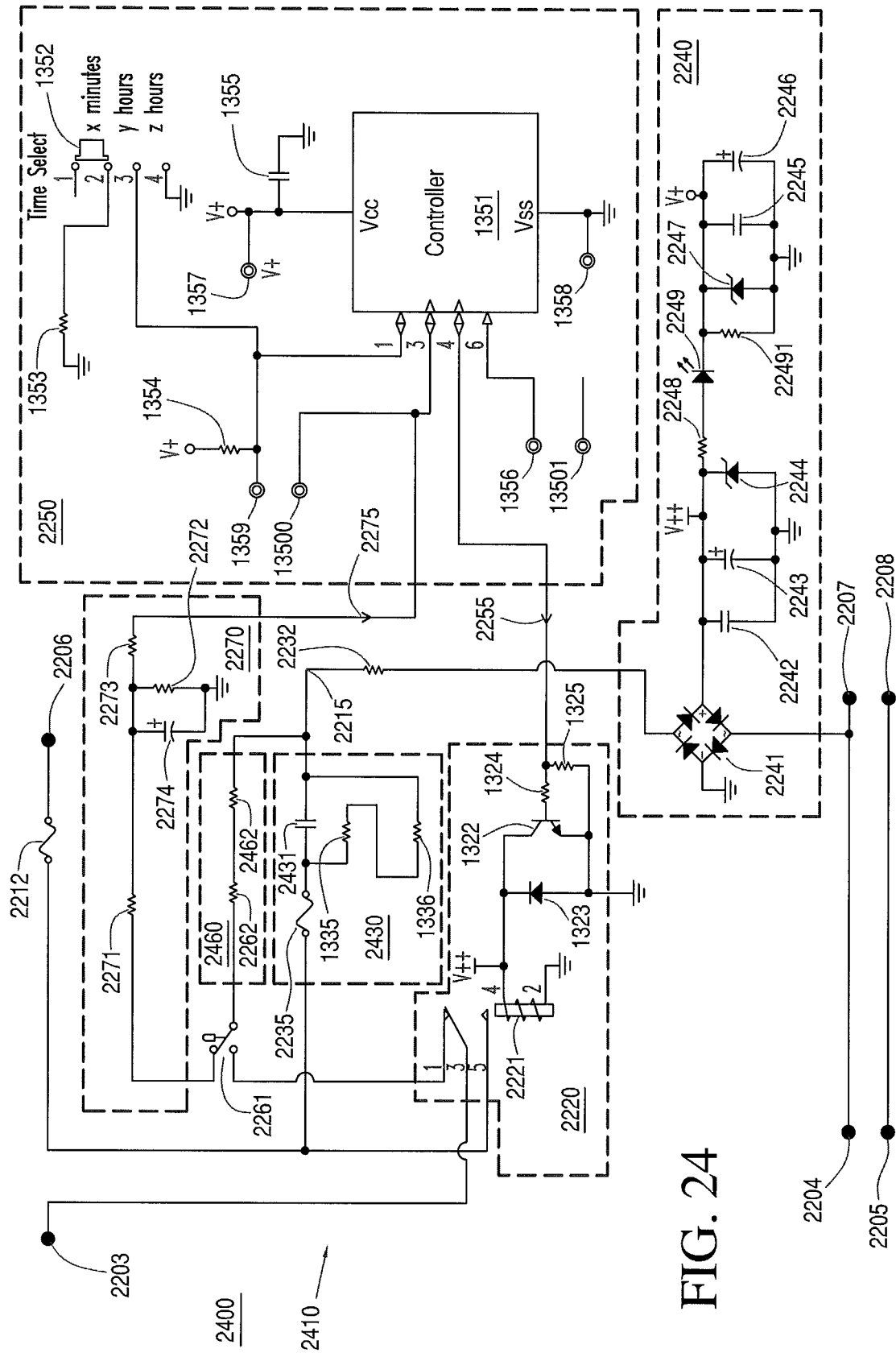
FIG. 24 is a schematic diagram of another embodiment of the electrical system of FIG. 1.

Next, FIG. 24 is a schematic diagram of an embodiment of electrical system 2300. Electrical system 2300 can be substantially similar to electrical system 2200 (FIG. 22) but with modifications incorporated to accommodate 230 VAC electricity having a frequency of 50 Hz electricity received at the electrical input as opposed to the 120 VAC electricity having a frequency of 60 Hz, as described above with respect to electrical system 2200 (FIG. 22). In other embodiments, the magnitude of the AC electricity received at the electrical input can be slightly greater (e.g., 240 VAC).

Electrical system 2400 comprises electrical assembly 2410. Meanwhile, electrical assembly 2410 comprises switch module 2220, power conservation module 2430, low-voltage electricity supply module 2240, control module 2250, startup module 2460, and toggle module 2270. Electrical assembly 2410 can be similar or identical to electrical assembly 2210 (FIG. 22). Power conservation module 2430 can be similar to power conservation module 2240 (FIG. 22), and startup module 2460 can be similar to module 2260 (FIG. 22).

In some embodiments, power conservation module 2430 comprises capacitor 2431. Capacitor 2431 has a lower value of electrical capacitance than capacitor 2231 (FIG. 22) to accommodate the exemplary AC electricity range referenced with respect to FIG. 24, above. Still, replacing capacitor 2231 (FIG. 22) with a capacitor having half the electrical capacitance of capacitor 2231 (FIG. 22) may be insufficient to accommodate the exemplary AC electricity range provided for FIG. 24 as the frequency of the exemplary AC electricity range is twenty percent lower (e.g., 50 Hz versus 60 Hz) in frequency than the frequency of the exemplary AC electricity range provided with respect to FIG. 22. Accordingly, in these embodiments, capacitor 2431 has two-thirds of the electrical capacitance of capacitor 2231 (FIG. 22). Further to this embodiment, startup module 2460 comprises resistors 2462 and 2262.

In some embodiments, start up module 2460 comprises resistor 2462 which is added in series with resistor to accommodate the exemplary AC electricity range referenced with respect to FIG. 24, above. In an example, because the magnitude of the AC operational electricity in FIG. 24 is twice that of the magnitude of the AC operational electricity in FIG. 22, the electrical resistance of resistor 2462 is the same as the electrical resistance of resistor 2262.

Figure 25:
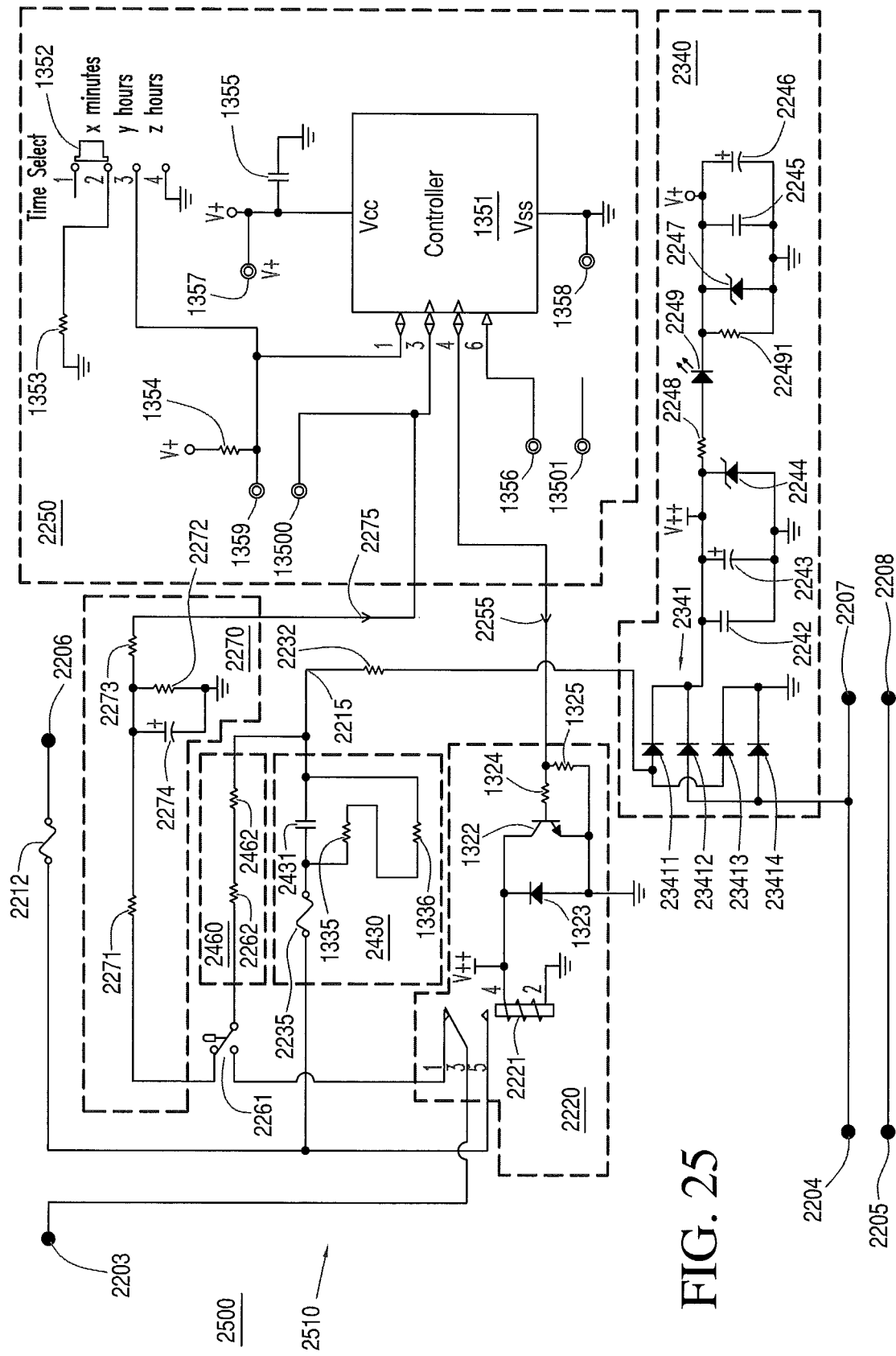
FIG. 25 is a schematic diagram of another embodiment of the electrical system of FIG. 1.

Turning to the next figure, FIG. 25 is a schematic diagram of an embodiment of electrical system 2500. Electrical system 2500 can be substantially similar to electrical system 2400 (FIG. 24) but with modifications incorporated to reduce component costs for certain component vendors.

Referring to FIG. 25, electrical system 2500 comprises electrical assembly 2510. Meanwhile, electrical assembly 2510 comprises switch module 2220, power conservation module 2430, low-voltage electricity supply module 2340, control module 2250, startup module 2460, and toggle module 2270. Electrical assembly 2510 can be similar to electrical assembly 2410 (FIG. 24). Electrical system 2500 is substantially similar to electrical system 2400 (FIG. 24) only differing from electrical system 2400 (FIG. 24) in so much as electrical system 2300 (FIG. 23) differs from electrical system 2200 (FIG. 22). Noted similarities between electrical system 2500 and electrical system 2300 (FIG. 23) include the incorporation of discrete diodes 23411-23414 that are arranged as diode bridge 2341.

Any elements of FIGS. 22-25 that are not specifically referenced with respect to the descriptions of FIGS. 22-25 can be substantially similar and/or perform substantially similarly to those visually corresponding elements provided in and described for RPT 1300 (FIG. 13).

Figure 26:
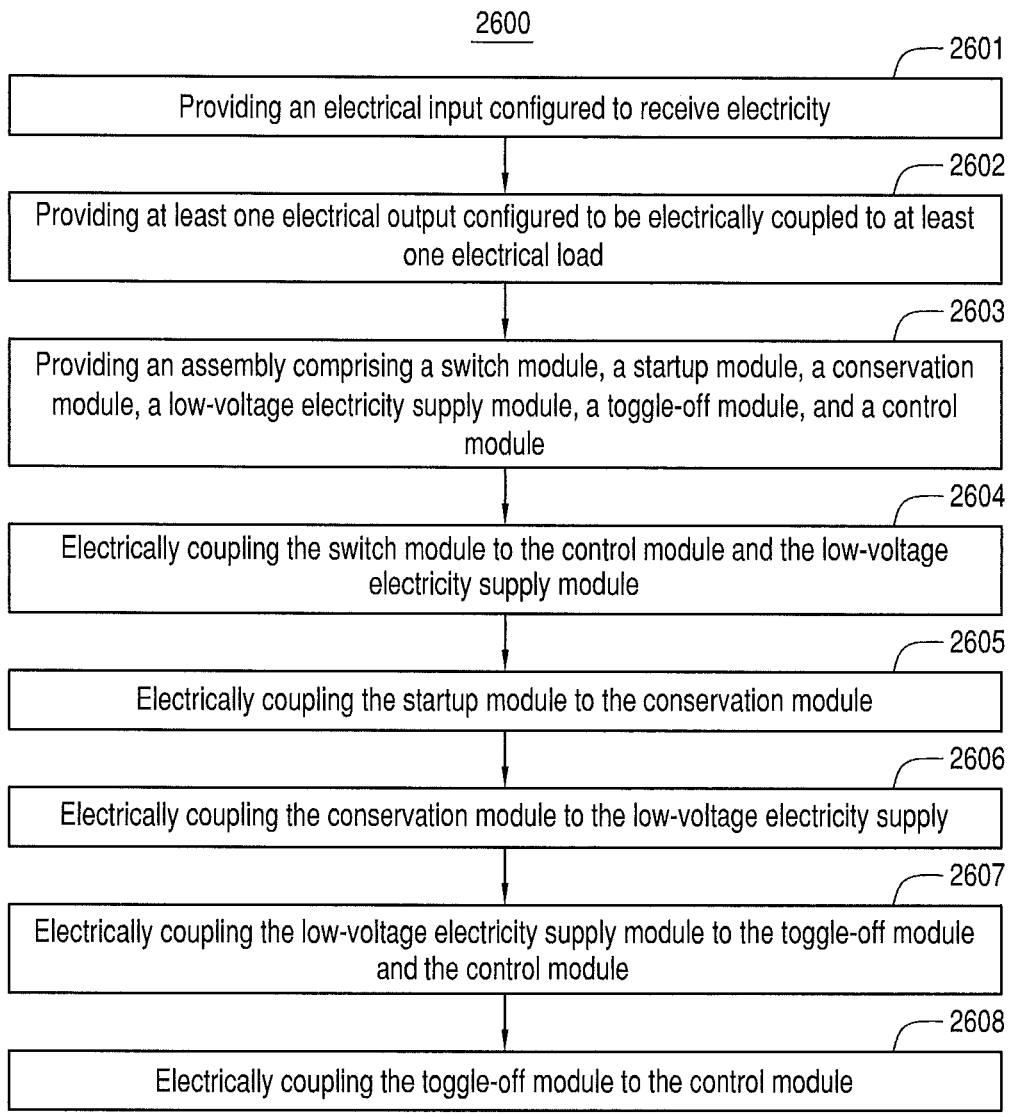
FIG. 26 illustrates a flow chart for an embodiment of a method for manufacturing an electrical system.

Returning again to the figures, FIG. 26 illustrates a flow chart for an embodiment of a method 2600 for manufacturing an electrical system. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of the method 2600 can be performed in any other suitable order. In still other embodiments, one or more of the procedures, the processes, and/or the activities in method 2600 can be combined or skipped. The electrical system can be similar or identical to electrical system 2100 and/or to one of electrical systems 2200 (FIG. 22), 2300 (FIG. 23), 2400 (FIG. 24), or 2500 (FIG. 25).

Method 2600 can comprise procedure 2601 of providing an electrical input configured to receive electricity. The electrical input can be similar or identical to electrical input electrical input 2101 (FIG. 21). In some embodiments, the electricity received at the electrical input comprises operational electricity. The operational electricity can be similar or identical to the operational electricity described above with respect to electrical system 2100 (FIG. 21).

Method 2600 can also comprise procedure 2602 of providing at least one electrical output configured to be coupled to at least one electrical load. The electrical output(s) can be similar or identical to electrical output(s) 2102 (FIG. 21). In some embodiments, while output electricity is being made available to the electrical output(s) for the period of time determined by the user, the electricity further comprises the output electricity. The output electricity can be similar or identical to the output electricity described above with respect to electrical system 2100 (FIG. 21).

Method 2600 can further comprise procedure 2603 of providing an electrical assembly comprising a switch module, a startup module, a power conservation module, a low-voltage electricity supply module, a toggle module, and a control module. The electrical assembly can be similar to electrical assembly 2110 (FIG. 21). The switch module can be similar or identical to switch module 2120 (FIG. 21). The startup module can be similar or identical to startup module 2160 (FIG. 21). The power conservation module can be similar or identical to power conservation module 2160 (FIG. 21). The low-voltage electricity supply module can be similar or identical to low-voltage electricity supply module 2140 (FIG. 21). The toggle module can be similar or identical to toggle module 2170 (FIG. 21). The control module can be similar or identical to control module 2150 (FIG. 21).

Next, method 2600 can comprise procedure 2604 of coupling the switch module to the control module and the low-voltage electricity supply module, procedure 2605 of coupling the startup module to the power conservation module, procedure 2606 of coupling the power conservation module to the low-voltage electricity supply, procedure 2607 of coupling the low-voltage electricity supply module to the toggle module and the control module, and/or procedure 2608 of coupling the toggle module to the control module.

Figure 27:
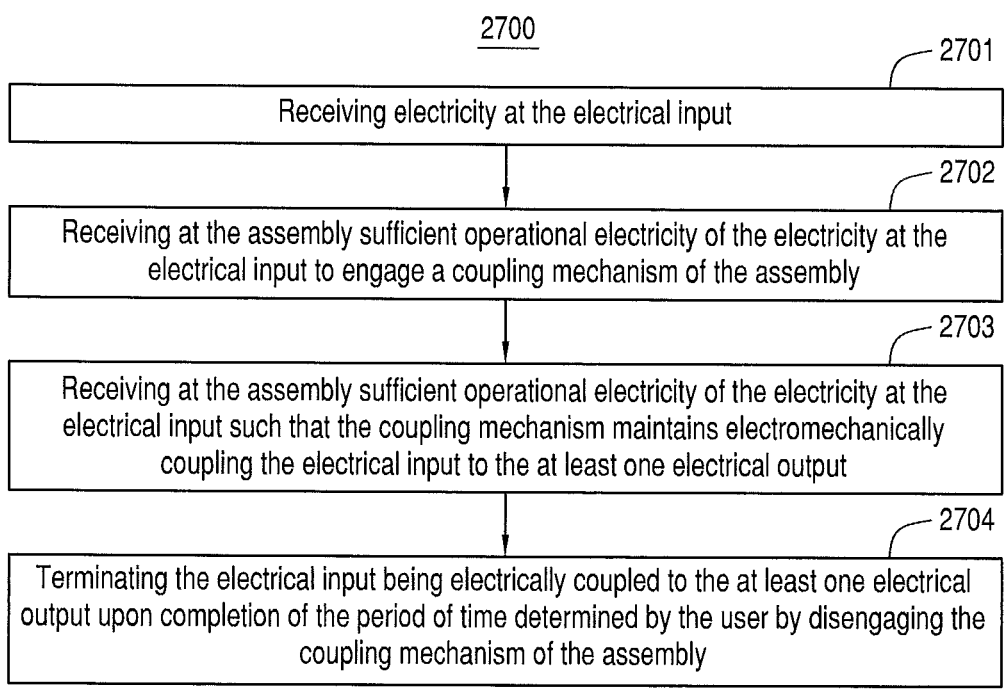
FIG. 27 illustrates a flow chart for an embodiment of a method for selectively coupling an electrical input to at least one electrical output with an assembly in order to make available output electricity to the at least one electrical output for a period of time determined by a user.

Turning to the next figure, FIG. 27 illustrates a flow chart for an embodiment of a method 2700 for selectively coupling an electrical input to at least one electrical output with an electrical assembly in order to make available output electricity to the at least one electrical output for a period of time determined by a user. Method 2700 is merely exemplary and is not limited to the embodiments presented herein. Method 2700 can be employed in many different embodiments or examples not specifically depicted or described herein. In some embodiments, the procedures, the processes, and/or the activities of method 2700 can be performed in the order presented. In other embodiments, the procedures, the processes, and/or the activities of the method 2700 can be performed in any other suitable order. In still other embodiments, one or more of the procedures, the processes, and/or the activities in method 2700 can be combined or skipped. The electrical system can be similar or identical to electrical system 2100 (FIG. 21). The electrical input can be similar or identical to electrical input 2101 (FIG. 21). The electrical system can be similar or identical to electrical system 2100 and/or to one of electrical systems 2200 (FIG. 22), 2300 (FIG. 23), 2400 (FIG. 24), or 2500 (FIG. 25). The electrical output(s) can be similar or identical to electrical output(s) 2102 (FIG. 21). The electrical assembly can be similar or identical to electrical assembly 2110 (FIG. 21).

Method 2700 can comprise procedure 2701 of receiving electricity at the electrical input. Procedure 2701 can be performed in a manner similar to that describe above with respect to electrical system 2100 (FIG. 21) for receiving electricity at electrical input 201 (FIG. 21).

Method 2700 can also comprise procedure 2702 of receiving at the electrical assembly sufficient operational electricity of the electricity at the electrical input to engage a coupling mechanism of the electrical assembly, where the coupling mechanism operates to couple the electrical input to the electrical output(s) such that the electrical assembly couples the electrical input to the electrical output(s) to make available output electricity of the electricity at the electrical input to the electrical output(s) for the period of time determined by the user. In various embodiments, the coupling mechanism can be similar to switch module 2120 (FIG. 21) and/or relay 2221 (FIG. 22). Coupling the electrical input to the electrical output(s) can be performed in a manner similar to that described above with respect to electrical system 2100 (FIG. 21) and electrical system 2200 (FIG. 22). The output electricity and the electricity at the electrical input can be similar to the output electricity and the electricity received at the input as described above with respect to electrical system 2100 (FIG. 21) and electrical system 2200 (FIG. 22).

Method 2700 can further comprise procedure 2703 receiving at the electrical assembly sufficient operational electricity of the electricity at the electrical input such that the coupling mechanism maintains coupling the electrical input to the at least one electrical output, where the operational electricity sufficient to activate the coupling mechanism exceeds the operational electricity sufficient to maintain coupling the electrical input to the at least one electrical output. Procedure 2703 can be performed after procedure 2702 is performed and/or occurs. The operational electricity can be similar to the operational electricity described above with respect to electrical system 2100 (FIG. 21) and electrical system 2200 (FIG. 22).

Next, method 2700 can comprise procedure 2704 of terminating the electrical input being coupled to the at least one electrical output upon completion of the period of time determined by the user by disengaging the coupling mechanism of the electrical assembly. The time period and the manner for determining the time period can be similar to the time period and the manner for determining the time period as described above with respect to electrical system 2100 (FIG. 21) and electrical system 2200 (FIG. 22).

Figure 28:
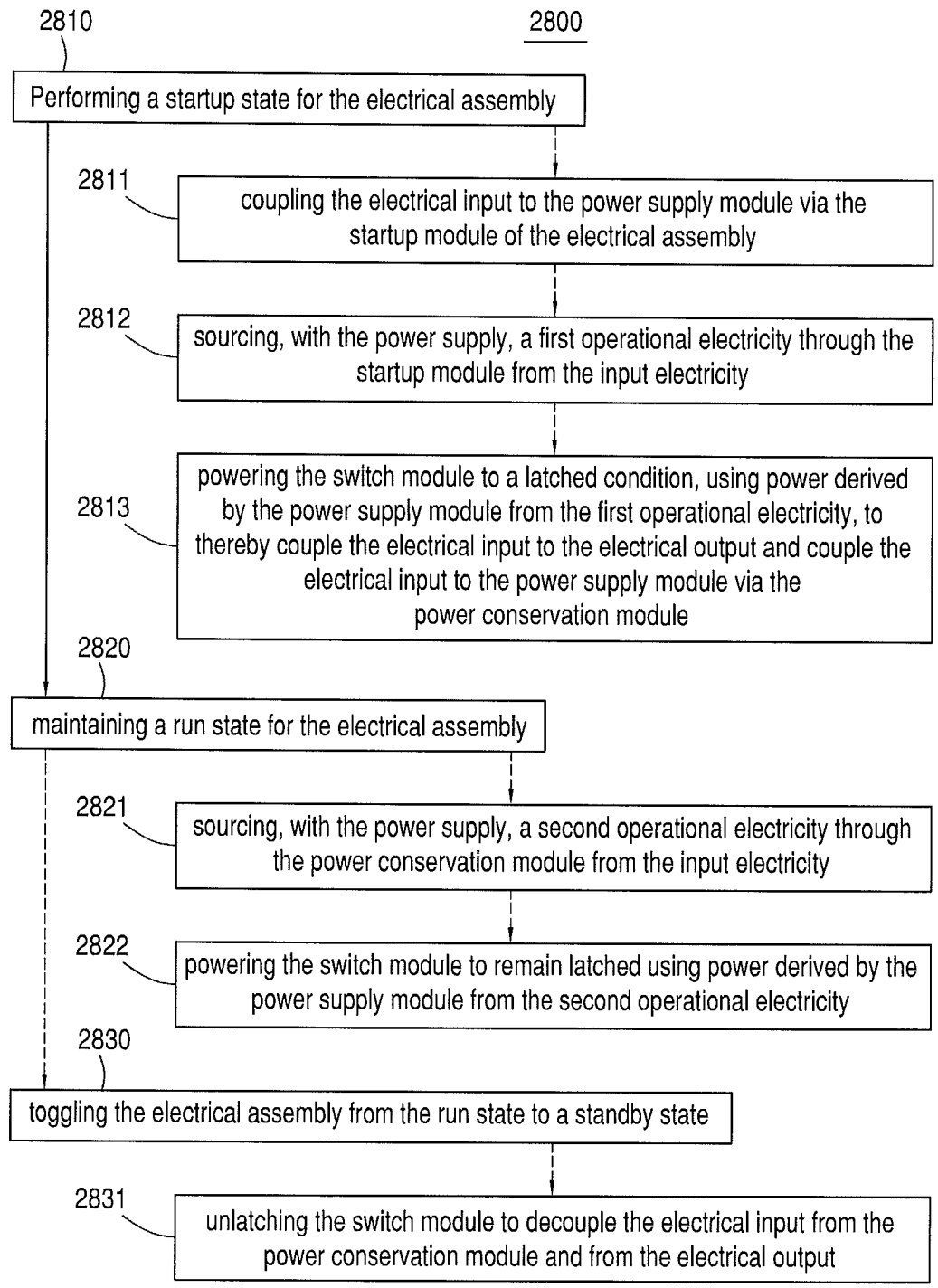
FIG. 28 illustrates a flow chart for another embodiment of a method for selectively coupling an electrical input to at least one electrical output with an assembly in order to make available output electricity to the at least one electrical output for a period of time determined by a user.

FIG. 28 illustrates a flow chart for an embodiment of a method 2800 for selectively coupling an electrical input to an electrical output with an electrical assembly in order to make available output electricity to the at least one electrical output for a period of time determined by a user. Method 2800 is merely exemplary and is not limited to the embodiments presented herein. Method 2800 can be employed in many different embodiments or examples not specifically depicted or described herein. In some embodiments, the procedures, the processes, and/or the activities of method 2800 can be performed in the order presented. In other embodiments, the procedures, the processes, and/or the activities of the method 2800 can be performed in any other suitable order. In still other embodiments, one or more of the procedures, the processes, and/or the activities in method 2800 can be combined or skipped. The electrical system can be similar or identical to electrical system 2100 (FIG. 21) in some implementations, and/or to one of electrical systems 2200 (FIG. 22), 2300 (FIG. 23), 2400 (FIG. 24), or 2500 (FIG. 25).

Method 2800 comprises procedure 2810 for performing a startup state for the electrical assembly, where the startup state can be similar to that described above with respect to electrical assembly 2110 (FIG. 21) and/or electrical assembly 2210 (FIG. 22). Procedure 2810 can comprise several subprocedures, such as subprocedures 2811-2813.

Subprocedure 2811 of procedure 2810 comprises coupling the electrical input to the power supply module via the startup module of the electrical assembly. In some examples, the electrical input can be similar to electrical input 2203 (FIG. 22), the power supply module can be similar to power supply module 2240 (FIG. 22), and the startup module can be similar to startup module 2260 (FIG. 2). In the same or other examples, subprocedure 2811 can be executed by actuating an input mechanism such as standby actuator 2261 (FIG. 22).

Subprocedure 2812 of procedure 2810 comprises sourcing, with the power supply, a first operational electricity through the startup module from the input electricity. In some examples, the first operational electricity can be sourced through a resistor of the startup module, as described above with respect to the operational electricity sourced through startup resistor 2262 of startup module 2260 (FIG. 22).

Subprocedure 2813 of procedure 2810 comprises powering a switch module to a latched condition, using power derived by the power supply module from the first operational electricity, to thereby couple the electrical input to the electrical output and couple the electrical input to the power supply module via a power conservation module. In some examples, the switch module can be similar to switch module 2120 (FIG. 1) and/or switch module 2220 (FIG. 22), while the power conservation module can be similar to power conservation module 2130 (FIG. 21) and/or power conservation module 2230 (FIG. 22). In the same or other examples, the latched condition can be similar to that described above with respect to switch module 2220, coupling electrical input 2203 to power conservation module 2230 via latched relay 2221 of switch module 2220.

Method 2800 also comprises procedure 2820 for maintaining a run state for the electrical assembly, where procedure 2820 comprises subprocedures 2821-2822. Once the latched condition of the switch module has been established in subprocedure 2813, the electrical assembly is set to the run state, which can be similar to the run state described above with respect to electrical assembly 2110 (FIG. 21) and/or 2210 (FIG. 22).

Subprocedure 2821 comprises sourcing, with the power supply, a second operational electricity through the power conservation module from the input electricity. In some examples, the second operational electricity can be sourced through a capacitor of the startup module, as described above with respect to the operational electricity sourced through capacitor 2231 of power conservation module 2230 (FIG. 22).

Subprocedure 2822 comprises powering the switch module to remain latched using power derived by the power supply module from the second operational electricity. As an example, switch module 2220 can be powered by power supply module 2240 while power supply module 2240 is coupled to power conservation module 2230. The second operational electricity sourced through power conservation module 2230 is sufficient to permit power supply module 2240 to supply switch module 2220 with enough power to retain relay 2221 latched and thereby maintain the run state. The second operational electricity of the run state is less than the first operational electricity of the startup state.

Method 2800 can also comprise procedure 2830 for toggling the electrical assembly from the run state to a standby state. In some implementations, the such toggling can be carried out as described above with respect to electrical assembly 2110 (FIG. 21) and/or 2210 (FIG. 22), whether as a result from a toggle signal from like toggle signal 2275 output by toggle module 2270 (FIG. 22), or as a result of a completion of a specified time duration like the time duration input via input mechanism 1352 to control module 2250.

Subprocedure 2831 of procedure 2831 can comprise unlatching the switch module to decouple the electrical input from the power conservation module and from the electrical output, thereby ending the run state and establishing the standby state. For instance, control module 2250 can cause switch moduel 2220 to become unlatched by sending switch control signal 2255 to transistor 1322, as described above with respect to the embodiment of FIG. 22.

Although the invention has been described with reference to specific embodiments, it will be understood by those skilled in the art that various changes may be made without departing from the scope of the invention. Additional examples of such changes have been given in the foregoing description. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, the methods described herein may be comprised of many different activities and/or procedures, and may be performed by many different modules, in many different orders than any element of FIGS. 1-27, and the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:
1. An electrical system comprising:
an electrical input module configured to receive input electricity;
an electrical output module configured to provide output electricity to an electrical load coupled thereto;
a switch module coupled to the electrical input module;
a startup module coupled to the switch module;
a power conservation module coupled to the switch module; and
an electrical assembly comprising at least the switch module, the startup module, and the power conservation module;
wherein:
the electrical assembly is powered by operational electricity derived from the input electricity;
the output electricity is derived from the input electricity at the electrical assembly;
the electrical system is configured to operate in:
a startup state; and
a run state following the startup state;
during the startup state, the switch module couples the electrical input module to the startup module;
during the run state, the switch module couples the electrical input module to the power conservation module and to the electrical output module; and
the operational electricity is greater during the startup state than during the run state.
2. The electrical system of claim 1, wherein:
the electrical system is further configured to operate in a standby state; and
further comprising at least one of:
a standby actuator coupled to the startup module;
a toggle module configured to output a toggle signal for switching the electrical system from the run state to the standby state;
a control module coupled to the switch module; or
an electricity-supply module configured to power the switch module and the control module.
3. The electrical system of claim 2, wherein:
during the standby state, the electrical input module is:
decoupled from the electricity-supply module; and
decoupled from the electrical output module;
during the startup state:
the electrical input module is:
coupled through the switch module to the electricity-supply module via the startup module; and
decoupled from the electrical output module; and
the operational electricity is sourced by the electricity-supply module through the startup module;
and
during the run state:
the electrical input module is:
coupled through the switch module to the electricity-supply module via the power conservation module; and
coupled to the electrical output module;
and
the operational electricity is sourced by the electricity-supply module through the power conservation module.

4. The electrical system of claim 2, wherein:
when actuated, the standby actuator is configured to cause toggling of the electrical system from the run state to the standby state.
5. The electrical system of claim 3, wherein:
the standby actuator comprises at least one of:
a manual switch, a momentary switch, a push button switch, or a start/stop button.
6. The electrical system of claim 2, wherein:
the toggle module is coupled to the standby actuator and configured to alter the toggle signal when
the standby actuator is actuated during the run state of the electrical system.
7. The electrical system of claim 2, wherein:
the standby actuator is configurable between:
a default condition; and
an actuated condition;
while the electrical system is in the standby state:
the default condition of the standby actuator is configured to:
maintain the electrical input module electrically isolated from at least one of the startup module or the power conservation module;
while the electrical system is in the run state and the standby actuator is in the default condition:
the electrical input module is coupled to the toggle module such as to establish the toggle signal via the toggle module;
while the electrical system is in the run state and the standby actuator is in the actuated condition:
the electrical input module is decoupled from the toggle module such as to interrupt the toggle signal, thereby requesting the toggling of the run state to the standby state.
8. The electrical system of claim 7, wherein:
while the electrical system is in the run state and the standby actuator is in the default condition, the electrical input module is coupled to the toggle module via at least the power conservation module.
9. The electrical system of claim 7, wherein:
while the electrical system is in the run state and the standby actuator is in the default condition, the electrical input module is coupled to the toggle module via at least the power conservation module and the startup module.
10. The electrical system of claim 2, wherein:
the control module is coupled to the toggle module and to the switch module;
when the electrical system is in the run state, the control module is configured to:
monitor the toggle signal from the toggle module; and
output a switch control signal to the switch module when the toggle signal is interrupted;
and
upon receipt of the switch control signal, the switch module is configured to:
decouple the electrical input module from the power conservation module and from the electrical output module.
11. The electrical system of claim 2, wherein:
the control module is coupled to the switch module and to a timing actuator;
the timing actuator is configured to receive a timing input indicative of a time duration for maintaining the electrical system in the run state;
when the electrical system is in the run state, the control module is configured to:
monitor for receipt of the timing input at the timing actuator;

monitor for completion of the time duration specified by
the time duration input; and
output a timed switch control signal to the switch module upon completion of the time duration;
and
upon receipt of the timed switch control signal, the switch module is configured to:
decouple the electrical input module from the power conservation module and from the electrical output module.

12. The electrical system of claim 2, wherein:
the standby actuator comprises:
a first standby actuator terminal coupled to the startup module;
a second standby actuator terminal coupled to the switch module; and
a third standby actuator terminal coupled to the toggle module;
and
the standby actuator is configurable between:
a default condition comprising the first standby actuator terminal coupled to the third standby actuator terminal; and
an actuated condition comprising the first standby actuator terminal coupled to the second standby actuator terminal.

13. The electrical system of claim 12, wherein:
the startup module comprises:
a first startup resistor coupled between the first standby actuator terminal and the electricity-supply module.

14. The electrical system of claim 13, wherein:
the power conservation module comprises:
a conservation capacitor coupled between the switch module and the electricity-supply module.

15. The electrical system of claim 14, wherein:
the power conservation module further comprises:
a first conservation resistor coupled between first and second ends of the conservation capacitor.

16. The electrical system of claim 15, wherein:
the power conservation module further comprises a second conservation resistor;
the first conservation resistor is coupled between the first end of the conservation capacitor and the second conservation resistor; and
the second conservation resistor is coupled between the second end of the conservation capacitor and the first conservation resistor.

17. The electrical system of claim 14, wherein:
the first startup resistor and the conservation capacitor are coupled together at a junction node; and
the electricity-supply module is configured to receive, via the junction node, at least a portion of the input electricity to generate the operational electricity therefrom.

18. The electrical system of claim 17, wherein:
the electricity-supply module is coupled to the junction node via a junction resistor.

19. The electrical system of claim 12, wherein:
the toggle module comprises:
a toggle inner node coupling together first, second, and third toggle resistors and a first toggle capacitor; and
a toggle output node coupled to the control module;
the first toggle resistor is coupled between the toggle inner node and the third standby actuator terminal of the standby actuator;
the second toggle resistor is coupled between the toggle inner node and ground;
the toggle capacitor is coupled between the toggle inner node and ground; and
the third toggle resistor is coupled between the toggle inner node and the toggle output node.

20. The electrical system of claim 2, wherein:
the switch module comprises:
a relay comprising:
a first relay terminal coupled to the electrical input module;
a second relay terminal coupled to the standby actuator; and
a third relay terminal coupled to the power conservation module and to the electrical output module;
a relay coil;
a first relay coil terminal coupled to the electricity-supply module; and
a second relay coil terminal coupled to ground;
and
the switch module is configurable between:
an unlatched condition comprising the first relay terminal coupled to the second relay terminal when the relay coil is de-energized; and
a latched condition comprising the first relay terminal coupled to the third relay terminal when the relay coil is energized.

21. The electrical system of claim 20, wherein:
when the electrical system is in either of the standby state or the startup state, the switch module is in the unlatched condition; and
when the electrical system is in the run state, the switch module is in the latched condition.

22. The electrical system of claim 20, wherein:
the switch module further comprises:
a transistor comprising:
a first terminal coupled to the first relay coil terminal;
a second terminal coupled to ground; and
a control terminal coupled to the control module and configured to receive a switch control signal therefrom;
and
when the switch control signal is received from the control module, the transistor is actuated to de-energize the relay coil and set the switch module to the unlatched condition and thereby transition the electrical system from the run state to the standby state.

23. A method for selectively coupling an electrical input to an electrical output via an electrical assembly such as to make available output electricity to the electrical output,
the electrical input being configured to receive input electricity,
the electrical output being configured to be coupled to at least one electrical load,
the electrical assembly comprising a switch module, a startup module, and a power conservation module;
the method comprising:
performing a startup state for the electrical assembly by:
coupling the electrical input to a power supply module via the startup module of the electrical assembly;
sourcing, with the power supply, a first operational electricity through the startup module from the input electricity; and
powering the switch module to latch, using power derived by the power supply module from the first operational electricity, to thereby:
couple the electrical input to the electrical output; and couple the electrical input to the power supply module via the power conservation module; and maintaining a run state for the electrical assembly by:
sourcing, with the power supply, a second operational electricity through the power conservation module from the input electricity; and
powering the switch module to remain latched using power derived by the power supply module from the second operational electricity;

wherein the first operational electricity is greater than the second operational electricity.

24. The method of claim 23, further comprising:
toggling the electrical assembly from the run state to a standby state by
unlatching the switch module to decouple the electrical input from the power conservation module and from the electrical output.

25. The method of claim 24, wherein:
maintaining the run state comprises:
outputting a toggle signal from a toggle module of the electrical assembly, the toggle module coupled to the power conservation module via an standby actuator; and
unlatching the switch module comprises:
actuating the standby actuator to decouple the toggle module from the power conservation module and thereby interrupt the toggle signal; and
outputting a switch control signal from a control module of the electrical assembly when the control module detects that the toggle signal from the toggle module has been interrupted,
the switch control signal configured to unlatch the switch module.

26. The method of claim 24, wherein:
maintaining the run state comprises:
monitoring for completion of a time duration specified by a time duration input at a control module of the electrical assembly; and
unlatching the switch module comprises:
outputting a switch control signal from the control module of the electrical assembly upon completion of the time duration,
the switch control signal configured to unlatch the switch module.

27. A method for manufacturing an electrical system, the method comprising:
providing an electrical input module configured to receive input electricity;
providing an electrical output module configured to provide output electricity to an electrical load coupled thereto;
providing a switch module;
providing a startup module;
providing a power conservation module; and
coupling the switch module, the startup module, and the power conservation module together into an electrical assembly; and
configuring the electrical system to operate in:
a startup state; and
a run state following the startup state;
wherein:
the electrical assembly is configured to be powered by operational electricity derived from the input electricity;

during the startup state, the switch module is configured to couple the electrical input module to the startup module;
during the run state, the switch module is configured to couple the electrical input module to the power conservation module and to the electrical output module; and
the operational electricity is greater during the startup state than during the run state.

28. The method of claim 27, further comprising:
providing at least one of:
a standby actuator coupled to the startup module;
a toggle module configured to output a toggle signal for switching the electrical system from the run state to a standby state;
a control module coupled to the switch module; or
an electricity-supply module configured to power the switch module and the control module;
and
configuring the electrical system to operate in the standby state;
wherein, when actuated, the standby actuator is configured to cause toggling of the electrical system from the run state to the standby state.

29. The method of claim 28, wherein:
during the standby state, the electrical input module is configured to be:
decoupled from the electricity-supply module; and
decoupled from the electrical output module;
during the startup state:
the electrical input module is configured to be:
coupled through the switch module to the electricity-supply module via the startup module; and
decoupled from the electrical output module; and
the operational electricity is configured to be sourced by the electricity-supply module through the startup module;
and
during the run state:
the electrical input module is configured to be:
coupled through the switch module to the electricity-supply module via the power conservation module; and
coupled to the electrical output module;
and
the operational electricity is configured to be sourced by the electricity-supply module through the power conservation module.

30. The method of claim 28, wherein:
the toggle module is configured to be coupled to the standby actuator and to alter the toggle signal when the standby actuator is actuated during the run state of the electrical system;
the standby actuator is configurable between:
a default condition; and
an actuated condition;
while the electrical system is in the standby state:
the default condition of the standby actuator is configured to:
maintain the electrical input module electrically isolated from at least one of the startup module or the power conservation module;
while the electrical system is in the run state and the standby actuator is in the default condition:

the electrical input module is configured to be coupled to the toggle module such as to establish the toggle signal via the toggle module;
and while the electrical system is in the run state and the standby actuator is in the actuated condition:
the electrical input module is configured to be decoupled from the toggle module such as to interrupt the toggle signal, thereby requesting the toggling of the run state to the standby state.

* * * * *